(12) United States Patent
Yamamoto et al.

(10) Patent No.: US 11,914,802 B2
(45) Date of Patent: *Feb. 27, 2024

(54) AUXILIARY DEVICE

(71) Applicant: Wacom Co., Ltd., Saitama (JP)

(72) Inventors: Sadao Yamamoto, Tokyo (JP);
Masayuki Miyamoto, Tokyo (JP);
Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,597

(22) Filed: Oct. 4, 2021

(65) Prior Publication Data
US 2022/0026997 A1 Jan. 27, 2022

Related U.S. Application Data

(63) Continuation of application No. 16/277,637, filed on Feb. 15, 2019, now Pat. No. 11,137,842, which is a (Continued)

(30) Foreign Application Priority Data

Sep. 1, 2016 (WO) .................. PCT/JP2016/075595

(51) Int. Cl.
G06F 3/038 (2013.01)
G06F 3/041 (2006.01)
(Continued)

(52) U.S. Cl.
CPC .............. *G06F 3/0383* (2013.01); *B43L 7/00* (2013.01); *G06F 3/038* (2013.01);
(Continued)

(58) Field of Classification Search
CPC .. G06F 3/0383; G06F 3/04166; G06F 3/0416; G06F 3/0441; G06F 3/0442;
(Continued)

(56) References Cited

U.S. PATENT DOCUMENTS 9,459,726 B2 10/2016 Katsurahira
9,495,024 B2 11/2016 Watanabe
(Continued)

FOREIGN PATENT DOCUMENTS

JP 5-6153 A 1/1993
JP 2004-199560 A 7/2004
(Continued)

OTHER PUBLICATIONS

"See the Strategy of In-cell/On-cell for Smartphones of Japan Display Inc., LG Electronics Incorporated, and Sharp Corporation", originally retrieved on Aug. 16, 2016, from http://techon.nikkeibp.co.jp/article/NEWS/20150121/400160, 3 pages.
(Continued)

*Primary Examiner* — Jimmy H Nguyen
(74) *Attorney, Agent, or Firm* — Seed IP Law Group LLP

(57) ABSTRACT

An auxiliary device according to the present disclosure includes a ruler part, a plurality of electrodes provided at the ruler part, a receiving electrode for receiving an uplink signal transmitted from a sensor controller, and a processor that transmits a downlink signal to the sensor controller while sequentially switching the plurality of electrodes in response to reception of the uplink signal.

8 Claims, 26 Drawing Sheets

Related U.S. Application Data continuation of application No. PCT/JP2017/029914, filed on Aug. 22, 2017.

(51) Int. Cl.
  *G06F 3/044* (2006.01)
  *B43L 7/00* (2006.01)
  *G06F 3/0354* (2013.01)

(52) U.S. Cl.
  CPC ........ *G06F 3/03545* (2013.01); *G06F 3/0412* (2013.01); *G06F 3/0441* (2019.05); *G06F 3/0442* (2019.05); *G06F 3/0446* (2019.05); *G06F 3/04162* (2019.05); *G06F 3/04166* (2019.05); *G06F 2203/0382* (2013.01); *G06F 2203/0384* (2013.01)

(58) Field of Classification Search
  CPC .... G06F 3/0446; G06F 3/04162; G06F 3/038; G06F 3/0412; G06F 3/03545; G06F 3/044; G06F 2203/0384; G06F 2203/0382; B43L 7/00
  USPC .................................................. 345/173–179
  See application file for complete search history.

(56) References Cited

U.S. PATENT DOCUMENTS

| | | | |
|---|---|---|---|
| 9,785,272 B1 | 10/2017 | Rosenberg et al. | |
| 10,055,036 B2 | 8/2018 | Koike et al. | |
| 10,606,382 B2 | 3/2020 | Yamamoto | |
| 11,340,720 B2* | 5/2022 | Yamamoto | G06F 3/0442 |
| 2004/0073620 A1 | 4/2004 | Roh et al. | |
| 2008/0169132 A1 | 7/2008 | Ding et al. | |
| 2011/0090146 A1 | 4/2011 | Katsurahira | |
| 2013/0106709 A1 | 5/2013 | Simmons | |
| 2013/0106797 A1 | 5/2013 | Pant et al. | |
| 2013/0194201 A1 | 8/2013 | Zanone et al. | |
| 2014/0146001 A1* | 5/2014 | Baba | G06F 3/04883 345/174 |
| 2015/0338930 A1* | 11/2015 | Hara | G06F 3/0416 345/158 |
| 2016/0004338 A1 | 1/2016 | Hsu | |
| 2016/0048234 A1 | 2/2016 | Chandran et al. | |
| 2016/0092010 A1 | 3/2016 | Agarwal et al. | |
| 2016/0188016 A1 | 6/2016 | Munakata et al. | |
| 2016/0320918 A1 | 11/2016 | Hara | |
| 2016/0378265 A1 | 12/2016 | Katsurahira et al. | |
| 2017/0131798 A1* | 5/2017 | Geaghan | G06F 3/0441 |
| 2017/0228049 A1 | 8/2017 | Yamamoto | |
| 2018/0018031 A1* | 1/2018 | Fleck | G06F 3/03547 |
| 2018/0024658 A1* | 1/2018 | Yamamoto | G06F 3/044 345/179 |
| 2018/0046272 A1* | 2/2018 | Hara | G06F 3/044 |
| 2018/0113523 A1* | 4/2018 | Hara | G06F 3/0446 |

FOREIGN PATENT DOCUMENTS

| | | | | |
|---|---|---|---|---|
| WO | 2015/111159 A1 | 7/2015 | | |
| WO | 2015/141349 A1 | 9/2015 | | |
| WO | WO-2015200396 A1 * | 12/2015 | ......... | G06F 3/03545 |

OTHER PUBLICATIONS

U.S. Office Action, dated Sep. 19, 2019, for U.S. Appl. No. 15/842,098, 18 pages.

* cited by examiner

FIG.3
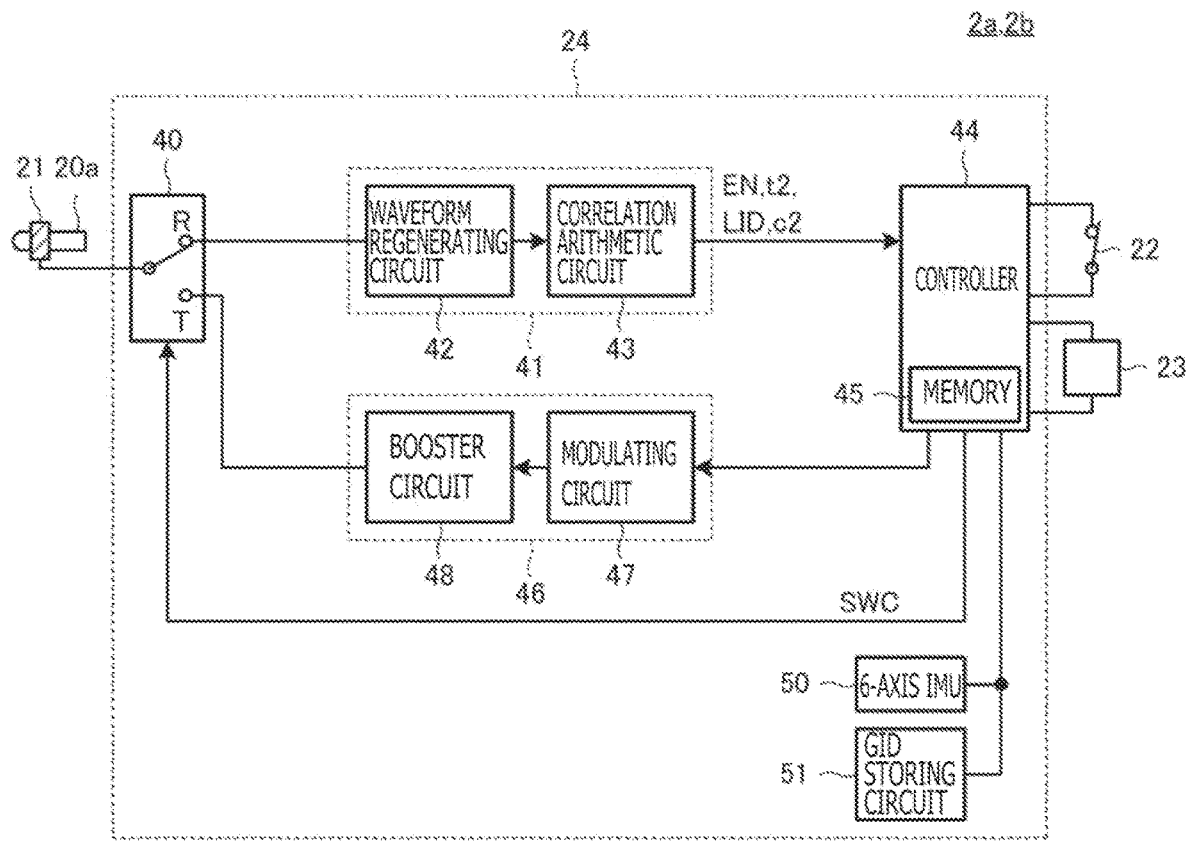
FIG.4
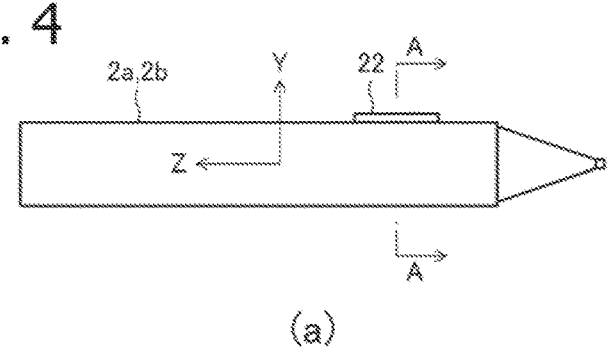
(a)
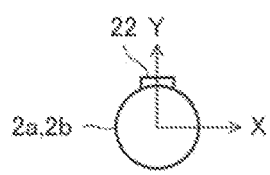
(b)

FIG. 8

| LID | GID | VELOCITY | PRESENT STATE | OPERATION STATE | RESET COMMAND NON-ISSUANCE FLAG 1 | RESET COMMAND NON-ISSUANCE FLAG 2 | DELETION COUNTER | DOWNLINK SIGNAL TRANSMISSION SCHEDULE |
|---|---|---|---|---|---|---|---|---|
| #1 | Ven1 TypeStylus Serial1 | V1[m/s] | PEN-DOWN STATE (WRITING PRESSURE > 0) | NORMAL MODE | FALSE | FALSE | 0 | #S1 |
| #2 | NOT YET ACQUIRED | V2[m/s] (V2<V1) | PEN-DOWN STATE (WRITING PRESSURE = 0) | NORMAL MODE | FALSE | FALSE | 0 | #S2 |
| #3 | Ven1 TypeStylus Serial2 | INDEFINITE | REPLY TO UPLINK SIGNAL IS ABSENT | NORMAL MODE | FALSE | FALSE | 3 | #S3 |
| #4 | Ven1 TypeRuler Serial1 | V3[m/s] | PEN-DOWN STATE | NORMAL MODE | FALSE | FALSE | 0 | #S4 |
| #5 | NOT YET ACQUIRED | INDEFINITE | NOT YET ACQUIRED | NORMAL MODE | FALSE | FALSE | 0 | NOTHING |

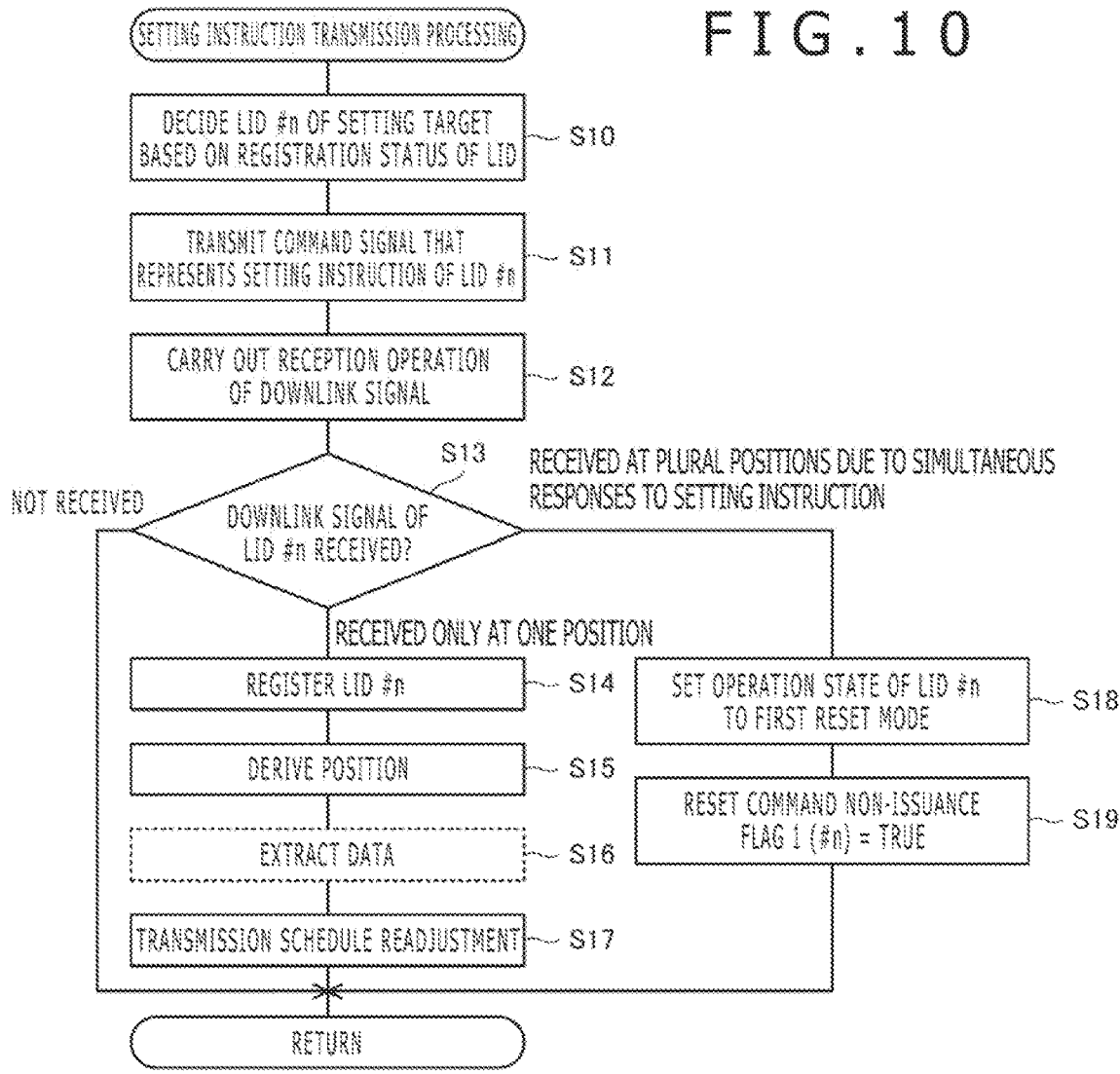
FIG.10
FIG.11
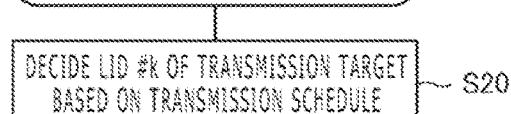
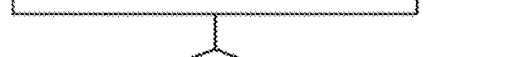
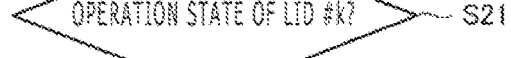

AUXILIARY DEVICE

BACKGROUND

Technical Field

The present disclosure relates to a stylus and a sensor controller and particularly relates to a stylus and a sensor controller that are compatible with simultaneous use of plural styluses (multi-stylus).

Background Art

An active capacitive system is known as one of a plurality of concrete systems of a position detecting system that enables handwriting input by a stylus on a touch surface provided on a surface of electronic equipment. Hereinafter, the stylus compatible with the active capacitive system will be referred to as the "active stylus."

The active stylus is configured to be capable of transmitting a signal (downlink signal) to electronic equipment. The transmission of the downlink signal is carried out by supplying a transmission signal to an electrode provided at the tip of the active stylus and thereby generating an electric field according to the signal in a space near the electrode. The electronic equipment has a sensor board including an electrode group in a matrix manner disposed on the lower side of a touch surface and a sensor controller connected to this sensor board, and is configured to receive the downlink signal through detection, by the sensor controller, of change in the amount of charge generated in the electrode group in the sensor board due to the above-described alternating electric field. One example of the downlink signal is disclosed in PCT Patent Publication No. WO 2015/111159. The downlink signal according to this example is composed of an unmodulated continuous signal for position detection (position signal) and a signal modulated based on data such as writing pressure information and a unique identifier (ID) (data signal).

In the active capacitive system, the sensor controller in the electronic equipment is also configured to be capable of transmitting a signal (uplink signal) to the active stylus. The sensor controller transmits the uplink signal toward the stylus by supplying a transmission signal to the electrode group that forms the sensor board and thereby generating an electric field on a panel. The active stylus is configured to detect the uplink signal by detecting the amount of charge induced in the above-described electrode by this electric field. In U.S. Patent Application Publication No. 2013/0106797, an example of the active stylus that receives the uplink signal is described.

Incidentally, in recent years, the case in which the touch surface doubles as a liquid crystal display surface as in a so-called tablet computer has been increasing. In this case, the sensor board is disposed on or inside the liquid crystal panel. The position detecting system in which the sensor board is placed on the liquid crystal panel is called the "out-cell type." In Japanese Patent Laid-Open No. 1993-6153 and PCT Patent Publication No. WO 2015/141349, an example of the position detecting system of the out-cell type is disclosed. Furthermore, among the position detecting systems in which the sensor board is placed in the liquid crystal panel are the "on-cell type" in which the electrode group for the sensor board is disposed on a color filter glass or substrate glass inside the liquid crystal panel and the "in-cell type" in which common electrodes or pixel electrodes of the liquid crystal panel double as part of the electrode group for the sensor board. In "JDI, LG, Sharp no Sumaho Muke In-cell/On-cell Senryaku wo Yomu" (in English, "See the Strategy of In-cell/On-cell for Smartphones of Japan Display Inc., LG Electronics Incorporated, and Sharp Corporation"), [online], Nikkei Technology Online, [retrieved on Aug. 16, 2016], Internet <URL:http://techon.nikkeibp.co.jp/article/NEWS/20150121/400160/>, examples of the position detecting systems of the on-cell type and the in-cell type are disclosed.

In the position detecting system of the out-cell type or the on-cell type, it is known that a drive signal in the liquid crystal panel that exists under the sensor board becomes noise and affects the operation of the sensor controller. A representative one of such noise is an AC component of a voltage signal supplied to electrodes for driving the pixels of the liquid crystal panel. This voltage signal is a signal for controlling the orientation of the liquid crystal of the respective pixels and enters the electrode group that forms the sensor board due to alternating current (AC) coupling to become noise. Furthermore, in the position detecting system of the in-cell type, the electrode group shared for both driving operation of the pixels and position detection operation can not be used for the position detection operation while the driving operation of the pixels is being carried out.

In view of the above-described problems of the case in which the touch surface doubles as the liquid crystal display surface, in recent years, studies have been made on a system in which communication between an active stylus and a sensor controller is carried out by frame communication in which the display operation period of a liquid crystal panel is defined as one frame and each of plural blank periods (periods in which the occurrence frequency of liquid crystal noise is relatively low) that periodically appear in the one frame is defined as one slot.

Here, as one of specifications required for the position detecting system, there is a specification that plural styluses can be simultaneously used (multi-stylus). Therefore, studies are being made on making also the above-described frame communication compatible with the multi-stylus. According to the studies, a sensor controller broadcasts an uplink signal for ordering allocation of a slot to each stylus on each frame basis. Then, each stylus transmits a downlink signal by using the allocated slot. This makes it possible to implement communication between plural active styluses and the sensor controller in a time-sharing manner.

However, if the allocation of a slot is ordered to each stylus by the uplink signal of each frame fixed at not only the display operation rate or the like but any time cycle, the allocation of the slots to the respective styluses depends on the fixed frame rate. That is, in the above-described system that is being studied, there is a problem that the allocation of the slots to the respective styluses can not be flexibly changed in a shorter time than the frame. Furthermore, there is a problem that the scan rate of each stylus is fixed to an integral multiple of the frame rate.

Moreover, in the above-described system that is being studied, there is also a problem that the size of the uplink signal that is transmitted in one frame and is for ordering allocation of plural slots inevitably becomes large. If the size of the uplink signal is large, the occupancy ratio of the uplink signal in one frame becomes high and the communication efficiency decreases. Furthermore, it takes a time equivalent to several frames to perform processing of transmitting a signal with a large size to each of plural styluses and checking whether or not setting has been reflected. Thus, the delay time until the allocation of the transmission time is actually reflected in all styluses become long. In the case in which a user uses plural styluses and a device such as an electronic ruler in such a manner as to frequently make them to come close to and get remote from electronic equipment, this delay time possibly affects a feeling of use of the user.

Furthermore, there is an electronic ruler made in imitation of a ruler of stationery as one kind of stylus. The movement velocity of a stylus of a general pen type while the stylus is being used is high. In contrast, a drawing auxiliary device such as the electronic ruler is put at the same place for a while once being put on a panel surface and is used at lower movement velocity compared with the pen-type stylus in many cases. Therefore, it is desirable that the scan rate can be changed according to the device type.

Moreover, differently from the pen-type stylus used while being held with a hand, the drawing auxiliary device such as the electronic ruler is used in such a manner as to remain placed on the panel surface even while a user is not operating the drawing auxiliary device in some cases. Carrying out transmission and reception of signals between the auxiliary device and the sensor controller in such a case increases the power consumption of the auxiliary device and consumes communication resources between the sensor controller and the stylus (pen type or auxiliary device) even when the electronic ruler is not used.

BRIEF SUMMARY

Therefore, one of objects of the present disclosure is to provide a stylus and a sensor controller with which allocation of the transmission time to each stylus can be flexibly changed with a shorter time than a frame and can be reflected in each stylus.

Furthermore, one of other objects of the present disclosure is to provide a stylus and a sensor controller with which the size of an uplink signal for ordering allocation of the transmission time can be made small.

Moreover, one of further other objects of the present disclosure is to allow the scan rate to be changed according to the type of device and characteristics of the use form.

In addition, one of further other objects of the present disclosure is to implement reduction in the power consumption of an auxiliary device and effective use of communication resources in the case in which the auxiliary device is left on a panel surface. A stylus according to the present disclosure is a stylus that operates in synchronization with a sensor controller connected to a sensor electrode group, and is a stylus including an electrode, a memory, and a processor that, in operation: detects a first signal supplied to the sensor electrode group in each frame of a plurality of frames; determines whether the first signal represents a setting instruction of a local ID, and writes a value of the local ID specified by the setting instruction to the memory if the first signal is determined to represent the setting instruction; repeatedly detects a second signal supplied to the sensor electrode group in each of one or more slots included in the frame; compares values of a local ID included in the second signal detected and the local ID stored in the memory every time the processor detects the second signal; and transmits a first downlink signal to the sensor controller using the electrode if the values correspond with each other.

Furthermore, a sensor controller according to the present disclosure is a sensor controller that detects one or more styluses by using a sensor electrode group. The sensor controller includes a processor; and a memory storing processor readable instructions that, when executed by the processor, cause the sensor controller to: transmit a first signal that represents a setting instruction that gives a local ID to a stylus that has not been detected in each frame of a plurality of frames, transmit a second signal including the local ID regarding which an instruction of setting has been made by the setting instruction to a stylus that has been detected in each of a plurality of slots included in the frame, and detect a first downlink signal transmitted from the stylus in response to the second signal.

A stylus according to an aspect of the present disclosure is a stylus that bidirectionally transmits and receives a signal with a sensor controller connected to a sensor by using capacitive coupling and is a stylus including a memory that temporarily stores a value of a local ID and a processor that determines whether or not an uplink signal that is detected includes the value of the local ID stored in the memory every time the uplink signal transmitted by the sensor controller is detected, and generates a downlink signal based on a handling state and transmits the downlink signal to the sensor controller if determining that the uplink signal that is detected includes the value of the local ID stored in the memory.

In the above-described stylus, the processor may generate the downlink signal including the value of the local ID stored in the memory and transmit the downlink signal to the sensor controller.

A sensor controller according to another aspect of the present disclosure is a sensor controller that has a function of detecting one or more styluses and reports the positions of one or more styluses that have been already detected to a host processor and is a sensor controller including a memory that stores values of one or more local IDs allocated to a respective one of the one or more styluses that have been already detected and a processor that decides a scan rate about each of the one or more styluses that have been already detected, and selects any one of the values of the one or more local IDs stored in the memory based on the scan rate that is decided, and transmits an uplink signal including the selected value of the local ID, and derives the position of a stylus corresponding to the selected value of the local ID based on a downlink signal returned in response to the uplink signal.

In the above-described sensor controller, the processor may decide the scan rate about each of the one or more styluses that have been already detected based on a device type of each of the one or more styluses that have been already detected.

An auxiliary device according to the present disclosure may include a ruler part, a plurality of electrodes provided at the ruler part, a receiving electrode for receiving an uplink signal transmitted from a sensor controller, and a processor that transmits a signal to the sensor controller while sequentially switching the plurality of electrodes in response to reception of the uplink signal.

Furthermore, an auxiliary device according to the present disclosure may include a ruler part, two or more electrodes provided at the ruler part, a first switch that is provided on a top surface of the ruler part and is for switching whether the electronic ruler is in a working state or in a stop state by operation by a user, and a processor that transmits a downlink signal to the sensor controller by using the two or more electrodes if the first switch is in the working state, and stops transmission processing of the downlink signal if the first switch is in the stop state.

According to the present disclosure, the sensor controller transmits the uplink signal (second signal) including the value of a local ID at every transmission clock time and thereby the stylus that should transmit the downlink signal (first downlink signal) in the slot can be specified. Therefore, it becomes possible to flexibly change allocation of the transmission time to each stylus with a shorter time than the frame without depending on the frame. Furthermore, the state about the schedules is not stored on the stylus side and therefore the time for changing them is unnecessary. This can improve the response speed as the whole system regarding change in the scan rate and so forth necessary in the case in which a new stylus is detected, or the like. Moreover, by only making one value of a local ID be included in the uplink signal, it becomes possible to order allocation of the transmission time from the sensor controller to each stylus. Thus, it becomes possible to decrease the size of the uplink signal for ordering allocation of plural transmission times in the frame.

Furthermore, according to the present disclosure, the stylus generates the downlink signal including the value of the local ID temporarily stored in the memory and transmits the downlink signal to the sensor controller. Therefore, even when the downlink signals are detected at plural places on the panel surface, the sensor controller can discriminate them on each stylus basis. In addition, the number of bits of the local ID can be made smaller compared with the global ID to be described later. This makes it possible to lower the downlink occupancy ratio necessary for transmitting the local ID.

Moreover, according to the present disclosure, the sensor controller decides the scan rate about each of one or more styluses that have been already detected based on the device type of each of the one or more styluses that have been already detected. Thus, it becomes possible to change the scan rate according to the type of the device and characteristics of the use form.

Furthermore, according to the present disclosure, the auxiliary device is provided with the first switch for switching whether the first switch is in the working state or in the stop state by operation by a user. Therefore, reduction in the power consumption of the auxiliary device and effective use of communication resources in the case in which the auxiliary device is left on the panel surface are implemented.

BRIEF DESCRIPTION OF THE DRAWINGS

FIG. 3 is a diagram depicting a detailed configuration of a second example of the styluses depicted in FIG. 1;

FIG. 4 is an explanatory diagram of a six-axis inertial measurement unit (IMU) depicted in FIG. 3;

FIG. 8 is a diagram depicting an ID management table depicted in FIG. 7;

FIG. 10 is a flowchart depicting a detailed flow of setting instruction transmission processing depicted in FIG. 9;

FIG. 11 is a flowchart depicting a detailed flow of command signal transmission processing depicted in FIG. 9;

DETAILED DESCRIPTION

A preferred embodiment of the present disclosure will be described in detail below with reference to the accompanying drawings.

Figure 1:
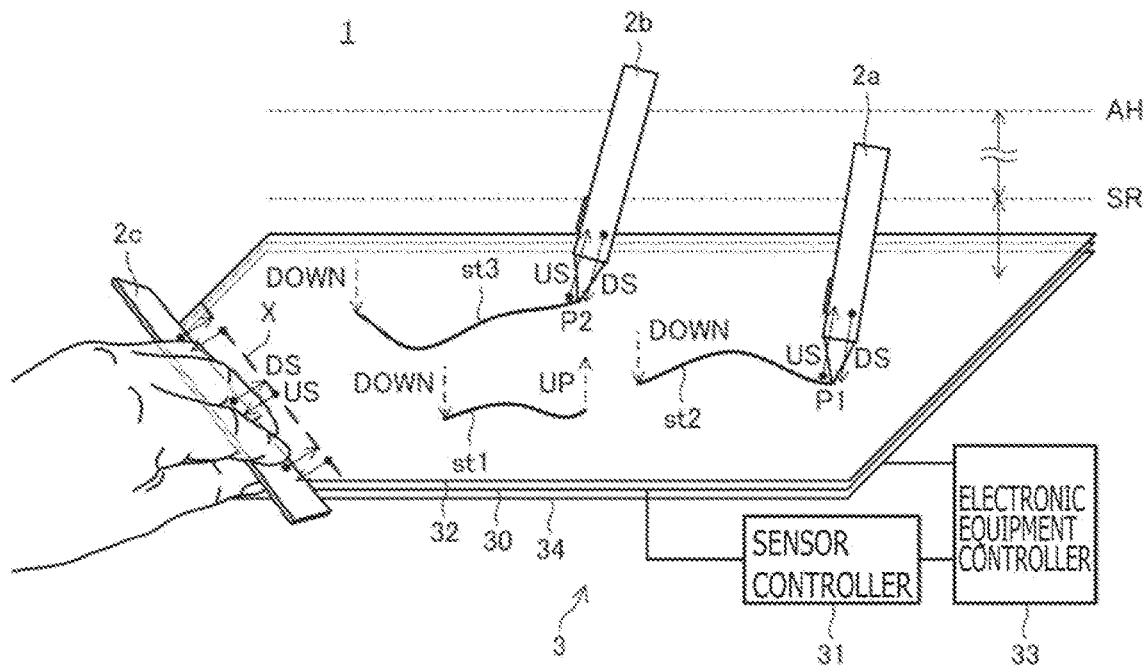
FIG. 1 is a diagram depicting a position detecting system according to an embodiment of the present disclosure.

FIG. 1 is a diagram depicting the whole of a position detecting system 1 according to the present embodiment. As depicted in this diagram, the position detecting system 1 is configured to include two pen-type styluses 2a and 2b, one ruler-type stylus 2c, and electronic equipment 3. The styluses 2a, 2b, and 2c are collectively referred to herein as stylus 2. The electronic equipment 3 is configured to include a sensor electrode 30, a sensor controller 31, a panel 32, an electronic equipment controller 33 (host processor), and a liquid crystal display device 34.

In the position detecting system 1, the sensor controller 31 is a master and the one or more styluses 2 are slaves. The position detecting system 1 is so configured that, when a polling request (command signal to be described later) including a local ID is issued from the sensor controller 31, only the stylus 2 having the local ID included in it is permitted to make a reply (transmission of a downlink signal DS to be described later) in the period of response to the polling. Every time the stylus 2 detects the polling request, the stylus 2 determines whether or not the detected polling request includes the value of the local ID stored by its own self. If determining that the polling request includes the value of the local ID, the stylus 2 transmits the downlink signal DS. The local ID is given to each stylus 2 by the sensor controller 31 and is stored by the stylus 2.

The styluses 2a to 2c are all the above-described active stylus and are used simultaneously or separately by one or more users. Hereinafter, in some cases, the styluses 2a to 2c will be represented as the stylus 2 when there is no need to particularly discriminate the styluses 2a to 2c.

For example when using the stylus 2a, a user gradually brings the stylus 2a close to the panel surface of the panel 32 (pen-down. In FIG. 1, represented as "DOWN") and finally brings the pen tip of the stylus 2a into contact with the panel surface (pen touch). Then, when the user moves the pen tip on the panel surface while keeping this contact state (pen move), a locus st1 of the movement is rendered on the panel surface by processing of the electronic equipment 3 as depicted in the diagram. This rendering is continued until the user separates the pen tip of the stylus 2a from the panel surface (pen-up. In FIG. 1, represented as "UP"). Thereafter, when the user carries out pen-down, pen touch, pen move, and pen-up again, a locus st2 of the movement is similarly rendered on the panel surface by processing of the electronic equipment 3. In FIG. 1, a locus st3 generated by pen-down, pen touch, pen move, and pen-up of the stylus 2b is also diagrammatically represented.

The stylus 2c, details of which will be described later, is a special device (auxiliary device) having plural electrodes disposed to be lined in a straight line manner. Although being a device for digital stationery referred to as the "electronic ruler" typically, this device will be referred to as the stylus 2c for simplification of explanation of operation in the present specification. The electronic equipment 3 is configured to be capable of accepting input of a straight line by the stylus 2c. Specifically, the electronic equipment 3 is configured to render a virtual line X parallel to the straight-line-shaped pen tip of the stylus 2c on the panel surface when a user brings the pen tip into contact with the panel surface (pen touch).

The styluses 2a to 2c are each configured to detect an uplink signal US supplied by the sensor controller 31 of the electronic equipment 3 through the sensor electrode 30 and transmit the downlink signal DS as a response to the predetermined uplink signal US. The downlink signal DS is received by the sensor electrode 30 and is supplied from the sensor electrode 30 to the sensor controller 31.

As the uplink signal US, two kinds of signals, a stylus search signal and a command signal, exist. The stylus search signal is a signal for newly detecting the undetected stylus 2 and is composed of a known detection pattern c1 and a delimiter pattern STP added to the tail end. The detailed contents of the detection pattern c1 and the delimiter pattern STP will be described later. The stylus 2 is configured to intermittently carry out detection operation of the detection pattern c1, and detects the existence of the sensor controller 31 when detecting the detection pattern c1. Furthermore, the stylus 2 that has detected the detection pattern c1 continues the detection operation without change and synchronizes with the sensor controller 31 based on the timing when the delimiter pattern STP is detected.

Meanwhile, the command signal is a signal for conveying an instruction (command) to the stylus 2 and is configured to include information (local ID) to identify one stylus 2 among one or more styluses 2 that are presently on the panel surface and an instruction (command) to the identified stylus 2. The stylus 2 acquires a command included in a command signal and performs processing according to the contents thereof if the command signal including the local ID of this stylus 2 is received. In this processing, transmission processing of the downlink signal DS is included. The local ID is information with which it is enough that the sensor controller 31 can identify one stylus 2 among one or more styluses 2 that are presently on the panel surface. Thus, it suffices for the local ID to be information with a smaller number of bits compared with a global ID to be described later. Preferably, the local ID is information that takes a value of at most 4 bits, with which 16 styluses 2 can be identified. 0000b, 1111b, or the like among 4-bit local IDs may be used as a special local ID to identify all or undetected styluses 2 like a so-called broadcast address. Furthermore, in the respective diagrams to be described later, the local ID will be represented as "LID" (abbreviation for local identifier) and the global ID will be represented as "GID" (abbreviation for global identifier).

The downlink signal DS is configured to include a burst signal formed of an unmodulated carrier signal and a data signal formed of a carrier signal modulated based on data (including the local ID allocated to the stylus 2 that has transmitted the downlink signal DS) according to a command. The stylus 2 is configured to transmit the burst signal at first and subsequently transmit the data signal when transmitting the downlink signal DS. The sensor controller 31 of the electronic equipment 3 is configured to detect the existence of the stylus 2 and the position thereof by receiving the burst signal by using the sensor electrode 30. Indicated positions P1 and P2 depicted in FIG. 1 represent examples of the position detected in this manner. The above-described loci st1 to st3 are the loci of movement of these indicated positions P1 and P2.

In order for the sensor controller 31 to detect the stylus 2, the stylus 2 needs to come close to the touch surface of the electronic equipment 3 to such an extent that the sensor controller 31 can receive the downlink signal DS. A sensing range SR depicted by a dashed line in FIG. 1 is what schematically represents the range in which the sensor controller 31 can receive the downlink signal DS. When the stylus 2 enters this sensing range SR, the sensor controller 31 receives the downlink signal DS through the sensor electrode 30 and thereby becomes capable of detecting the stylus 2. The above-described "pen-down" means such motion of the stylus 2 as to move into the sensing range SR from the outside. Normally the pen-down is carried out by operation of bringing the stylus 2 close to the panel surface of the electronic equipment 3 by a user. The state in which the stylus 2 has entered the sensing range SR by the pen-down but has not yet gotten contact with the panel surface is referred to as the "hover state."

On the other hand, in some cases, the stylus 2 can receive the uplink signal US transmitted by the sensor controller 31 even when outside of the sensing range SR. This is because the uplink signal US can be transmitted by using all of the electrodes in a matrix manner disposed in parallel to the panel surface and can be transmitted with higher intensity compared with the downlink signal DS transmitted from an electrode 21 (described later) near the tip of the stylus 2. An uplink detection height AH depicted in the diagram represents the limit of the height (distance from the panel surface) at which the stylus 2 can receive the uplink signal US. The uplink detection height AH is at a higher position (position farther from the panel surface) than the upper limit of the sensing range SR.

Figure 2:
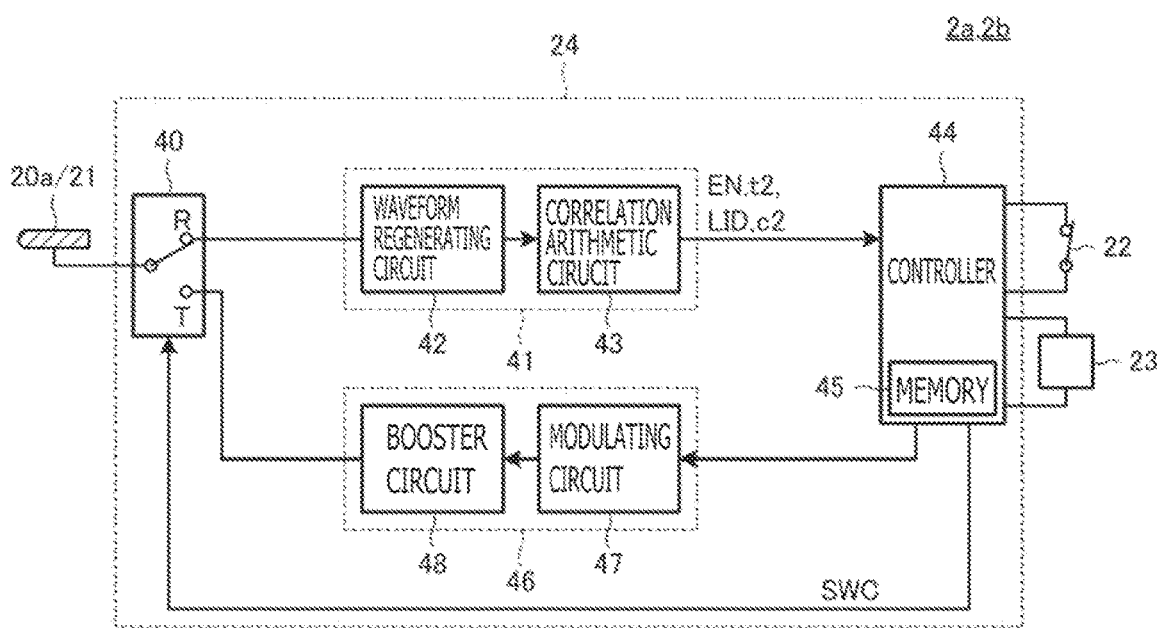
FIG. 2 is a diagram depicting a detailed configuration of a first example of styluses depicted in FIG. 1.

FIG. 2 is a diagram depicting the detailed configuration of a first example of the styluses 2a and 2b depicted in FIG. 1. The styluses 2a and 2b depicted in this diagram are configured to have a core body 20a, the electrode 21, a switch 22, a writing pressure detecting sensor 23 (writing pressure detecting circuit), and a signal processing circuit 24.

The core body 20a is an electrically-conductive member that forms the pen tip of the stylus 2 and doubles as the electrode 21. The electrode 21 plays a role as an antenna for transmitting the downlink signal DS and also plays a role as an antenna for receiving the uplink signal US transmitted from the sensor controller 31 through the sensor electrode 30. The core body 20a and the electrode 21 may be formed as different members as in FIG. 3 to be described later. Furthermore, an electrode to transmit the downlink signal DS and an electrode to receive the uplink signal US may be separately provided.

The switch 22 is a switch that takes either the on-state or the off-state by operation by a user, such as a side switch provided on the side surface of the stylus 2 or a tail switch provided at the rear end part. The writing pressure detecting sensor 23 is a pressure sensor for detecting the pressure (writing pressure) applied to the tip of the core body 20a. Specifically, the writing pressure detecting sensor 23 can be formed by using a publicly-known technique such as a variable-capacitance capacitor whose capacitance changes according to the pressure or a pressure sensor whose resistance value changes according to the pressure for example.

The signal processing circuit 24 has functions of receiving the uplink signal US from the sensor controller 31 through the electrode 21 to perform processing according to the contents thereof and generating the downlink signal DS to be transmitted to the sensor controller 31 to transmit the downlink signal DS toward the sensor controller 31 through the electrode 21. Specifically, the signal processing circuit 24 is configured to include a switch 40, a receiver 41, a controller 44, and a transmitter 46 functionally. Each of them will be described below in turn.

The switch 40 is a one-circuit-two-contact switch element configured in such a manner that a common terminal is connected to either one of a T-terminal and an R-terminal. The common terminal of the switch 40 is connected to the electrode 21. The T-terminal is connected to the output terminal of the transmitter 46 and the R-terminal is connected to the input terminal of the receiver 41. The state of the switch 40 is controlled by a control signal SWC from the controller 44. In the case of receiving the uplink signal US from the sensor controller 31, the controller 44 controls the switch 40 by the control signal SWC so that the R-terminal may be connected to the common terminal. Furthermore, in the case of transmitting the downlink signal DS to the sensor controller 31, the controller 44 controls the switch 40 by the control signal SWC so that the T-terminal may be connected to the common terminal. In the initial state, i.e. in the period until the stylus 2 detects the detection pattern c1 to be described later, the controller 44 often becomes a sleep state in which the on-state and the sleep-state are repeated to carry out reception operation only intermittently in order to reduce the power consumption of the stylus 2, after fixing the switch 40 to the state in which the R-terminal is connected to the common terminal.

The circuit receiver 41 is a circuit that carries out reception of a signal supplied from the circuit switch 40 (signal that has arrived at the electrode 21) and decoding of a chip sequence included in the received signal. In this example, the circuit receiver 41 is configured to include a waveform regenerating circuit 42 and a correlation arithmetic circuit 43. The receiver 41 is configured to be capable of each detecting the above-described detection pattern c1, the delimiter pattern STP, the local ID, and the command by this decoding. The receiver 41 carries out the reception operation only intermittently until the detection pattern c1 is detected in order to reduce the power consumption of the stylus 2 as described above.

The waveform regenerating circuit 42 binarizes the level of the charge (voltage) induced in the electrode 21 with a clock of several times (for example four times) the chip rate of a spreading code PN (described later) used when the sensor controller 31 carries out spreading of the uplink signal US to shape the level into a binary sequence (chip sequence) of positive and negative polarity values and output the binary sequence. The correlation arithmetic circuit 43 decodes the chip sequence included in the received signal by storing the chip sequence output by the waveform regenerating circuit 42 in a register and performing correlation operation with the spreading code PN (or code obtained by carrying out at least either one of inversion and cyclic shift for this spreading code PN) while sequentially shifting the chip sequence with the above-described clock.

The receiver 41 sequentially carries out determination of whether or not the values of symbols obtained by the decoding of the correlation arithmetic circuit 43 represent the detection pattern c1. When detecting the detection pattern c1 as the result, the receiver 41 detects the existence of the sensor controller 31 and issues, to the controller 44, an activation signal EN for enabling execution of processing or the like according to a command represented by a command signal.

Furthermore, if the detection pattern c1 is detected, the receiver 41 switches the reception operation from intermittent operation to continuous operation based on an instruction from the controller 44 activated by the above-described activation signal EN and sequentially carries out determination of whether or not the values of symbols obtained by decoding represent the above-described delimiter pattern STP. When detecting the delimiter pattern STP as the result, the receiver 41 outputs a detection clock time t2 thereof to the controller 44.

The receiver 41 after detecting the delimiter pattern STP carries out reception operation of the command signal transmitted by the sensor controller 31 in accordance with control by the controller 44. Specifically, the receiver 41 acquires a set of a local ID and control information c2 (information including an instruction by the sensor controller 31) from the values of a series of symbols obtained by the correlation arithmetic circuit 43 while the reception operation is being carried out, and outputs the set to the controller 44.

The controller 44 is formed of a microprocessor (MCU) and is triggered to be activated by supply of the activation signal EN from the receiver 41. The controller 44 includes a processor and a memory storing processor readable instructions that, when executed by the processor, cause the sensor controller to perform processing described herein. In the processing performed by the activated controller 44, besides the above-described switching from intermittent reception operation to continuous reception operation, processing of causing the receiver 41 to receive a command signal, processing of deciding its own local ID and temporarily storing the local ID in a memory 45, and processing of causing the transmitter 46 to transmit the downlink signal DS are included. In the processing of causing the receiver 41 to receive a command signal, processing of supplying the control signal SWC for connecting the R-terminal to the common terminal to the switch 40 is included. Similarly, in the processing of causing the transmitter 46 to transmit the downlink signal DS, processing of supplying the control signal SWC for connecting the T-terminal to the common terminal to the switch 40 is included.

When being supplied with the detection clock time t2 from the receiver 41, first the controller 44 performs the processing of causing the receiver 41 to receive a command signal. As described in detail later, the sensor controller 31 is configured to transmit a command signal that represents a setting instruction of the local ID (uplink signal for detecting a new stylus that is not included in one or more styluses that have been already detected) immediately after transmitting the stylus search signal composed of repetition of the detection pattern c1 and the delimiter pattern STP. When receiving the command that represents this setting instruction from the receiver 41, the controller 44 decides the local ID represented by the command as its own local ID and stores the local ID in its own memory 45 in the initial state in which a local ID has not yet been stored in the memory 45. From then on, every time a set of a local ID and a command is supplied from the receiver 41 to the controller 44, the controller 44 determines whether or not the local ID therein corresponds with the local ID stored in the memory 45 and performs processing according to the command included in the set (including the processing of causing the transmitter 46 to transmit the downlink signal DS) only if the local IDs correspond with each other. Furthermore, the controller 44 performs processing of deleting the local ID stored in the memory 45 if a predetermined time has elapsed from the last reception of supply of the set of a local ID and a command. The memory 45 holds the value of the local ID given by the sensor controller 31 only temporarily and therefore may be a volatile memory differently from a global ID storage device 51 to be described later.

In the downlink signal DS, which the transmitter 46 is caused to transmit by the controller 44, a burst signal and a data signal are included as described above. When causing the burst signal to be transmitted, the controller 44 causes the transmitter 46 to transmit an unmodulated carrier signal. On the other hand, when transmitting the data signal, the controller 44 acquires data instructed to be transmitted by a command supplied from the receiver 41 and supplies the data to the transmitter 46 together with the local ID stored in the memory 45. Due to this, the downlink signal DS to be transmitted from the transmitter 46 becomes a signal including the data instructed to be transmitted by the command and the local ID. In the data instructed to be transmitted by the command, data based on the handling state of the stylus 2 at the timing when the command is received, such as data that represents the on-/off-state of the switch 22 and data that represents a writing pressure detected by the writing pressure detecting sensor 23, is included.

The transmitter 46 is a circuit that generates the downlink signal DS according to control by the controller 44 and supplies the downlink signal DS to the electrode 21, and is composed of a modulating circuit 47 and a booster circuit 48.

The modulating circuit 47 is a circuit that generates a carrier signal (for example square wave signal) with a predetermined frequency or a frequency in accordance with control from the controller 44 and outputs the carrier signal as it is or after modulating it based on control by the controller 44. The modulating circuit 47 at the time of transmission of the burst signal outputs the carrier signal as it is without modulation in accordance with an instruction of the controller 44. A signal obtained by modulation with a pattern of known values may be used as the burst signal, and the modulating circuit 47 in this case outputs the carrier signal after modulating it with the above-described pattern of known values. On the other hand, the modulating circuit 47 at the time of transmission of the data signal modulates (on-off-keying (OOK), phase-shift keying (PSK), or the like) the carrier signal based on data supplied from the controller 44 and outputs a modulated signal obtained as the result.

The booster circuit 48 is a circuit that generates the downlink signal DS by boosting the output signal of the modulating circuit 47 to certain amplitude. The downlink signal DS generated by the booster circuit 48 is sent out from the electrode 21 to a space through the switch 40.

FIG. 3 is a diagram depicting the detailed configuration of a second example of the styluses 2a and 2b depicted in FIG. 1. The styluses 2a and 2b depicted in this diagram are different from the styluses 2a and 2b depicted in FIG. 2 in that the core body 20a and the electrode 21 are formed of different members and a six-axis inertial measurement unit (IMU) 50 and the global ID storage device 51 are included in the signal processing circuit 24. In the following, description will be made with focus on the differences from the styluses 2a and 2b depicted in FIG. 2.

The core body 20a according to the present example is formed of an insulating member that forms the pen tip of the stylus 2. The electrode 21 is an electrically-conductive member provided near the tip of the core body 20a. The role of the electrode 21 is the same as the electrode 21 depicted in FIG. 2.

The six-axis IMU 50 is an inertial measurement unit including a three-axis acceleration sensor and a three-axis gyro sensor and is configured to output a value that represents a measurement result to the controller 44.

FIG. 4 is an explanatory diagram of the six-axis IMU 50. FIG. 4A depicts a diagram obtained when the stylus 2a or 2b is viewed from a lateral side and FIG. 4B depicts a section of the stylus 2a or 2b corresponding to line A-A depicted in FIG. 4A.

As depicted in FIG. 4A, the six-axis IMU 50 uses the longitudinal direction of the stylus 2a or 2b as the Z-axis. Furthermore, as depicted in FIG. 4B, the six-axis IMU 50 uses the direction from the center of the section of the stylus 2a or 2b toward the switch 22 as the Y-axis and uses the direction perpendicular to both the Z-axis and the Y-axis as the X-axis. The six-axis IMU 50 acquires the acceleration and angular velocity of the stylus 2a or 2b regarding the direction of each of these axes including X-axis to Z-axis and outputs the acceleration and the angular velocity to the controller 44.

Referring back to FIG. 3, the global ID storage device 51 stores a global ID that is information different for each stylus 2. The global ID is e.g. 64-bit information that represents an identifier of the vendor of the stylus 2, an identification number of the stylus 2 in the vendor, the device type of the stylus 2 (pen type, ruler type, or the like), and so forth. The global ID is written to the global ID storage device 51 at the timing of manufacturing of the stylus 2. As the global ID storage device 51, a non-volatile memory is used differently from the volatile memory 45. The global ID and the local ID are different from each other in that the global ID is an identifier that includes the identifier of the vendor and so forth and is globally unique whereas the local ID is an identifier for the sensor controller 31 to locally identify one of plural styluses 2 that exist in the detection range of the sensor controller 31.

If the styluses 2a and 2b have the configuration depicted in FIG. 3, in the data instructed to be transmitted by the sensor controller 31 with a command signal, the measurement result of the six-axis IMU 50 and the global ID are included in addition to the above-described data based on the handling state of the stylus 2. The controller 44 in the case in which the controller 44 is instructed to transmit the measurement result of the six-axis IMU 50 acquires data that represents the measurement result from the six-axis IMU 50 and supplies the data to the transmitter 46 as data of the transmission target. Similarly, the controller 44 in the case in which the controller 44 is instructed to transmit the global ID reads out the global ID from the global ID storage device 51 and supplies the global ID to the transmitter 46 as data of the transmission target.

Figure 5:
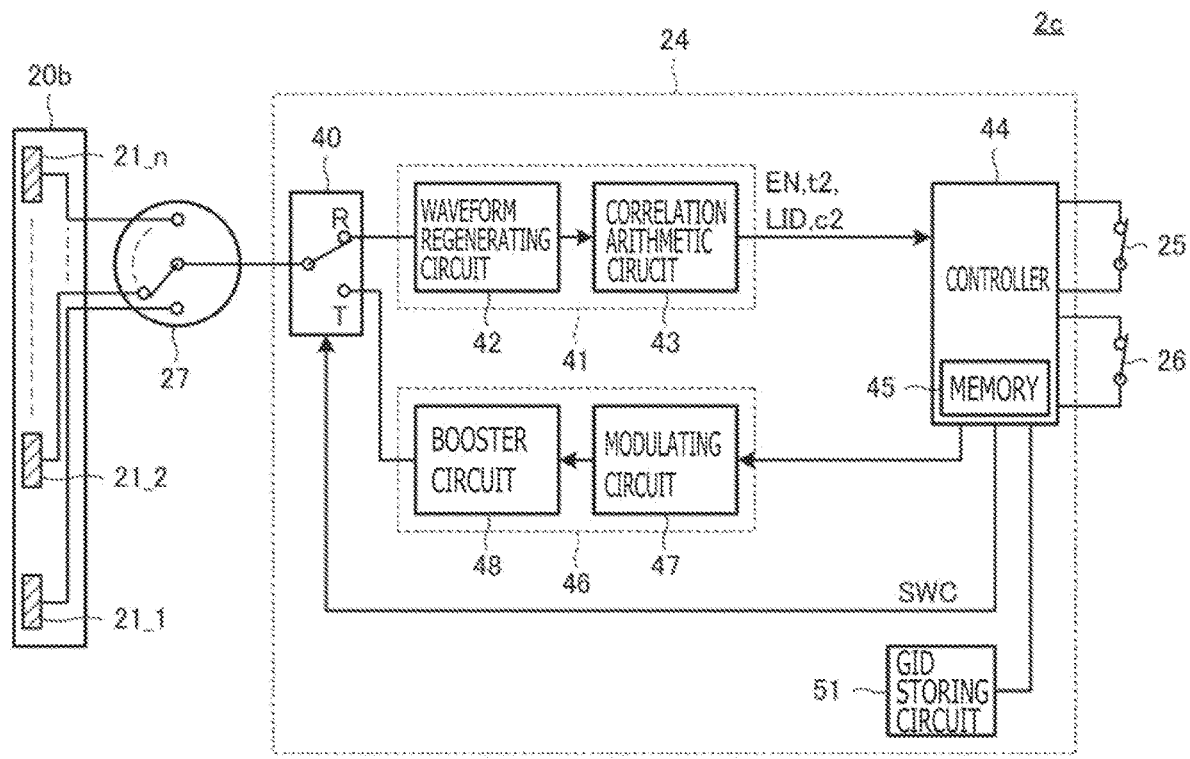
FIG. 5 is a diagram depicting a detailed configuration of a stylus (ruler-type device) depicted in FIG. 1.
Figure 6:
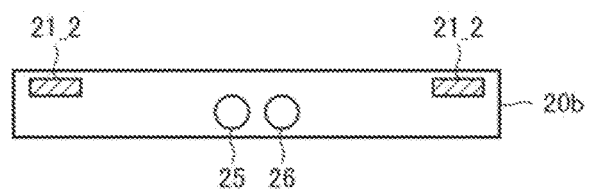
FIG. 6 is a top view of a stylus (ruler-type device) depicted in FIG. 1.

FIG. 5 is a diagram depicting the detailed configuration of the stylus 2c (ruler-type device) depicted in FIG. 1. Furthermore, FIG. 6 is a top view of the stylus 2c. As depicted in these diagrams, the stylus 2c is different from the styluses 2a and 2b depicted in FIG. 3 in that the stylus 2c has a ruler 20b (ruler part) instead of the core body 20a, in that the stylus 2c has n electrodes 21_1 to 21_n, in that the stylus 2c has a switch 27, in that the stylus 2c has two switches 25 and 26 instead of the switch 22 and the writing pressure detecting sensor 23, and in that the stylus 2c does not have the six-axis IMU 50. In the following, description will be made with focus on the differences from the styluses 2a and 2b depicted in FIG. 3.

The ruler 20b is an insulating member having a thin plate shape and is made in imitation of a ruler of stationery. The electrodes 21_1 to 21_n are each an electrically-conductive member having a thin plate shape and are disposed at at least two places at one end and the other end of the ruler 20b in the longitudinal direction. In the example of FIG. 5, three or more electrodes 21 are disposed to be lined at equal intervals inside the ruler 20b from one end to the other end of the ruler 20b in the longitudinal direction along the longitudinal direction of the ruler 20b. Furthermore, in the example of FIG. 6, two electrodes 21 are disposed at one end and the other end, respectively, of the ruler 20b in the longitudinal direction. The electrodes 21_1 to 21_n each play a role as an antenna for transmitting the downlink signal DS and also play a role as an antenna for receiving the uplink signal US transmitted from the sensor controller 31 through the sensor electrode 30 similarly to the electrode 21 depicted in FIG. 2 and FIG. 3. The electrode 21 may be used exclusively for transmission and a receiving electrode may be separately provided. In this case, the receiving electrode may receive the uplink signal US by another proximity wireless communication measure such as Bluetooth (registered trademark) for example.

The switch 27 is a one-circuit-n-contact switch element configured in such a manner that a common terminal is connected to any one of n electrode-side terminals. The common terminal of the switch 27 is connected to the common terminal of the switch 40 and the n electrode-side terminals of the switch 27 are connected to the electrodes 21_1 to 21_n in a one-to-one manner.

The switch 25 (first switch) is a switch for switching whether the stylus 2c is in the working state or in the stop state. Furthermore, the switch 26 (second switch) is a switch for causing the electronic equipment 3 included in the sensor controller 31 to activate predetermined processing such as settlement of a virtual line to be described later. These switches 25 and 26 are provided on the top surface of the ruler 20b, preferably near the center in the longitudinal direction, as exemplified in FIG. 6.

The controller 44 is configured to cause the transmitter 46 to transmit the downlink signal DS every time a command corresponding to the local ID allocated to its own self is supplied from the receiver 41 in the period from pushing of the switch 25 by a user until pressing-down of the switch 26 by the user. At this time, the switch 27 carries out operation of switching the electrode-side terminal as the connection target of the common terminal every time the downlink signal DS is transmitted. Due to this, the downlink signal DS is transmitted from each of the electrodes 21_1 to 21_n in turn.

The sensor controller 31 recognizes the stylus 2c to be a ruler-type device by ordering transmission of the global ID by a command signal and checking the global ID transmitted by the stylus 2c in response thereto. The sensor controller 31 is configured to store plural positions identified based on the downlink signal DS that is sequentially received and display the virtual line X (see FIG. 1) that links them regarding the stylus 2c recognized to be a ruler-type device.

Furthermore, the controller 44 is so configured that, when the user presses down the switch 26 (second switch), data indicating this pressing-down is made to be included in the downlink signal DS and the transmitter 46 is caused to transmit the downlink signal DS. By receiving this data, the sensor controller 31 notifies the electronic equipment controller 33 of data for settling the position of the virtual line X.

The movement velocity of the pen-type stylus 2 like the styluses 2a and 2b while the stylus 2 is being used is high. In contrast, the ruler-type stylus 2 like the stylus 2c is put at the same place for a while once being put on a panel surface and is used at lower movement velocity compared with the pen-type stylus 2 in many cases. Therefore, a high scan rate does not need to be allocated to the ruler-type stylus 2 in many cases. Thus, the sensor controller 31 according to the present embodiment sets the scan rate low regarding the stylus 2 recognized to be a ruler type through a check of the global ID. Details thereof will be described later.

Moreover, differently from the pen-type stylus 2 used while being held with a hand, the ruler-type stylus 2 is used in such a manner as to remain placed on the panel surface even while a user is not operating the ruler-type stylus 2 in some cases. Carrying out transmission and reception of signals between the ruler-type stylus 2 and the sensor controller 31 in such a case increases the power consumption of the ruler-type stylus 2 and consumes communication resources between the sensor controller 31 and the respective styluses 2 even when the ruler-type stylus 2 is not used. Therefore, the stylus 2c according to the present embodiment is configured to allow the user to specify the transmission period of the downlink signal DS by operation of the switches 25 and 26. Due to this, reduction in the power consumption of the stylus 2c and effective use of communication resources in the case in which the stylus 2c is left on the panel surface are implemented.

Figure 7:
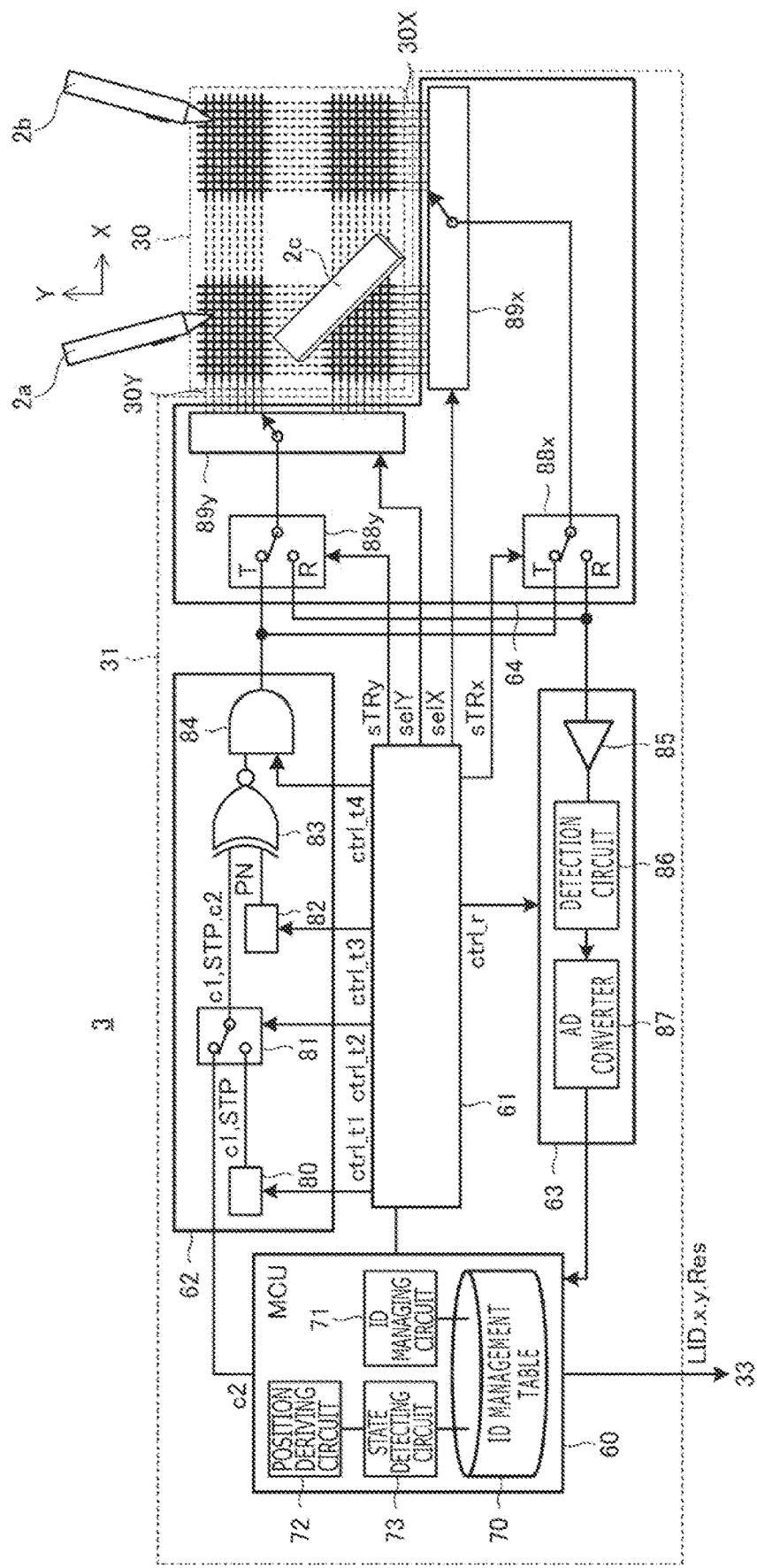
FIG. 7 is a diagram depicting the detailed configuration of electronic equipment depicted in FIG. 1.

Next, FIG. 7 is a diagram depicting the detailed configuration of the electronic equipment 3 depicted in FIG. 1. The configuration and operation of the electronic equipment 3 will be described in detail below with reference to this FIG. 7.

The sensor electrode 30 is composed of plural linear electrodes 30X that each extend in the X-direction and plural linear electrodes 30Y that each extend in the Y-direction. The sensor electrode 30 is configured to be capacitively coupled to the stylus 2 by these linear electrodes 30X and 30Y. The above-described uplink signal US and downlink signal DS are transmitted and received through this capacitive coupling.

As depicted in FIG. 7, the sensor controller 31 is configured to have an MCU 60, a logic circuit 61, a transmitter 62, a receiver 63, and a selection circuit 64.

The MCU 60 and the logic circuit 61 are controllers that control transmission-reception operation of the sensor controller 31 by controlling the transmitter 62, the receiver 63, and the selection circuit 64. Specifically, the MCU 60 is a microprocessor that internally has a read only memory (ROM) and a random access memory (RAM) and operates based on a predetermined program. Meanwhile, the logic circuit 61 is configured to output control signals ctrl_t1 to ctrl_t4 and ctrl_r based on control by the MCU 60.

As depicted in FIG. 7, the MCU 60 internally has a memory that stores an ID management table 70. Furthermore, the MCU 60 is configured to have an ID managing circuit 71, a position deriving circuit 72, and a state detecting circuit 73 functionally.

FIG. 8 is a diagram depicting the ID management table 70. As depicted in this diagram, the ID management table 70 is a table that stores, regarding each local ID, the global ID, the velocity, the present state, the operation state, reset command non-issuance flag 1, reset command non-issuance flag 2, a deletion counter, and a downlink signal transmission schedule.

The ID managing circuit 71 has a function of carrying out registration and deletion of local IDs stored in the ID management table 70. Specifically, the ID managing circuit 71 supplies the control information c2 including a setting instruction of a local ID that has not yet been registered in the ID management table 70 to the transmitter 62 and controls the transmitter 62 to transmit a command signal that represents this control information c2. Then, when the stylus 2 that has received this command signal transmits the downlink signal DS including the ordered local ID, the ID managing circuit 71 receives this downlink signal DS through the receiver 63 and determines whether or not the local ID instructed to be set is included in it. If the result of this determination is the positive result, the ID managing circuit 71 performs processing of registering the value of the local ID in the ID management table 70. As for deletion of a local ID, detailed description will be made later with reference to a flowchart of FIG. 12.

Furthermore, the ID managing circuit 71 also has a function of supplying, to the transmitter 62, the control information c2 including a transmission instruction of various kinds of data other than the local ID (data that represents the on-/off-state of the switch 22 depicted in FIG. 2, data that represents the writing pressure detected by the writing pressure detecting sensor 23 depicted in FIG. 2, data that represents the measurement result of the six-axis IMU 50 depicted in FIG. 3, the global ID stored in the global ID storage device 51 depicted in FIG. 3, and so forth) and controlling the transmitter 62 to transmit a command signal that represents this control information c2. At this time, in the control information c2 supplied to the transmitter 62, the local ID of the stylus 2 as the destination of the transmission instruction is included. As described above, the stylus 2 is so configured that, only when the local ID included in the received command signal corresponds with the local ID allocated to its own self, the stylus 2 transmits the downlink signal DS including the local ID and data instructed to be transmitted by a command. When receiving the downlink signal transmitted in this manner through the receiver 63, the ID managing circuit 71 performs processing of detecting the local ID and the data included in it. Then, the ID managing circuit 71 reports, to the electronic equipment controller 33 (see FIG. 1), the detected local ID and data (in FIG. 7, represented as Res (that means response data)) together with coordinates x and y derived by the position deriving circuit 72 to be described later. Furthermore, if a global ID is included in the detected data, the ID managing circuit 71 also performs processing of writing the global ID to the ID management table 70.

Moreover, the ID managing circuit 71 also has a function of deciding the transmission schedule of the downlink signal DS and writing the transmission schedule to the ID management table 70 regarding each of one or more local IDs stored in the ID management table 70. This transmission schedule is composed of two kinds of parameters, the transmission frequency (scan rate) of the downlink signal DS and the transmission continuation time of the downlink signal DS. By default, the ID managing circuit 71 sets each of items including the scan rate and the transmission continuation time of the downlink signal DS to an equal value regarding all local IDs registered in the ID management table 70.

Here, it is thought to suffice that the scan rate given to the ruler-type stylus 2 is a smaller value compared with the pen-type stylus 2. This is because, in the ruler-type stylus 2, movement on a panel surface is thought to be less compared with the pen-type stylus 2. For a similar reason, also regarding the stylus 2 depicted to be not in active motion actually based on the movement velocity (what is calculated by the state detecting circuit 73) to be described later, a lower scan rate is thought to be enough compared with the stylus 2 depicted to be in active motion. Furthermore, the transmission continuation times of the downlink signal DS according to the respective styluses 2 differ depending on the specifications of the respective styluses 2. For example, the stylus 2 of a certain vendor is configured to continue transmission of the downlink signal DS for a double time compared with the stylus 2 of another vendor.

Therefore, if the ID managing circuit 71 can acquire the global ID (device type) or the movement velocity of the stylus 2, the ID managing circuit 71 decides the optimum scan rate and transmission continuation time of the downlink signal DS for each stylus 2 based on them and carries out readjustment of the transmission schedule of the downlink signal DS based on the result thereof. To cite a concrete example, the ID managing circuit 71 decides the scan rate about each of one or more local IDs stored in the ID management table 70 in such a manner that the scan rate becomes higher when the movement velocity is higher, and writes the scan rate to the ID management table 70. Furthermore, in another example, the ID managing circuit 71 decides the transmission continuation time of the downlink signal DS of each stylus 2 based on the device type of each stylus 2 and writes the transmission continuation time to the ID management table 70. This readjustment will be described in more detail later with reference to FIG. 23 and FIG. 24.

The transmission schedule of the downlink signal DS written to the ID management table 70 is implemented through control, by the ID managing circuit 71, of the transmission frequency of the command signal addressed to each local ID and the transmission interval of the command signal. Specifically, the ID managing circuit 71 implements the scan rate set in the ID management table 70 by controlling the transmission frequency of the command signal addressed to each local ID. For example, if two local IDs #1 and #2 are set in the ID management table 70 and the respective scan rates are both ½, the ID managing circuit 71 alternately transmits command signals addressed to a respective one of local IDs #1 and #2. Furthermore, if two local IDs #1 and #2 are set in the ID management table 70 and the scan rate of local ID #1 is ¼ and the scan rate of local ID #2 is ¾, the ID managing circuit 71 transmits the command signal at such a frequency that the ID managing circuit 71 transmits a command signal addressed to local ID #1 one time and then transmits a command signal addressed to local ID #2 three times. Moreover, the ID managing circuit 71 implements the transmission continuation time of the downlink signal DS set in the ID management table 70 by controlling the transmission interval of the command signal. Specifically, because the sensor controller 31 receives the downlink signal DS during the transmission interval of the command signal, the time of continuation of detection operation of the downlink signal DS becomes longer when the transmission interval of the command signal is set longer for example. Therefore, a long transmission continuation time of the downlink signal DS can be ensured. The sensor controller 31 decides the polling schedule of issuance of the uplink signals US that are transmission request commands including the respective IDs in such a manner that the downlink signal DS is transmitted from each stylus 2 in a form that matches such a transmission schedule of the downlink signal DS. In accordance with this polling schedule, the uplink signals US including the respective local IDs are transmitted.

The position deriving circuit 72 acquires the reception intensity of the downlink signal DS at each of the respective plural linear electrodes 30X and 30Y based on a digital signal supplied from the receiver 63, and performs processing of deriving coordinates x and y that represent the position of the stylus 2 based on the result.

The state detecting circuit 73 performs processing of calculating the movement velocity of each stylus 2 from change in the position derived by the position deriving circuit 72 regarding each local ID and writing the movement velocity to the ID management table 70. Furthermore, the state detecting circuit 73 performs processing of, regarding each local ID, determining whether or not the downlink signal DS as a response to the uplink signal US has been received, and if the downlink signal DS has been received, determining whether the value of the writing pressure included in it is 0 or is larger than 0, and writing the result to the ID management table 70 as the present state of the stylus 2. Specifically, as depicted in FIG. 8, a value that represents "reply to uplink signal is absent" is written about the local ID regarding which the downlink signal DS as a response to the uplink signal US has not been received. A value that represents "pen-down state" is written about the local ID regarding which the downlink signal DS as a response to the uplink signal US has been received. A value that represents "writing pressure=0" is further written about the local ID regarding which the value of the writing pressure is 0. A value that represents "writing pressure>0" is further written about the local ID regarding which the value of the writing pressure is larger than 0.

Furthermore, the state detecting circuit 73 performs processing of, regarding each local ID, acquiring the operation state, reset command non-issuance flag 1, reset command non-issuance flag 2, and the deletion counter and writing them to the ID management table 70. Details of them will be described more specifically later with reference to processing flowcharts of the sensor controller 31.

The transmitter 62 is a circuit that generates the uplink signal US in accordance with control by the MCU 60 and the logic circuit 61. As depicted in FIG. 7, the transmitter 62 is configured to include a pattern supply circuit 80, a switch 81, a code sequence holding circuit 82, a spreading processing circuit 83, and a transmission guard circuit 84. Particularly regarding the pattern supply circuit 80 among them, description will be made based on the assumption that it is included in the transmitter 62 in the present embodiment. However, the pattern supply circuit 80 may be included in the MCU 60.

In the uplink signal US, two kinds of signals, the stylus search signal and the command signal, are included as described above. Furthermore, the stylus search signal of them is composed of repetition of the predetermined detection pattern c1 and the predetermined delimiter pattern STP disposed at the tail end.

The detection pattern c1 is a pattern of the values of symbols used for detection of the existence of the sensor controller 31 by the stylus 2 and is made known to the stylus 2 in advance (before the stylus 2 detects the sensor controller 31). The symbol is the unit of information used for modulation in transmission processing (unit of information expressed by a transmission signal) and is the unit of information obtained by demodulating one symbol that is a received signal in reception processing. The value of the system can include a value converted to a bit sequence (hereinafter, referred to as "bit sequence corresponding value") and a value that is not converted to a bit sequence by the stylus 2 that has received the symbol (hereinafter, referred to as "bit sequence non-corresponding value"). In a concrete example, the detection pattern c1 is formed of a pattern "PM" arising from coupling of two kinds of bit sequence non-corresponding values "P" and "M."

The delimiter pattern STP is a pattern of the values of the symbols for notifying the stylus 2 of the end of the repetition period of the detection pattern c1 and is formed of a pattern that does not appear in the repetition of the detection pattern c1. The delimiter pattern STP is also made known to the stylus 2 in advance (before the stylus 2 detects the sensor controller 31). To cite one example, in the case of forming the detection pattern c1 by "PM," a coupling of two bit sequence non-corresponding values "P" and "M," as described above, the delimiter pattern STP can be formed of a pattern "PP" obtained by continuing the bit sequence non-corresponding value "P" twice. By interchanging the configurations of the delimiter pattern STP and the detection pattern c1, the delimiter pattern may be formed by "PM" and the detection pattern c1 may be formed by "PP."

The pattern supply circuit 80 holds the detection pattern c1 and the delimiter pattern STP and is configured to output them in predetermined order in accordance with an instruction of the control signal ctrl_t1 supplied from the logic circuit 61. Specifically, the pattern supply circuit 80 is configured to repeatedly output the detection pattern c1 continuously during a predetermined continuous transmission period and output the delimiter pattern STP immediately after the end of the continuous transmission period. Due to this, transmission of the stylus search signal is implemented.

The switch 81 has a function of selecting either one of the pattern supply circuit 80 and the MCU 60 based on the control signal ctrl_t2 supplied from the logic circuit 61 and supplying the selected one output to the spreading processing circuit 83. If the switch 81 selects the pattern supply circuit 80, the detection pattern c1 or the delimiter pattern STP is supplied from the pattern supply circuit 80 to the spreading processing circuit 83. On the other hand, if the switch 81 selects the MCU 60, the control information c2 is supplied from the MCU 60 to the spreading processing circuit 83.

The control information c2 is information including a setting instruction of a local ID or a transmission instruction of various kinds of data other than the local ID as described above. The control information c2 is different from the detection pattern c1 and the delimiter pattern STP in that the value thereof is not shared with the stylus 2 in advance. The control information c2 is transmitted in such a manner as to be associated with the values (for example 0 to 15) of symbols associated with a bit sequence for example.

The code sequence holding circuit 82 has a function of generating and holding a spreading code PN with a predetermined chip length having autocorrelation characteristics based on the control signal ctrl_t3 supplied from the logic circuit 61. The spreading code PN held by the code sequence holding circuit 82 is supplied to the spreading processing circuit 83.

The spreading processing circuit 83 has a function of obtaining a transmission chip sequence with a predetermined chip length by modulating the spreading code PN held by the code sequence holding circuit 82 based on the values of the symbols supplied through the switch 81 (detection pattern c1, delimiter pattern STP, or control information c2). The spreading processing circuit 83 is configured to supply the acquired transmission chip sequence to the transmission guard circuit 84.

The transmission guard circuit 84 has a function of inserting a guard period necessary for switching between transmission operation and reception operation (period during which neither transmission nor reception is carried out) between the transmission period of the uplink signal US and the reception period of the downlink signal DS based on the control signal ctrl_t4 supplied from the logic circuit 61.

The receiver 63 is a circuit for receiving the downlink signal DS transmitted by the stylus 2 based on the control signal ctrl_r of the logic circuit 61. Specifically, the receiver 63 is configured to include an amplification circuit 85, a detection circuit 86, and an analog-digital (AD) converter 87.

The amplification circuit 85 amplifies and outputs the downlink signal DS supplied from the selection circuit 64. The detection circuit 86 is a circuit that generates a voltage corresponding to the level of the output signal of the amplification circuit 85. The AD converter 87 is a circuit that generates a digital signal by sampling the voltage output from the detection circuit 86 at predetermined time intervals. The digital signal output by the AD converter 87 is supplied to the MCU 60. The MCU 60 acquires data (local ID, global ID, writing pressure, and so forth) transmitted by the stylus 2 based on the digital signal supplied in this manner.

The selection circuit 64 is configured to include switches 88$x$ and 88$y$ and conductor selecting circuits 89$x$ and 89$y$.

The switches 88$x$ and 88$y$ are each a one-circuit-two-contact switch element configured in such a manner that a common terminal is connected to either one of a T-terminal and an R-terminal. The common terminal of the switch 88$x$ is connected to the conductor selecting circuit 89$x$ and the T-terminal is connected to the output terminal of the transmitter 62 and the R-terminal is connected to the input terminal of the receiver 63. Furthermore, the common terminal of the switch 88$y$ is connected to the conductor selecting circuit 89$y$ and the T-terminal is connected to the output terminal of the transmitter 62 and the R-terminal is connected to the input terminal of the receiver 63.

The conductor selecting circuit 89$x$ is a switch element for selectively connecting the plural linear electrodes 30X to the common terminal of the switch 88$x$. The conductor selecting circuit 89$x$ is configured to be also capable of simultaneously connecting part or all of the plural linear electrodes 30X to the common terminal of the switch 88$x$.

The conductor selecting circuit 89$y$ is a switch element for selectively connecting the plural linear electrodes 30Y to the common terminal of the switch 88$y$. The conductor selecting circuit 89$y$ is also configured to be also capable of simultaneously connecting part or all of the plural linear electrodes 30Y to the common terminal of the switch 88$y$.

To the selection circuit 64, four control signals sTRx, sTRy, selX, and selY are supplied from the logic circuit 61. Specifically, the control signals sTRx, sTRy, selX, and selY are supplied to the switch 88$x$, the switch 88$y$, the conductor selecting circuit 89$x$, and the conductor selecting circuit 89$y$, respectively. The logic circuit 61 implements transmission of the uplink signal US including the stylus search signal and the command signal and reception of the downlink signal DS including the burst signal and the data signal by controlling the selection circuit 64 by using these control signals sTRx, sTRy, selX, and selY.

More specifically, in the case of transmitting the stylus search signal, the logic circuit 61 controls the selection circuit 64 in such a manner that all of the plural linear electrodes 30Y (or all of the plural linear electrodes 30X) are connected to the output terminal of the transmitter 62. Furthermore, in the case of transmitting the command signal, the logic circuit 61 controls the selection circuit 64 in such a manner that a predetermined number of electrodes that exist near a position derived at the last minute regarding the stylus 2 of the transmission target among the respective plural linear electrodes 30X and 30Y are connected to the output terminal of the transmitter 62.

The logic circuit 61 in the case of receiving the burst signal controls the selection circuit 64 in such a manner that all of the respective plural linear electrodes 30X and 30Y are sequentially connected to the input terminal of the receiver 63 while the transmission of the burst signal is continuing. This allows the MCU 60 to acquire the reception intensity of the burst signal at each of the respective plural linear electrodes 30X and 30Y and thus it becomes possible to derive the position of the stylus 2 as described above. On the other hand, the logic circuit 61 in the case of receiving the data signal controls the selection circuit 64 in such a manner that only one electrode closest to a position derived by the immediately-previous burst signal regarding the stylus 2 that transmits the data signal among the respective plural linear electrodes 30X and 30Y is connected to the input terminal of the receiver 63. This makes it possible to fully utilize the transmission time of the data signal for sending data from the stylus 2 to the sensor controller 31.

The configurations and operation of the stylus 2 and the electronic equipment 3 that form the position detecting system 1 are described in detail above. Next, operation of the stylus 2 and the sensor controller 31 relating to the present disclosure will be described in more detail with reference to flowcharts of processing performed by the stylus 2 and the sensor controller 31.

FIG. 9 to FIG. 15 are flowcharts depicting processing flows of the sensor controller 31. Furthermore, FIG. 16 to FIG. 20 are flowcharts depicting processing flows of the stylus 2. Moreover, FIG. 21 to FIG. 24 and FIG. 26 to FIG. 29 are time charts depicting signals transmitted and received between one or two of the styluses 2a to 2c and the sensor controller 31. Furthermore, FIG. 25 is an explanatory diagram of cancellation of registration of a local ID by the sensor controller 31 and the stylus 2a. In the following, description will be made with reference to these diagrams.

Figure 9:
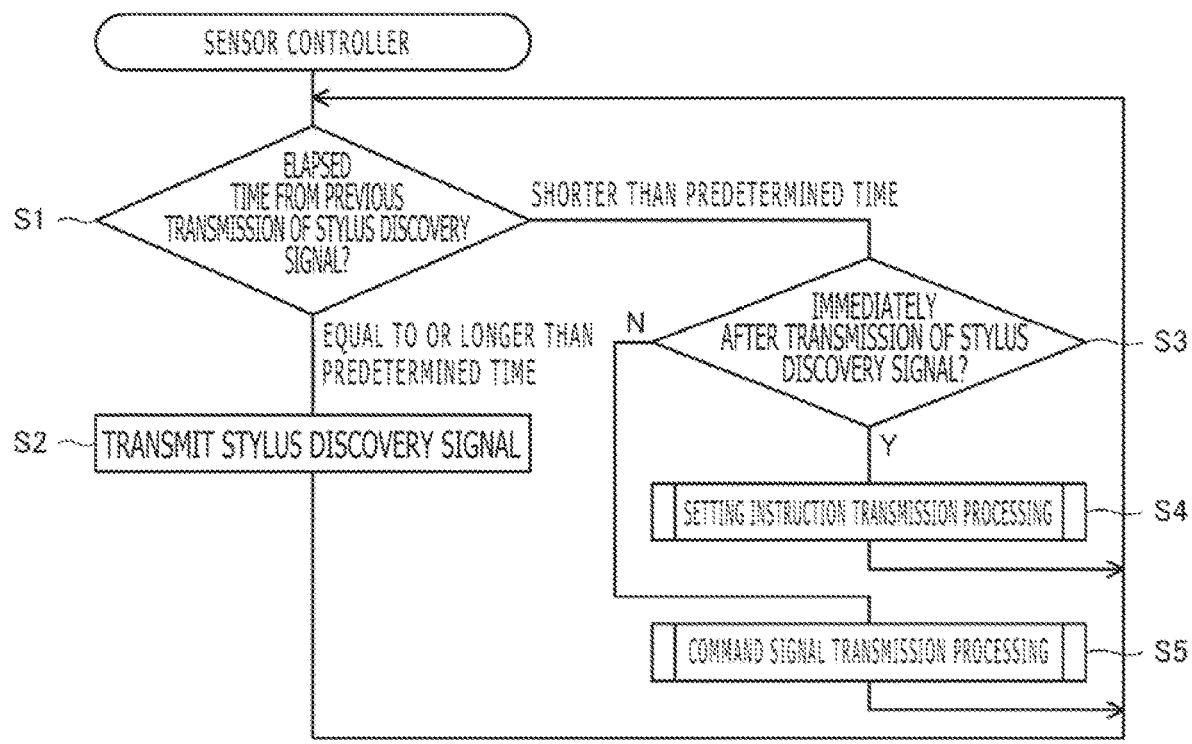
FIG. 9 is a flowchart depicting a processing flow of a sensor controller depicted in FIG. 1.

First, as depicted in FIG. 9, the sensor controller 31 determines whether the elapsed time from the previous transmission of the stylus search signal is equal to or longer than a predetermined time or is shorter than the predetermined time (S1). The sensor controller 31 needs to transmit the stylus search signal every predetermined time for detecting the stylus 2 that has not been detected, and determines whether or not the transmission timing of this stylus search signal has come at S1.

Figure 21:
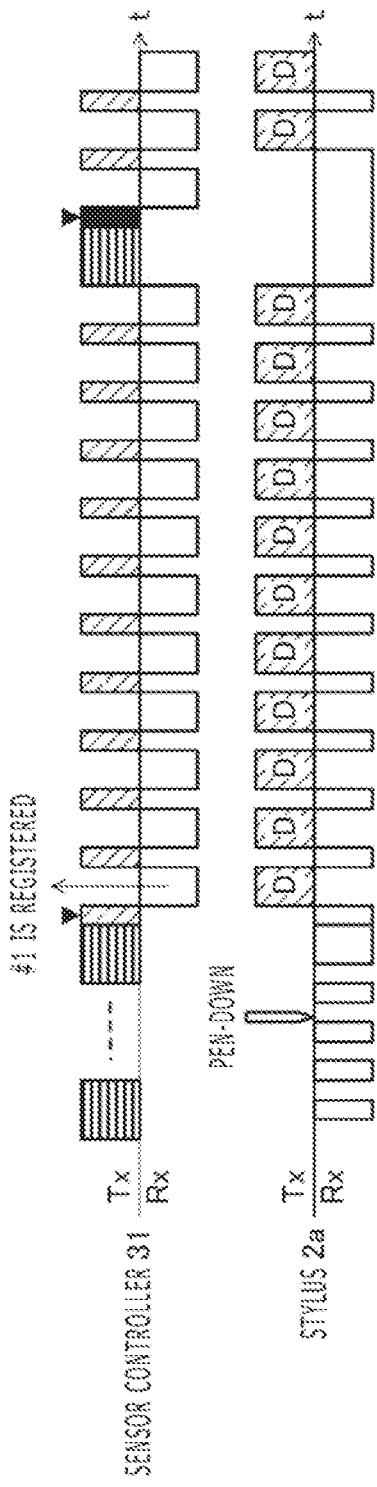
FIG. 21 is a timing chart depicting signals transmitted and received between the stylus and the sensor controller depicted in FIG. 1 (scene in which the sensor controller newly registers the stylus)

If determining at S1 that the elapsed time is equal to or longer than the predetermined time, the sensor controller 31 transmits the stylus search signal (S2). In FIG. 21, the stylus search signal transmitted from the sensor controller 31 every predetermined time in this manner is diagrammatically represented. After transmitting the stylus search signal, the sensor controller 31 returns the processing to S1.

If determining at S1 that the elapsed time is shorter than the predetermined time, the sensor controller 31 determines whether or not the present timing is immediately after transmission of the stylus search signal (S3). As a result, the sensor controller 31 performs setting instruction transmission processing if determining that the present timing is immediately after transmission (S4), and performs command signal transmission processing if determining that the present timing is not immediately after transmission (S5). If information of the command of the setting instruction can be made to be included in the stylus search signal, S4 and S5 may be deemed as one processing.

In FIG. 10, details of the setting instruction transmission processing are depicted. As depicted in this diagram, at first, the sensor controller 31 that has started the setting instruction transmission processing decides a local ID #n of the setting target based on the registration status of the local ID (S10). The check of the registration status of the local ID is carried out by referring to the ID management table 70 depicted in FIG. 8. Subsequently, the sensor controller 31 transmits a command signal that represents a setting instruction of the decided local ID #n (S11). As depicted in FIG. 21, this command signal is continuously carried out from the transmission of the stylus search signal.

Next, the sensor controller 31 carries out reception operation of the downlink signal DS (S12) and determines whether or not the downlink signal DS including the local ID #n has been received (S13). In this case, the sensor controller 31 decodes a data signal in the downlink signal DS to check whether or not the downlink signal DS includes the local ID #n. This point is the same also in reception determination in another act to be described later.

If determining at S13 that the downlink signal DS including the local ID #n has not been received, the sensor controller 31 ends the setting instruction transmission processing without executing further particular processing and returns to S1 in FIG. 9.

On the other hand, if determining at S13 that the downlink signal DS including the local ID #n has been received only at one place in the panel surface, the sensor controller 31 registers the local ID #n in the ID management table 70 (S14).

In FIG. 21, a scene in which the sensor controller 31 newly registers the stylus 2a is depicted. The initial state of this diagram is the state in which no local ID is registered in the ID management table 70. The stylus 2a that has received the stylus search signal due to pen-down receives a command signal that represents a setting instruction of a local ID #1 subsequently. Then, the stylus 2a transmits the downlink signal DS including the local ID #1 in response to this command signal. In response to receiving this downlink signal DS, the sensor controller 31 registers the local ID #1 in the ID management table 70.

Figure 22:
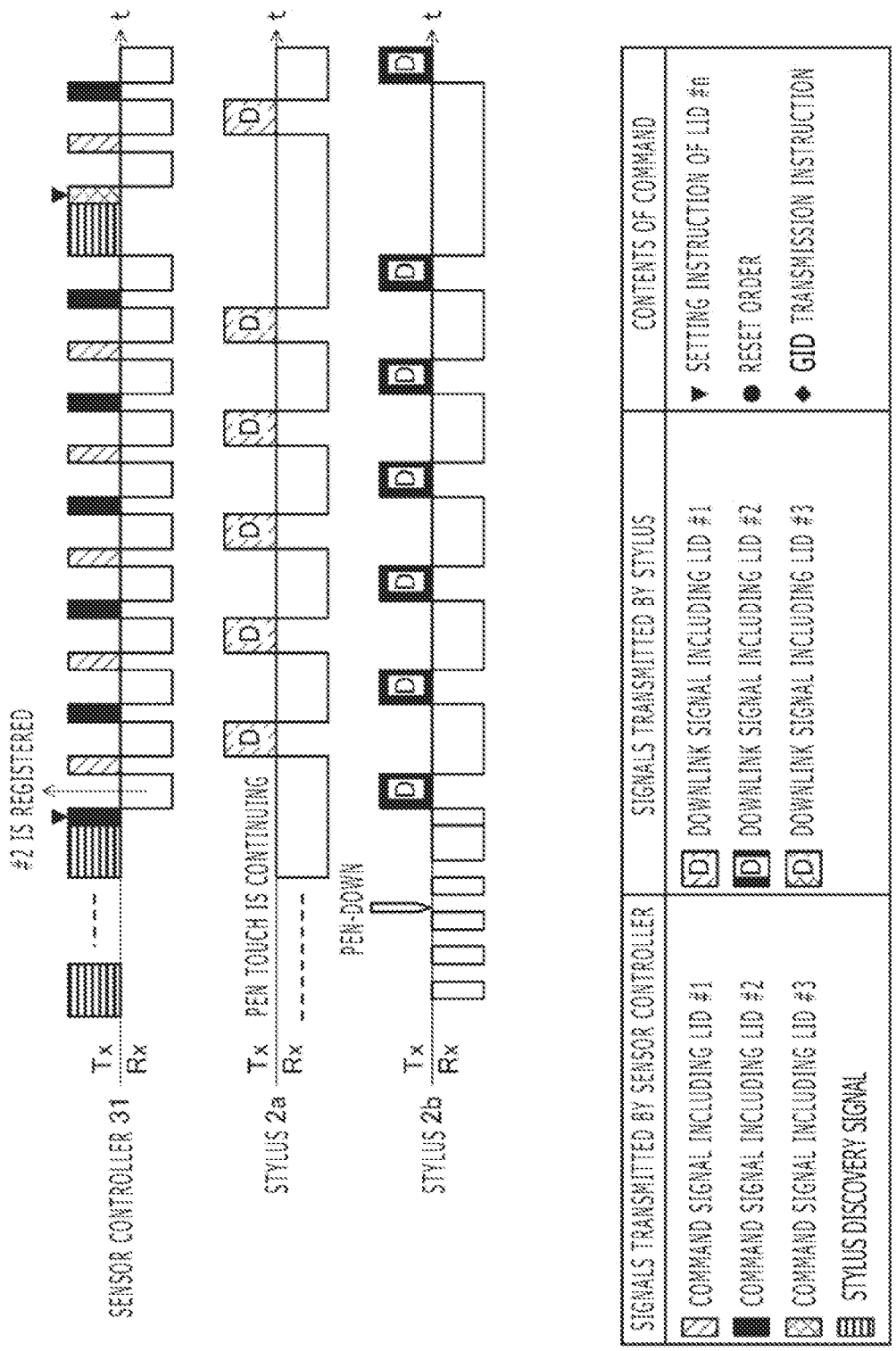
FIG. 22 is a timing chart depicting signals transmitted and received between the styluses and the sensor controller depicted in FIG. 1 (scene in which the sensor controller further registers the other stylus after registering the stylus)

In FIG. 22, a scene in which the sensor controller 31 registers the stylus 2a and thereafter further registers the stylus 2b is depicted. The initial state of this diagram is the state in which the stylus 2a has been registered in FIG. 21 (state in which the local ID #1 has been allocated to the stylus 2a). Because the local ID #1 has been already registered in the ID management table 70, the command signal transmitted by the sensor controller 31 subsequently to the stylus search signal is a command signal that represents a setting instruction of a local ID #2. The stylus 2b that has received the stylus search signal due to pen-down receives the command signal that represents the setting instruction of the local ID #2 subsequently. Then, the stylus 2a transmits the downlink signal DS including the local ID #2 in response to this command signal. In response to receiving this downlink signal DS, the sensor controller 31 registers the local ID #2 in the ID management table 70.

Referring back to FIG. 10, the sensor controller 31 that has registered the local ID #n in the ID management table 70 at S14 derives the position of the stylus 2 based on a burst signal in the received downlink signal DS (S15). Furthermore, if a data signal in the downlink signal DS includes data other than the local ID #n, the sensor controller 31 extracts the data (S16).

Moreover, in order to give opportunities for transmission of the downlink signal DS to the stylus 2 corresponding to the newly-registered local ID #n, the sensor controller 31 readjusts the transmission schedule of the downlink signal DS and updates the ID management table 70 based on the result thereof (S17).

Referring to FIG. 21 and FIG. 22 again, in the state of FIG. 21 in which only the local ID #1 is registered, all command signals excluding the command signal immediately after the stylus search signal are signals addressed to the local ID #1 (stylus 2a). That is, the scan rate of the stylus 2a is set to 1.

When the local ID #2 is newly registered as depicted in FIG. 22, the sensor controller 31 needs to give opportunities for transmission of the downlink signal DS also to the local ID #2 (stylus 2b). Therefore, in the example of FIG. 22, the local ID #1 and the local ID #2 are given the scan rate of the same value (=½) to allow the styluses 2a and 2b to alternately transmit the downlink signal DS. As above, by default (state before the scan rates are decided based on the global ID or the movement velocity of the stylus 2), the sensor controller 31 decides the scan rate about each of one or more styluses that have been already detected in such a manner that the scan rates about the respective one of the one or more styluses that have been already detected are equal to each other.

The readjustment of the transmission schedule at S17 in FIG. 10 is carried out in order to give opportunities for transmission of the downlink signal DS to the newly-registered stylus 2 as in this example depicted in FIG. 22. After the end of S17, the sensor controller 31 ends the setting instruction transmission processing and returns to S1 in FIG. 9.

If determining at S13 that the downlink signal DS including the local ID #n has been received at plural places in the panel surface, the sensor controller 31 sets the value of the operation state of the local ID #n to "first reset mode" in the ID management table 70 (S18) and sets "TRUE" in reset command non-issuance flag 1 of the local ID #n (S19). The first reset mode is an operation mode for temporarily cancelling allocation of the local ID #n immediately after transmission of a command signal that represents a setting instruction of the local ID #n as exemplified in FIG. 26. Reset command non-issuance flag 1 is binary flag information that becomes "TRUE" when the reset order that should be transmitted in the first reset mode has not yet been transmitted and becomes "FALSE" in the other case. Detailed contents of reset processing in which they are used will be described later with reference to FIG. 13 and FIG. 14. After the end of S19, the sensor controller 31 ends the setting instruction transmission processing and returns to S1 in FIG. 9.

Next, in FIG. 11, details of the command signal transmission processing are depicted. As depicted in this diagram, first the sensor controller 31 that has started the command signal transmission processing decides (selects) a local ID #k as the transmission target of a command signal based on the transmission schedule of each local ID registered in the ID management table 70 (S20). Specifically, the sensor controller 31 decides (selects) the local ID #k as the transmission target of a command signal based on the scan rate that has been already decided regarding each local ID. Then, by referring to the value of the operation state in the ID management table 70 again, the sensor controller 31 determines which of "normal mode," "first reset mode," and "second reset mode" the value of the operation state of the local ID #k is (S21).

Figure 12:
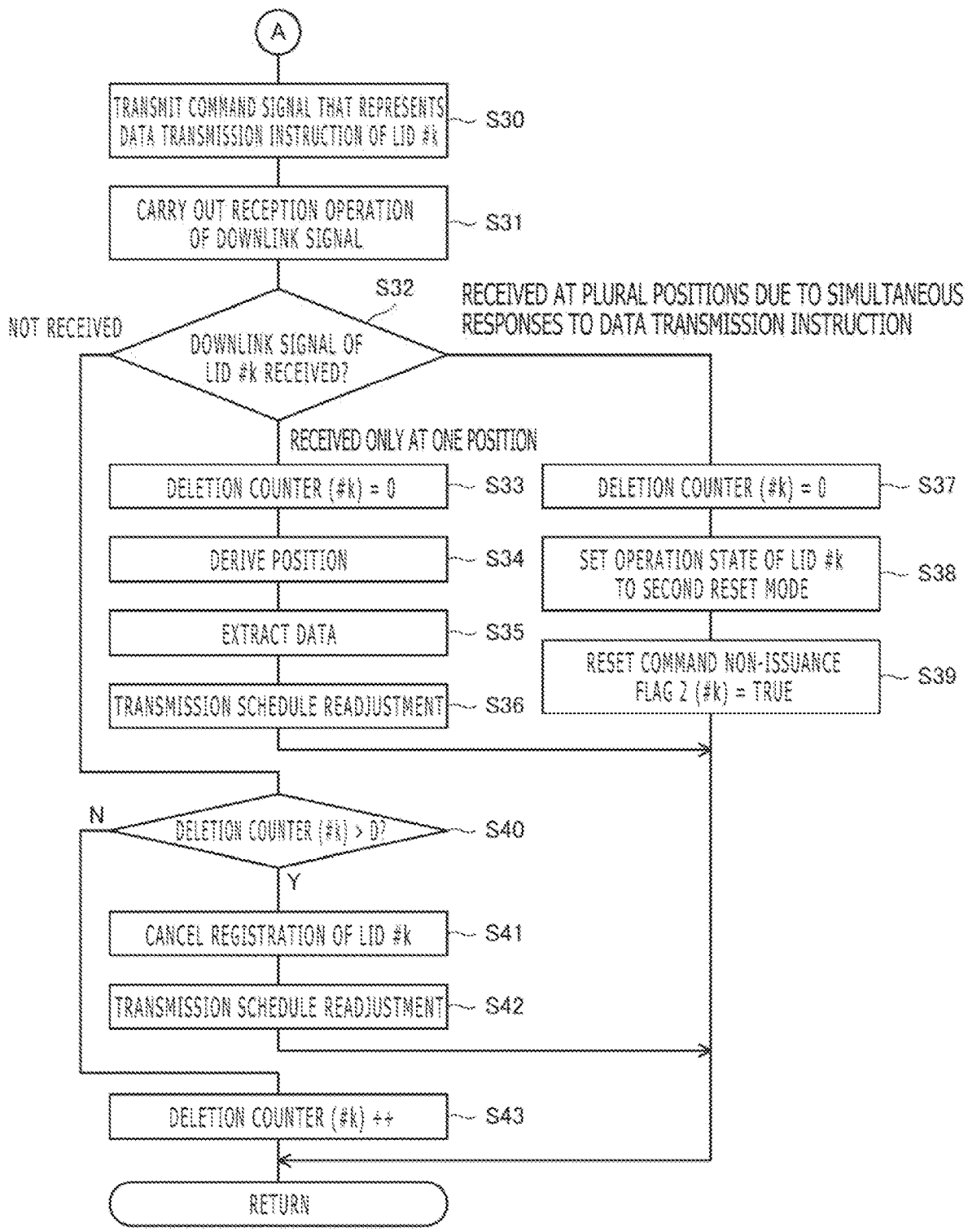
FIG. 12 is a flowchart depicting the detailed flow of the command signal transmission processing depicted in FIG. 9.

In FIG. 12, processing in the case in which the sensor controller 31 has determined at S21 that the operation state of the local ID #k is the "normal mode" is depicted. As depicted in this diagram, first the sensor controller 31 in this case transmits a command signal that represents a data transmission instruction to the stylus 2 identified based on the local ID #k (S30). The data instructed to be transmitted here is for example data that represents the handling state at the timing when the command signal that represents the data transmission instruction is received, such as data that represents the on-/off-state of the switch 22 depicted in FIG. 2, data that represents the writing pressure detected by the writing pressure detecting sensor 23 depicted in FIG. 2, and data that represents the measurement result of the six-axis IMU 50 depicted in FIG. 3, and a global ID stored in the global ID storage device 51 depicted in FIG. 3, and so forth.

The sensor controller 31 that has transmitted the command signal at S30 subsequently carries out reception operation of the downlink signal DS (S31) and determines whether or not the downlink signal DS including the local ID #k has been received (S32).

If determining at S32 that the downlink signal DS including the local ID #k has been received only at one place in the panel surface, first the sensor controller 31 sets 0 in the deletion counter of the local ID #k in the ID management table 70 (S33). The deletion counter is a counter that represents the number of times of failure in reception of the downlink signal DS in spite of trial of the reception and is provided for each local ID. The deletion counter is reset to 0 if the downlink signal DS including the corresponding local ID #k is received. If the deletion counter of the local ID #k is 0, cancellation of registration of the local ID #k is not carried out.

Next, the sensor controller 31 derives the position of the stylus 2 based on a burst signal in the received downlink signal DS (S34) and extracts data included in a data signal in the downlink signal DS (S35). Moreover, the sensor controller 31 readjusts the transmission schedule (S36).

Figure 23:
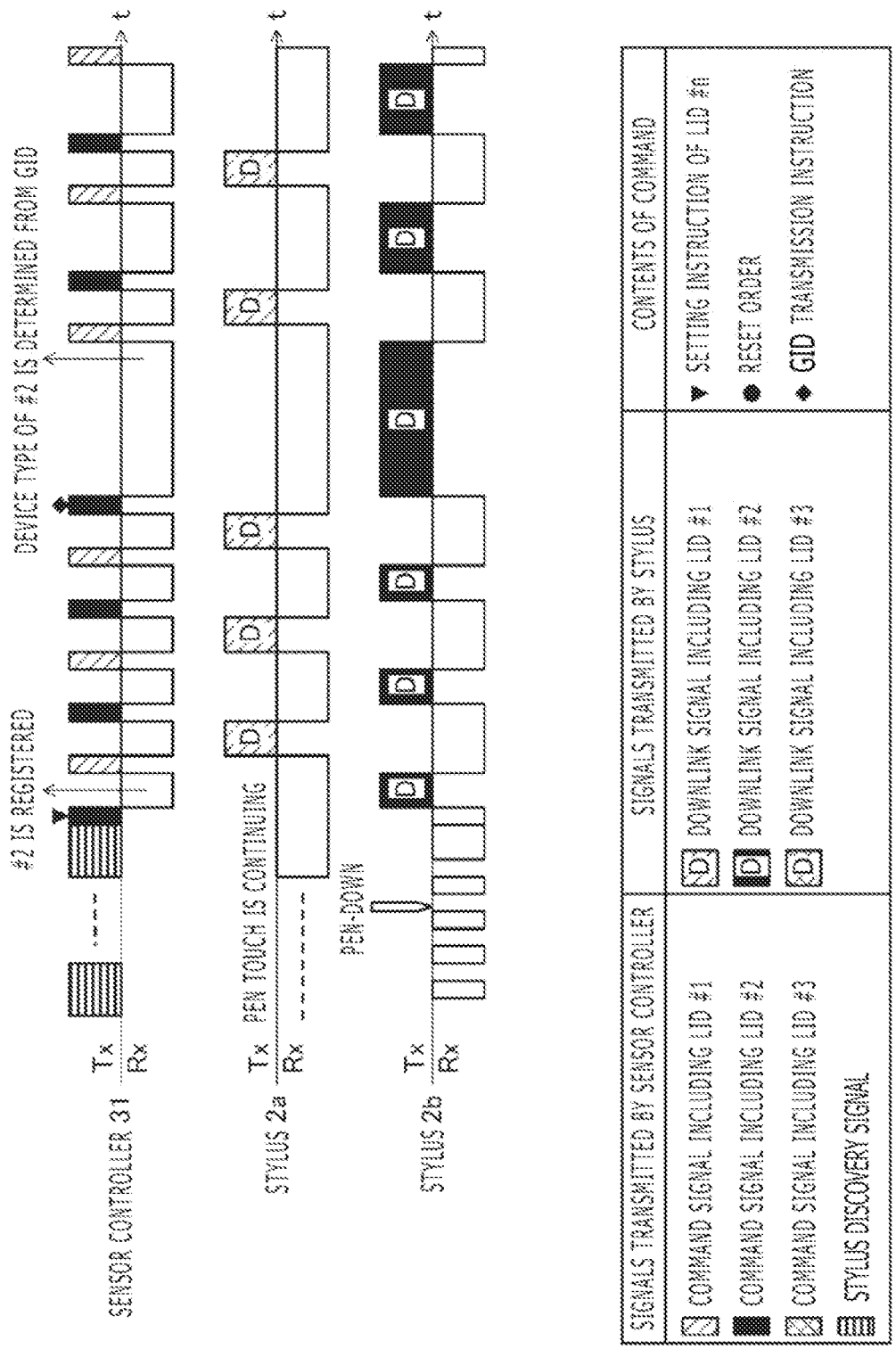
FIG. 23 is a timing chart depicting signals transmitted and received between the styluses and the sensor controller depicted in FIG. 1 (scene in which the sensor controller readjusts the transmission schedule based on the device type of each of the styluses)

In FIG. 23, one example of the readjustment of the transmission schedule carried out at S36 is depicted. In this example, the styluses 2a and 2b simultaneously exist on the panel surface and the local IDs #1 and #2 are given to the styluses 2a and 2b, respectively. Furthermore, the transmission continuation time of the downlink signal DS by the stylus 2b (local ID #2) is set to two times the default value. The sensor controller 31 receives a global ID from the stylus 2b and determines the device type of the stylus 2b based on the received global ID. Then, from the determination result, the sensor controller 31 understands the fact that the transmission continuation time of the downlink signal DS by the stylus 2b is two times the default value. Based on the fact understood in this manner, the sensor controller 31 decides the transmission schedule of the downlink signal DS of each local ID in such a manner that the transmission continuation time of the downlink signal DS by the stylus 2b becomes two times the default value, and sets the transmission schedule in the ID management table 70. Then, from then on, the sensor controller 31 controls the transmission interval of the command signal in such a manner that the continuation period of reception operation in the case of receiving the downlink signal DS from the stylus 2b becomes two times the default value.

Here, in FIG. 23, the reception operation continuation time of the sensor controller 31 when the global ID is received is longer than usual. This is because the global ID is data with as large a size as 64 bits as described above. In order to receive the global ID, which is large data as above, the sensor controller 31 extends the continuation period of reception operation carried out after transmission of a command signal that represents a transmission instruction of the global ID according to the size of the global ID. The adjustment of this reception operation continuation period is operation carried out separately from the readjustment of the transmission schedule.

Figure 24:
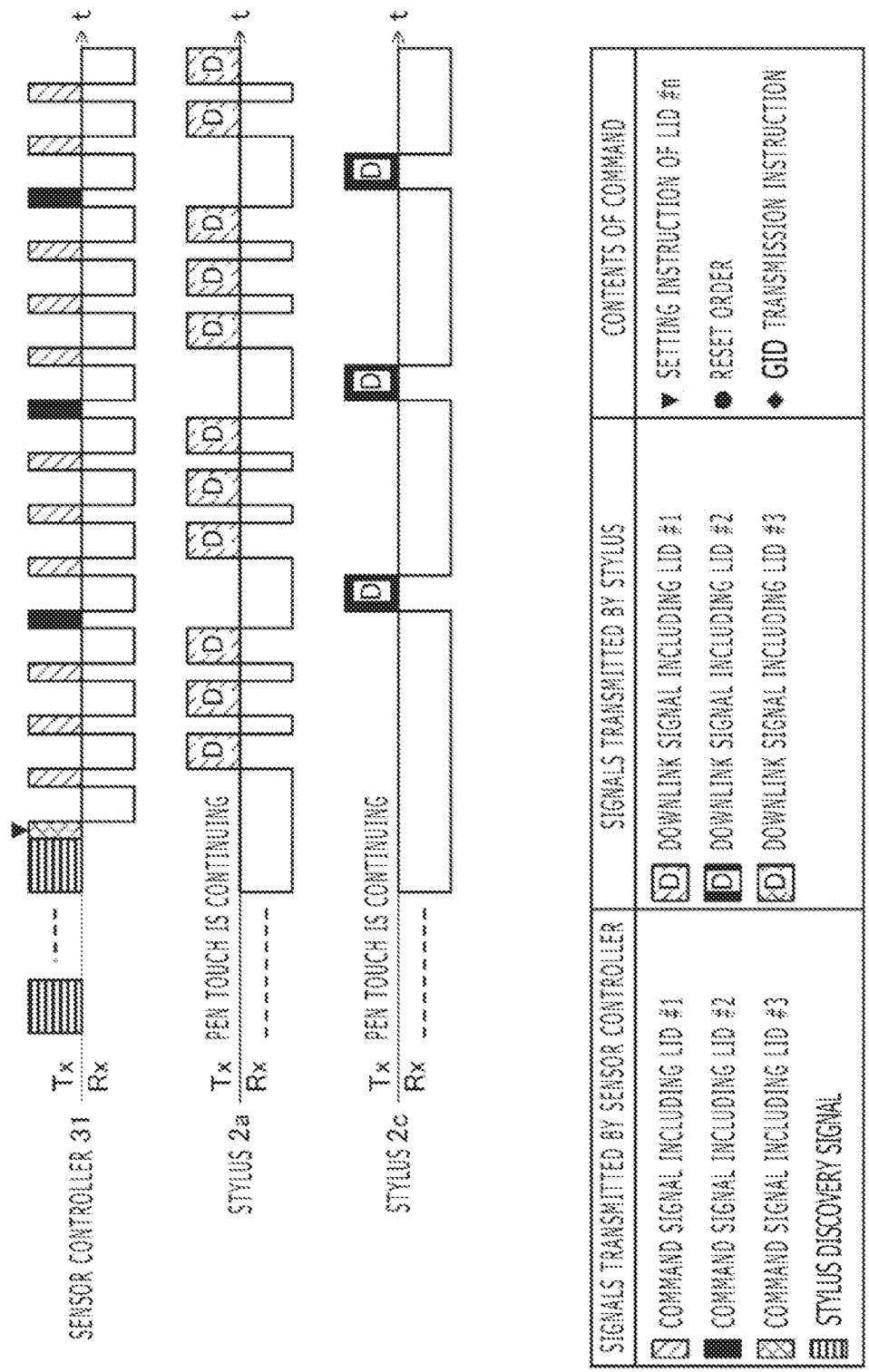
FIG. 24 is a timing chart depicting signals transmitted and received between the styluses and the sensor controller depicted in FIG. 1 (scene in which normal writing by the styluses is being carried out after the sensor controller has readjusted the transmission schedule based on the device type of each of the styluses)
Figure 25:
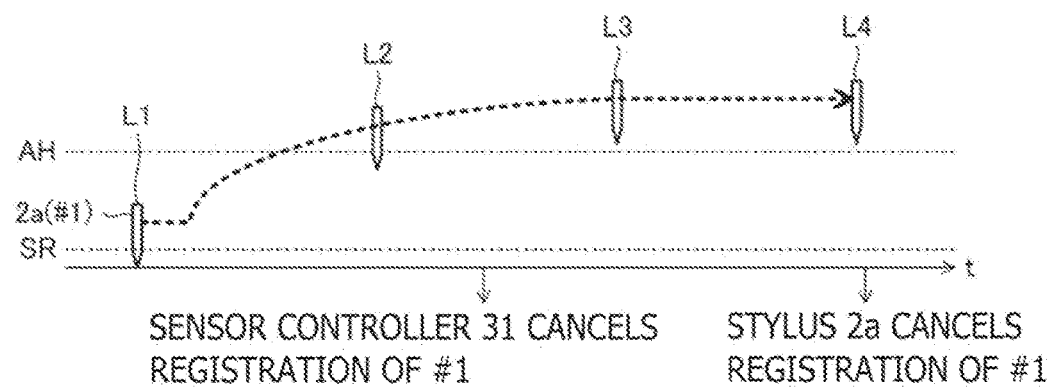
FIG. 25 is an explanatory diagram of cancellation of registration of a local ID by the sensor controller 31 and the stylus 2a depicted in FIG. 1.

In FIG. 24, another example of the readjustment of the transmission schedule carried out at S36 is depicted. In this example, the styluses 2a and 2b simultaneously exist on the panel surface and the local IDs #1 and #2 are given to the styluses 2a and 2c, respectively. The sensor controller 31 receives a global ID from each of the styluses 2a and 2c (not depicted) and thereby understands the fact that the stylus 2a is a pen-type device and the stylus 2c is a ruler-type device. Based on the fact understood in this manner, the sensor controller 31 decides the transmission schedule of the downlink signal DS of each local ID in such a manner that the scan rate of the stylus 2a becomes three times the scan rate of the stylus 2c, and sets the transmission schedule in the ID management table 70. Then, from then on, the sensor controller 31 controls the transmission frequency of the command signal addressed to each local ID in such a manner that the scan rate of the stylus 2a becomes three times the scan rate of the stylus 2c.

Referring back to FIG. 12, the sensor controller 31 that has readjusted the transmission schedule at S36 ends the command signal transmission processing and returns to S1 in FIG. 9.

On the other hand, if determining at S32 in FIG. 12 that the downlink signal DS including the local ID #k has been received at plural places in the panel surface, the sensor controller 31 sets 0 in the deletion counter of the local ID #k in the ID management table 70 (S37). Furthermore, in the ID management table 70 likewise, the sensor controller 31 sets the value of the operation state of the local ID #k to "second reset mode" (S38) and sets "TRUE" in reset command non-issuance flag 2 of the local ID #k (S39). The second reset mode is the same as the first reset mode set at S18 depicted in FIG. 10 in that the second reset mode is an operation mode for cancelling allocation of the local ID #k. However, the second reset mode is different from the first reset mode in that the second reset mode is an operation mode for cancelling allocation of the local ID #n with priority setting if overlapping is detected when command signals that represent (not a setting instruction but) a data transmission instruction are being transmitted to the local ID #n as exemplified in FIG. 27. Reset command non-issuance flag 2 is binary flag information that becomes "TRUE" when the reset order that should be transmitted in the second reset mode has not yet been transmitted and becomes "FALSE" in the other case. Detailed contents of reset processing in which they are used will be described later with reference to FIG. 15. After the end of S39, the sensor controller 31 ends the command signal transmission processing and returns to S1 in FIG. 9.

The sensor controller 31 in the case of determining at S32 in FIG. 12 that the downlink signal DS including the local ID #k has not been received determines whether or not the deletion counter of the local ID #k stored in the ID management table 70 is larger than a predetermined threshold D (S40). If determining that the deletion counter is not larger, the sensor controller 31 increments the deletion counter of the local ID #k by 1 (S43). On the other hand, if determining that the deletion counter is larger, the sensor controller 31 cancels the registration of the local ID #k by deleting the row of the local ID #k from the ID management table 70 (S41). Then, in order to allocate opportunities for transmission of the downlink signal DS given to the stylus 2 corresponding to the local ID #k thus far to other styluses 2, the sensor controller 31 readjusts the transmission schedule of the downlink signal DS and updates the ID management table 70 based on the result thereof (S42).

The determination at S40 is, in short, processing of determining whether or not the state in which a response to the command signal from the stylus 2 corresponding to the local ID #k is absent has continued a larger number of times than D times. If the state in which the response is absent continues, the possibility that the stylus 2 has gotten out of the sensing range SR depicted in FIG. 1 is thought to be high. Therefore, the sensor controller 31 cancels the registration of the local ID #k in such a case. The sensor controller 31 that has ended the processing of S42 or S43 ends the command signal transmission processing and returns to S1 in FIG. 9.

FIG. 25 is an explanatory diagram of cancellation of registration of a local ID by the sensor controller 31 and the stylus 2a. In this diagram, an example of the case is depicted in which the stylus 2a to which the local ID #1 is allocated is in contact with the panel surface at first (L1) and moves therefrom to the outside of the sensing range SR (L2) and further moves to a height surpassing the uplink detection height AH (L3, L4). By the processing of the above-described S40 to S43, the sensor controller 31 cancels the registration of the local ID #1 allocated to the stylus 2a when a predetermined time (time corresponding to the above-described threshold D) elapses after the stylus 2a moves to the outside of the sensing range SR. In contrast, the stylus 2 can receive the uplink signal US if the stylus 2 does not exceed the uplink detection height AH even when being outside the sensing range SR. Thus, the stylus 2 does not cancel the registration of the local ID #k if its own height does not surpass the uplink detection height AH. The cancellation of the registration of the local ID #1 by the stylus 2a is carried out after a predetermined time elapses after reception of the uplink signal US becomes impossible as explained in FIG. 17 to be described later.

Figure 13:
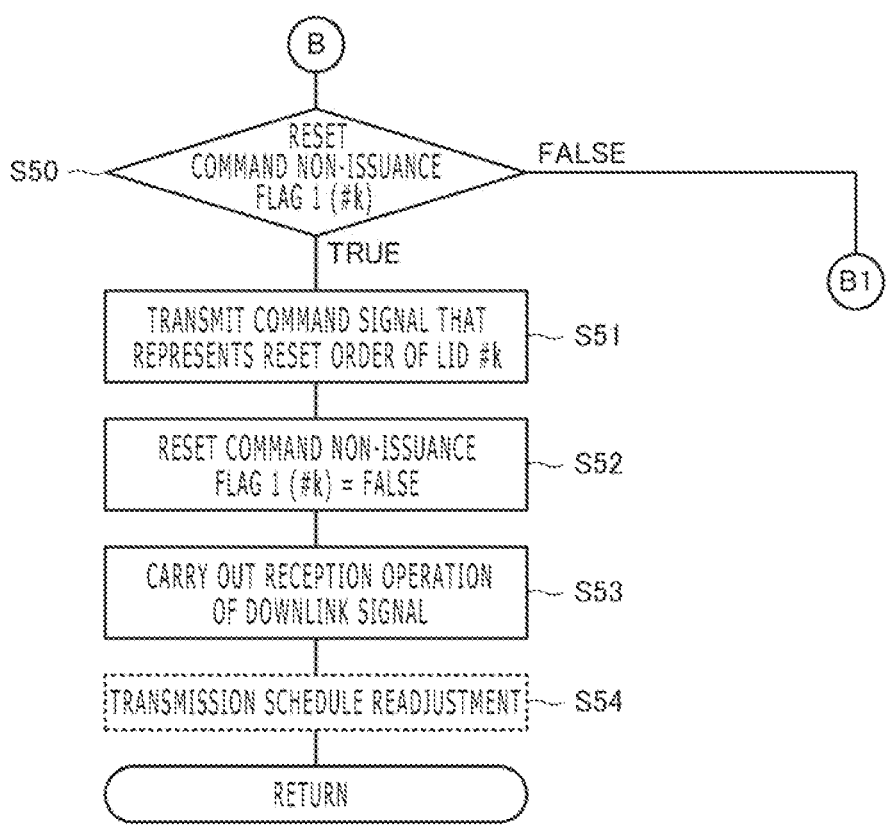
FIG. 13 is a flowchart depicting the detailed flow of the command signal transmission processing depicted in FIG. 9.
Figure 14:
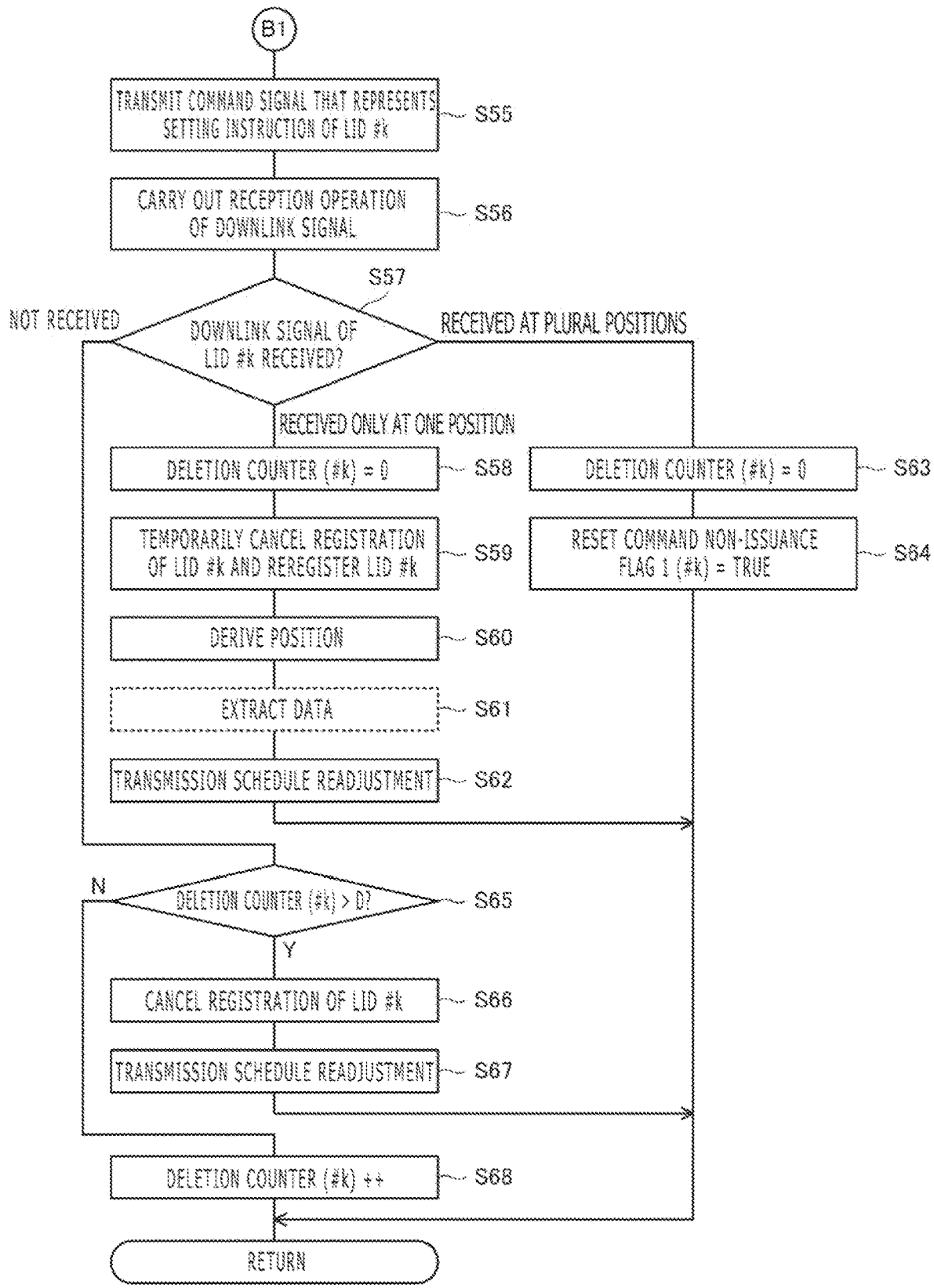
FIG. 14 is a flowchart depicting the detailed flow of the command signal transmission processing depicted in FIG. 9.

Next, in FIG. 13 and FIG. 14, processing in the case in which the value of the operation state of the local ID #k has been determined as the "first reset mode" at S21 in FIG. 11 is depicted. As depicted in FIG. 13, at first, the sensor controller 31 in this case determines the value of reset command non-issuance flag 1 of the local ID #k by referring to the ID management table 70 (S50). If reset command non-issuance flag 1 of the local ID #k is "TRUE" as the result, the sensor controller 31 transmits a command signal (reset signal) that represents a reset order of the local ID #k (S51). The stylus 2 that has received this command signal deletes the local ID #k stored in its memory 45 (see FIG. 2). Thereafter, the sensor controller 31 sets "FALSE" in reset command non-issuance flag 1 of the local ID #k (S52) and subsequently carries out reception operation of the downlink signal DS (S53). At S53, even if the downlink signal DS including the local ID #k is received, the sensor controller 31 does not carry out operation based on the signal. However, the sensor controller 31 may carry out operation of determining the local ID in the downlink signal DS. If the local ID is a local ID other than the local ID #k, the sensor controller 31 may further carry out operation based on the downlink signal DS (operation depicted in S34 to S36 in FIG. 12).

After S53, the sensor controller 31 may readjust the transmission schedule (S54). This readjustment may be processing of returning, to default values, the scan rate and the transmission continuation time of the downlink signal DS allocated to the local ID #k regarding which the reset order has been issued.

If determining at S50 that reset command non-issuance flag 1 of the local ID #k is "FALSE," as depicted in FIG. 14, first the sensor controller 31 transmits a command signal that represents a setting instruction of the local ID #k (S55). This is, in short, processing in the next opportunity for transmission of the command signal relating to the local ID #k after the transmission of the command signal that represents the reset order of the local ID #k at S51. After transmitting the command signal, the sensor controller 31 carries out reception operation of the downlink signal DS (S56) and determines whether or not the downlink signal DS including the local ID #k has been received (S57).

If determining at S57 that the downlink signal DS including the local ID #k has been received only at one place in the panel surface, first the sensor controller 31 sets 0 in the deletion counter of the local ID #k in the ID management table 70 (S58). Next, the sensor controller 31 performs processing of temporarily cancelling the registration of the local ID #k in the ID management table 70 and reregistering the local ID #k in the ID management table 70 (S59). Because the registration is temporarily cancelled, the value of the operation state of the local ID #k (see FIG. 8) returns to the "normal mode" here. Then, the sensor controller 31 derives the position of the stylus 2 based on a burst signal in the received downlink signal DS (S60). In addition, if a data signal in the downlink signal DS includes data other than the local ID #k, the sensor controller 31 extracts the data (S61). Thereafter, the sensor controller 31 readjusts the transmission schedule similarly to S17 (S62). After the end of S62, the sensor controller 31 ends the command signal transmission processing and returns to S1 in FIG. 9.

Figure 26:
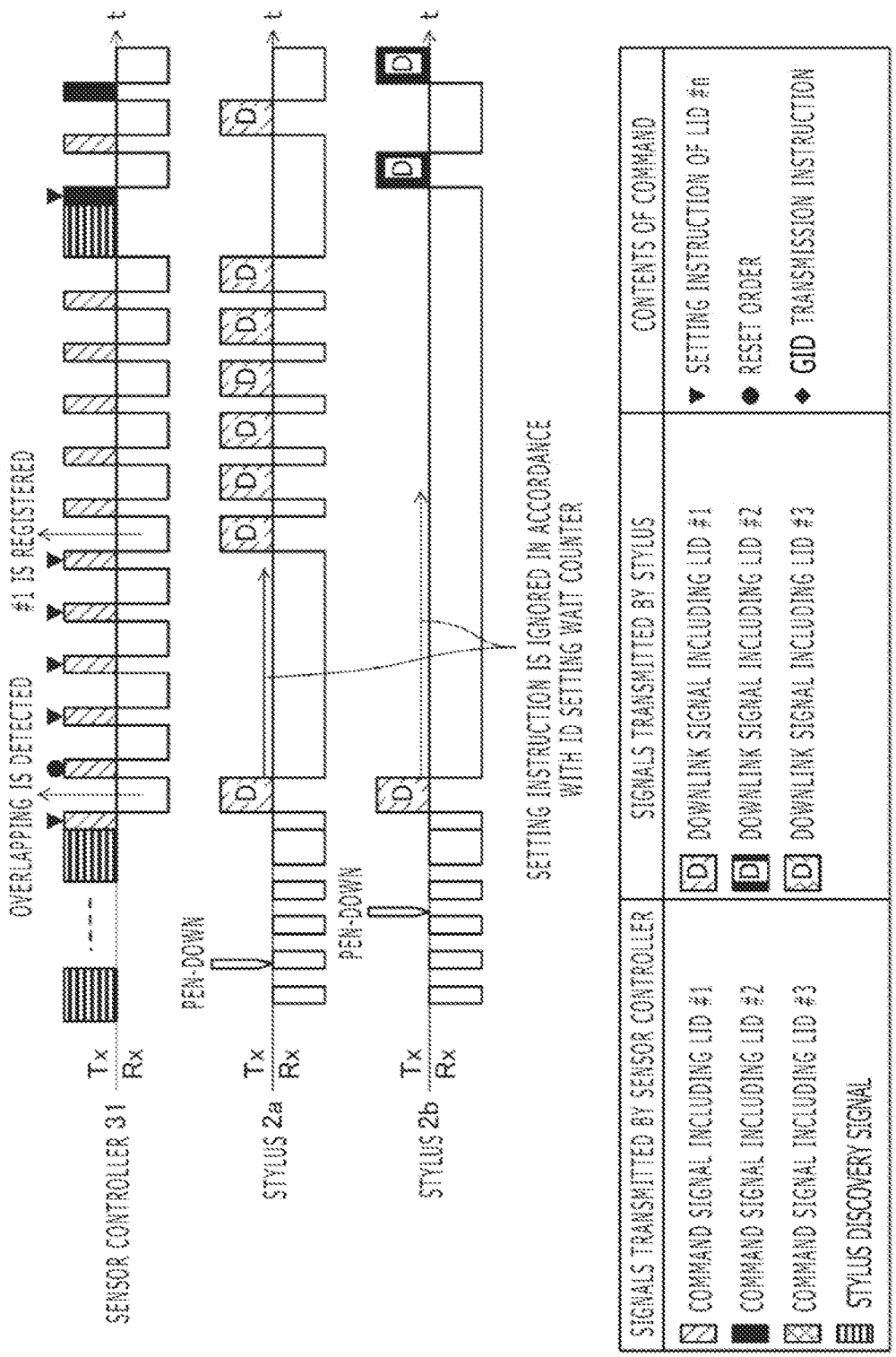
FIG. 26 is a timing chart depicting signals transmitted and received between the styluses 2a and 2b and the sensor controller 31 depicted in FIG. 1 (scene in which the styluses 2a and 2b simultaneously respond to one setting instruction)

In FIG. 26, one example of operation of the sensor controller 31 and the stylus 2 relating to the first reset mode is depicted. In this example, both the styluses 2a and 2b simultaneously respond to a setting instruction of the local ID #1 transmitted by the sensor controller 31. Such a situation possibly occurs when both the styluses 2a and 2b become the pen-down state during the transmission interval of the stylus search signal also as depicted in FIG. 26. When detecting reception of the downlink signal DS including the local ID #1 at plural places ("overlapping is detected" in FIG. 26. In the flowchart, S13 in FIG. 10), the sensor controller 31 transmits a command signal that represents a reset order of the local ID #1 (in the flowchart, S51 in FIG. 13). Thereafter, the sensor controller 31 transmits a command signal that represents a setting instruction of the local ID #1 plural times (in the flowchart, S55 in FIG. 14).

Although details of operation of the stylus 2 will be described later, after receiving this command signal that represents the reset order of the local ID #1, the styluses 2a and 2b each cancel the registration of the local ID #1 and generate the value of an ID setting wait counter to ignore subsequently-received setting instructions for a time according to the value. After this ignorance period ends, the stylus 2 that has received a command signal that represents a setting instruction of the local ID #1 transmitted by the sensor controller 31 (stylus 2a in FIG. 26) transmits the downlink signal including the local ID #1 and thereby the local ID #1 is anew registered in the ID management table 70 ("#1 is registered" in FIG. 26. In the flowchart, S59 in FIG. 14). As above, according to the processing of the sensor controller 31 and the stylus 2 in accordance with the present embodiment, even if a response is made from plural styluses 2 to a setting instruction transmitted immediately after transmission of the stylus search signal, a local ID can be reallocated to only one of them rapidly. The stylus 2b, to which the local ID #1 is not allocated, starts communication with the sensor controller 31 as the local ID #2 by receiving a command signal that represents a setting instruction of the local ID #2 transmitted immediately after the next stylus search signal also as depicted in FIG. 26.

Here, the example of FIG. 26 is based on the premise that a command signal that represents a reset order is received by both the styluses 2a and 2b. However, the sensor controller 31 may transmit the command signal that represents a reset order in such a manner that the command signal is received by only one of the styluses 2a and 2b (if three or more styluses 2 are simultaneously detected, only part of them). Specifically, the sensor controller 31 may acquire the position of each of the styluses 2a and 2b on the panel surface based on the downlink signal DS transmitted by each of the styluses 2a and 2b, and transmit the command signal that represents a reset order locally (that is, only from a partial region of the sensor electrode 30) based on the acquired position in such a manner that the command signal is received by only either one. Furthermore, if the styluses 2a and 2b can receive the uplink signal US by a proximity wireless communication measure (communication measure different from communication through capacitive coupling using the sensor electrode 30) as described above, the command signal that represents a reset order may be transmitted to only either one of the styluses 2a and 2b by using the proximity wireless communication measure. This makes it possible to reallocate a local ID to only the other of the styluses 2a and 2b without using the ID setting wait counter. This point is the same also regarding the second reset mode explained with FIG. 27 to be described later.

Referring back to FIG. 14, if determining at S57 that the downlink signal DS including the local ID #k has been received at plural places in the panel surface, the sensor controller 31 sets 0 in the deletion counter of the local ID #k in the ID management table 70 (S63) and sets "TRUE" in reset command non-issuance flag 1 of the local ID #k again (S64). Thereafter, the sensor controller 31 ends the command signal transmission processing and returns to S1 in FIG. 9. This is processing in the case in which the values of the above-described ID setting wait counters accidentally correspond with each other. Due to setting "TRUE" in reset command non-issuance flag 1 of the local ID #k again at S64, the processing is performed again from the transmission of a command signal that represent a reset order (S51 in FIG. 13).

The sensor controller 31 in the case of determining at S57 that the downlink signal DS including the local ID #k has not been received determines whether or not the deletion counter (see FIG. 8) of the local ID #k is larger than the predetermined threshold D (S65). If determining that the deletion counter is not larger, the sensor controller 31 increments the deletion counter of the local ID #k by 1 (S68). On the other hand, if determining that the deletion counter is larger, the sensor controller 31 cancels the registration of the local ID #k by deleting the row of the local ID #k from the ID management table 70 (S66). Then, in order to allocate opportunities for transmission of the downlink signal DS given to the stylus 2 corresponding to the local ID #k thus far to other styluses 2, the sensor controller 31 readjusts the transmission schedule of the downlink signal DS and updates the ID management table 70 based on the result thereof (S67). For example, in the example of FIG. 26, the processing of S65 to S68 is performed if both the styluses 2a and 2b get out of the sensing range SR while the sensor controller 31 is transmitting the command signals that represent the setting instruction of the local ID #1.

Figure 15:
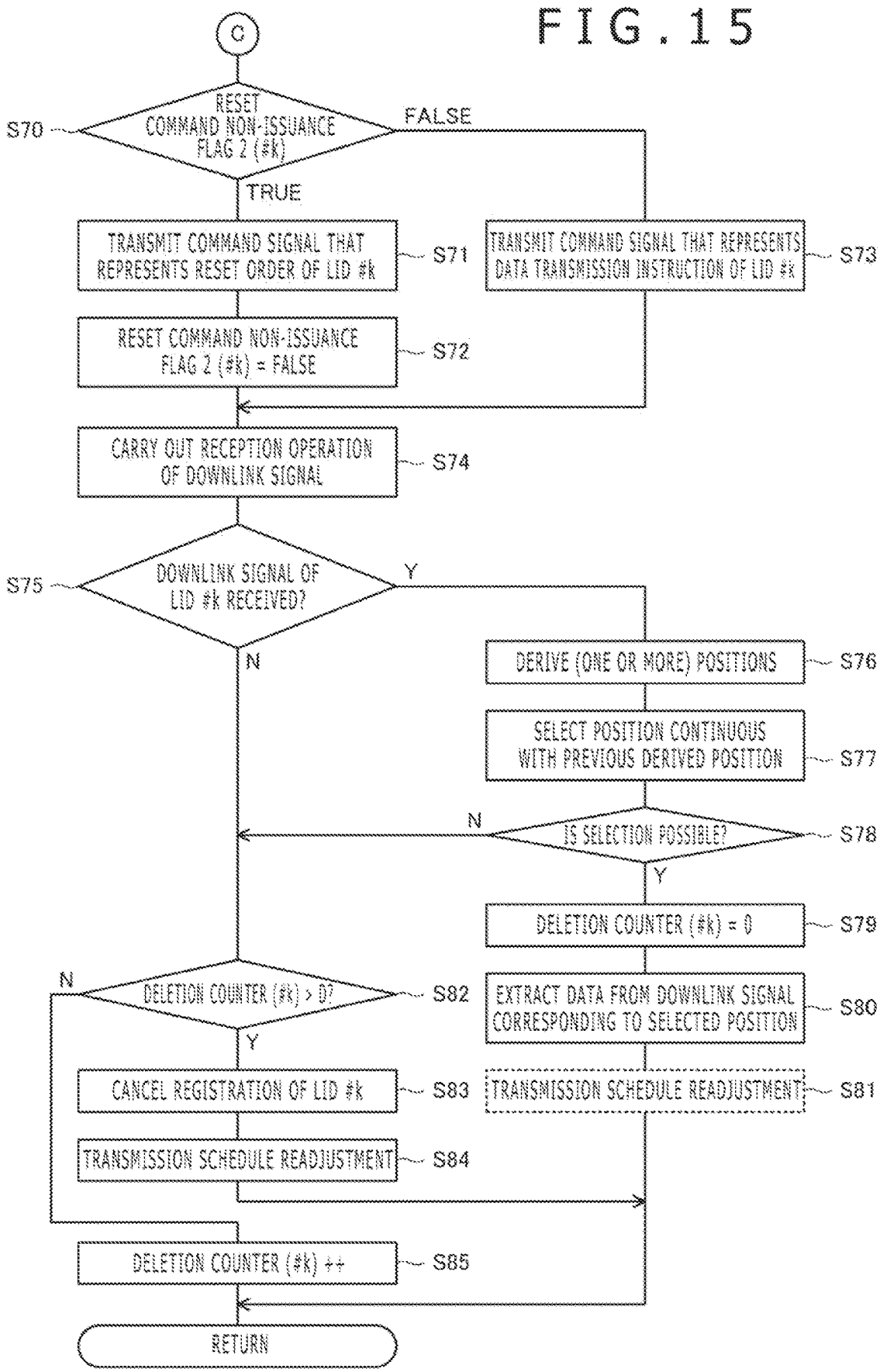
FIG. 15 is a flowchart depicting the detailed flow of the command signal transmission processing depicted in FIG. 9.

Next, in FIG. 15, processing in the case in which the value of the operation state of the local ID #k has been determined as the "second reset mode" at S21 in FIG. 11 is depicted.

Figure 27:
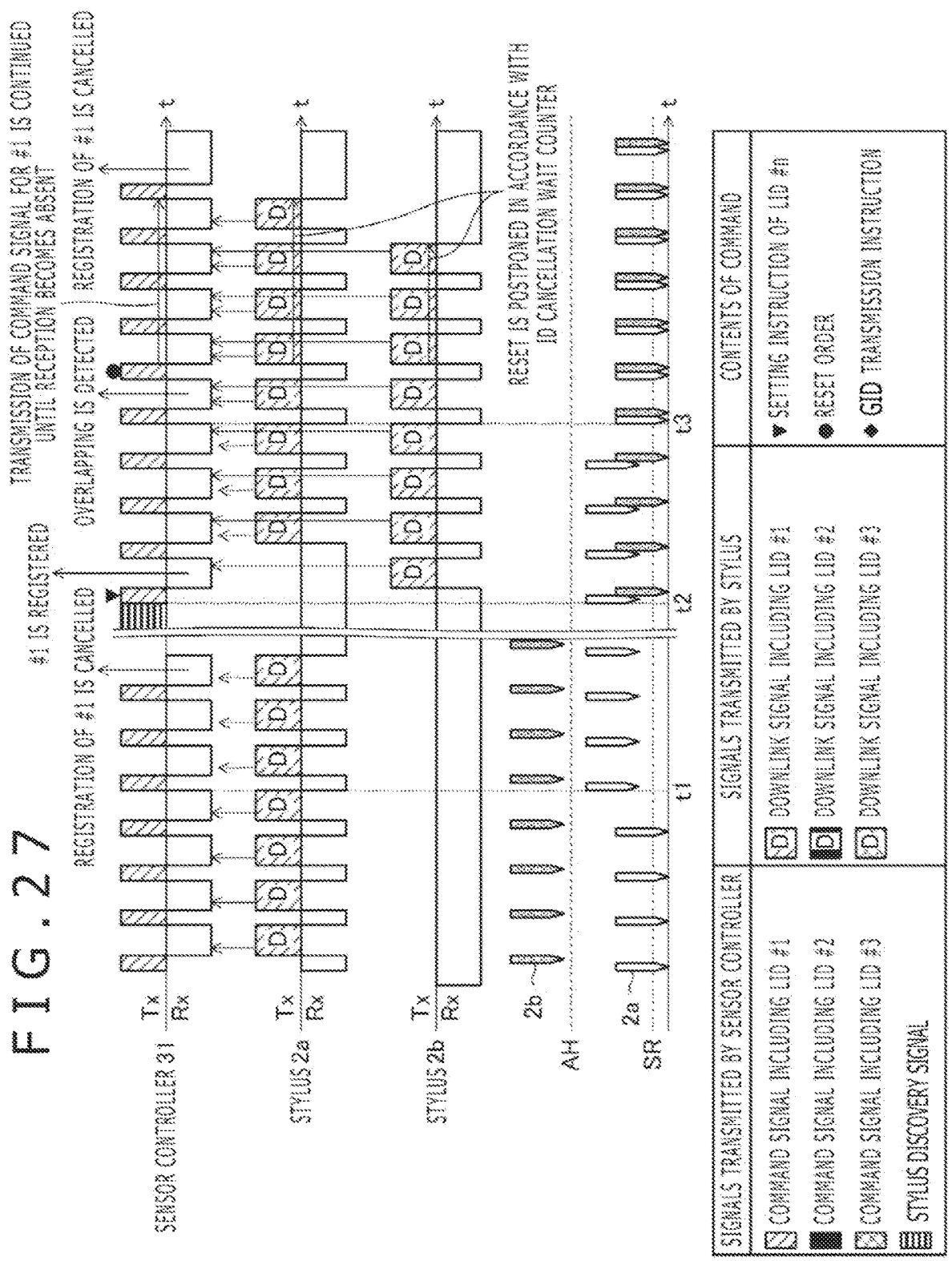
FIG. 27 is a timing chart depicting signals transmitted and received between the styluses 2a and 2b and the sensor controller 31 depicted in FIG. 1 (scene in which the styluses 2a and 2b having the same local ID simultaneously respond to one data transmission instruction) and the state of the styluses 2a and 2b.

Here, processing of the sensor controller 31 and the stylus 2 in the second reset mode will be described in detail with reference to FIG. 27 in advance.

As described with reference to FIG. 12, it is when two or more styluses 2 simultaneously transmit the downlink signal DS including the local ID #k in response to not a command signal that represents a setting instruction about the local ID #k but a command signal that represents a data transmission instruction of the local ID #k that the value of the operation state of the certain local ID #k is set to the second reset mode. In FIG. 27, one example of the case in which such a state occurs is depicted. In the example of this diagram, as the initial state, the local ID #1 is allocated to only the stylus 2*a* and a local ID is not allocated to the stylus 2*b*. When the stylus 2*a* gets out of the sensing range SR (clock time t1) in this situation, the downlink signal DS from the stylus 2*a* becomes unreachable and thus the sensor controller 31 cancels the registration of the local ID #1 after a predetermined time. However, as described with reference to FIG. 25, cancellation of the registration of the local ID in the stylus 2 is carried out later compared with the sensor controller 31. Therefore, in the example of FIG. 27, cancellation of the registration of the local ID in the stylus 2 has not been carried out even after the sensor controller 31 has cancelled the registration of the local ID #1.

Even in the state in which the stylus 2*a* remains holding the local ID #1, when the stylus 2*b* newly enters the sensing range SR (clock time t2), the stylus 2*b* receives a command signal that is transmitted by the sensor controller 31 and represents a setting instruction of the local ID #1 and, as a result, the sensor controller 31 allocates the local ID #1 to the stylus 2*b*. Thereafter, when the stylus 2*a* that remains holding the local ID #1 enters the sensing range SR again (clock time t3), both the styluses 2*a* and 2*b* respond to a command signal that is addressed to the local ID #1 and represents a data transmission instruction. This is the case in which the determination of "received at plural places" is made at S32 depicted in FIG. 12. In FIG. 15, processing for eliminating such overlapping of the local ID #1 (state in which plural styluses 2 hold the same local ID #k) is described.

Referring back to FIG. 15, the sensor controller 31 in this case determines the value of reset command non-issuance flag 2 of the local ID #k at first (S70). If reset command non-issuance flag 2 of the local ID #k is "TRUE" as the result, the sensor controller 31 transmits a command signal (reset signal) that represents a reset order of the local ID #k (S71) and sets "FALSE" in reset command non-issuance flag 2 of the local ID #k in the ID management table 70 (S72). This processing is performed immediately after the sensor controller 31 detects overlapping of the local ID #k. In FIG. 27, the reset order immediately after "overlapping is detected" is equivalent to the reset order transmitted at S71. On the other hand, if determining at S70 that reset command non-issuance flag 2 of the local ID #k is "FALSE," the sensor controller 31 transmits a command signal that represents a data transmission instruction of the local ID #k (S73).

After the end of S72 or S73, the sensor controller 31 carries out reception operation of the downlink signal DS (S74). Then, the sensor controller 31 determines whether or not the downlink signal DS including the local ID #k has been received (S75).

If determining at S75 that the downlink signal DS including the local ID #k has been received, the sensor controller 31 derives the position of the stylus 2 based on a burst signal in the received downlink signal DS (S76). Here, as described in detail later, the stylus 2 is so configured that, if the present timing is not immediately after registration of a new local ID, even when receiving a command signal that represents a reset order, the stylus 2 postpones the reset (cancellation of registration of the local ID) for a while and continues to carry out transmission of the downlink signal DS as a response to a command signal that represents a data transmission instruction. The length of this postponement period is decided based on the value of an ID cancellation wait counter to be described later. Therefore, at S76, one or more positions continue to be derived for a while.

The sensor controller 31 selects the position continuous with the previously-derived position from the one or more positions derived at S76 (S77). In the example of FIG. 27, the stylus 2 that communicates with the sensor controller 31 until immediately before the sensor controller 31 detects overlapping is the stylus 2*b*. Thus, at S77, the position derived based on the downlink signal DS of the stylus 2*b* is selected.

Subsequently, the sensor controller 31 determines whether or not the selection of the position at S77 is possible (S78). As described above, after receiving a command signal that represents a reset order, the stylus 2 continues the response to the command signal that represents a data transmission instruction for the period decided based on the value of the ID cancellation wait counter. Therefore, possibly there is the case in which the stylus 2 existing at the position continuous with the previously-derived position stops the response earlier than the other styluses 2. In this case, it is determined that the selection is not possible at S78.

If determining that the selection is possible at S78, the sensor controller 31 sets 0 in the deletion counter of the local ID #k in the ID management table 70 (S79) and extracts data included in a data signal in the downlink signal DS corresponding to the selected position (S80). Due to this, only the coordinates x and y that represent the position of the stylus 2 existing at the position continuous with the previously-derived position, the local ID, and the data are reported to the electronic equipment controller 33. Furthermore, the sensor controller 31 readjusts the transmission schedule depending on the contents of the data (for example, the case in which the extracted data is a global ID, or the like) (S81) and thereafter ends the command signal transmission processing and returns to S1 in FIG. 9.

If determining at S75 that the downlink signal DS including the local ID #k has not been received or if determining at S78 that the selection is not possible, the sensor controller 31 determines whether or not the deletion counter (see FIG. 8) of the local ID #k is larger than the predetermined threshold D (S82). If determining that the deletion counter is not larger, the sensor controller 31 increments the deletion counter of the local ID #k by 1 (S85). On the other hand, if determining that the deletion counter is larger, the sensor controller 31 cancels the registration of the local ID #k by deleting the row of the local ID #k from the ID management table 70 (S83). This eliminates the case in which the local ID #k is decided as the transmission target at S20 in FIG. 11. Therefore, the transmission of the command signal that represents a data transmission instruction of the local ID #k at S73 is also stopped. Then, in order to allocate opportunities for transmission of the downlink signal DS given to the stylus 2 corresponding to the local ID #k thus far to other styluses 2, the sensor controller 31 readjusts the transmission schedule of the downlink signal DS and updates the ID management table 70 based on the result thereof (S84). The sensor controller 31 that has ended the processing of S84 ends the command signal transmission processing and returns to S1 in FIG. 9.

The operation of the sensor controller 31 relating to the present disclosure is described in detail above. Next, the operation of the stylus 2 relating to the present disclosure will be described in detail.

Figure 16:
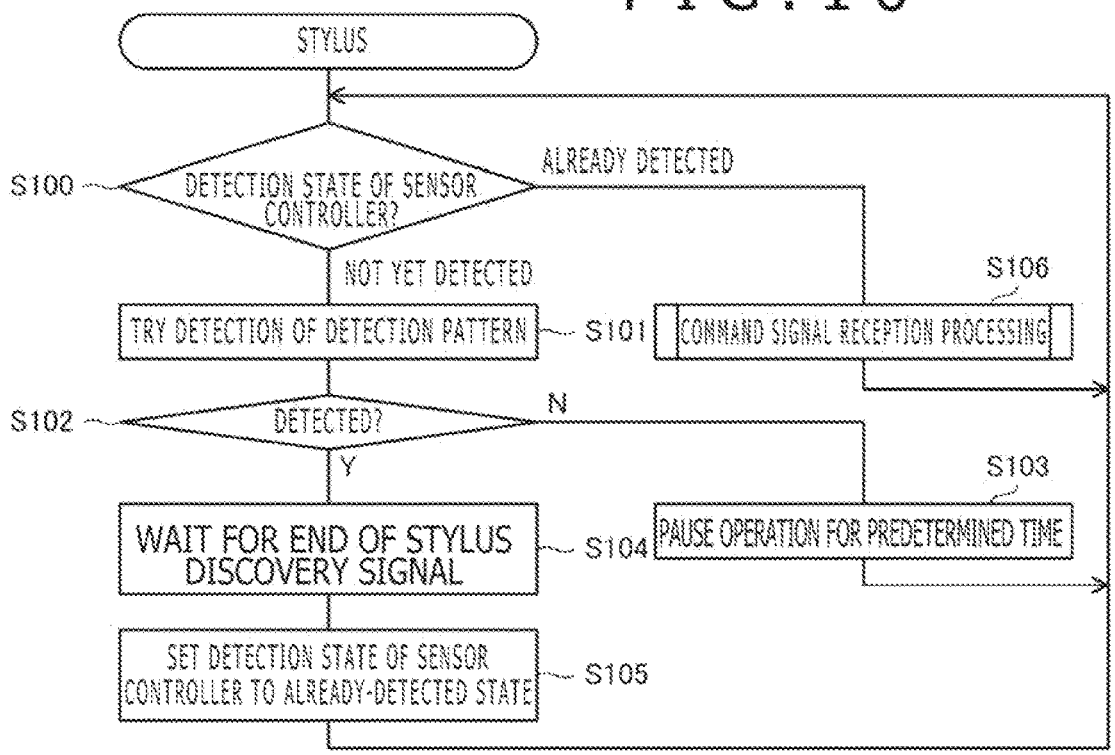
FIG. 16 is a flowchart depicting a processing flow of the styluses depicted in FIG. 1.

As depicted in FIG. 16, first the stylus 2 determines the detection state of the sensor controller 31 (S100). If determining that the detection state is the undetected state in which the sensor controller 31 has not yet been detected as the result, the stylus 2 tries detection of the above-described detection pattern c1 (S101). This processing is processing for detecting the stylus search signal intermittently transmitted by the sensor controller 31.

Next, the stylus 2 determines whether or not the detection pattern c1 has been detected as the result of the trial at S101 (S102). If determining that the detection pattern c1 has not been detected as the result, the stylus 2 makes a pause in the operation for a predetermined time (S103) and then returns to S100 to repeat the trial of detection of the detection pattern c1. The pause in the operation at S103 is for suppressing the power consumption of the stylus 2 by intermittently carrying out the reception operation. On the other hand, if determining at S102 that the detection pattern c1 has been detected, the stylus 2 waits for the end of the stylus search signal (S104). As described above, the stylus search signal is a signal composed of repetition of the known detection pattern c1 and the delimiter pattern STP added to the tail end. Therefore, the stylus 2 detects the end of the detection pattern by detecting the delimiter pattern STP. Thereafter, the stylus 2 sets the detection state of the sensor controller 31 to the already-detected state (S105) and returns to S100.

If determining at S100 that the detection state is the already-detected state, the stylus 2 performs command signal reception processing (S106).

Figure 17:
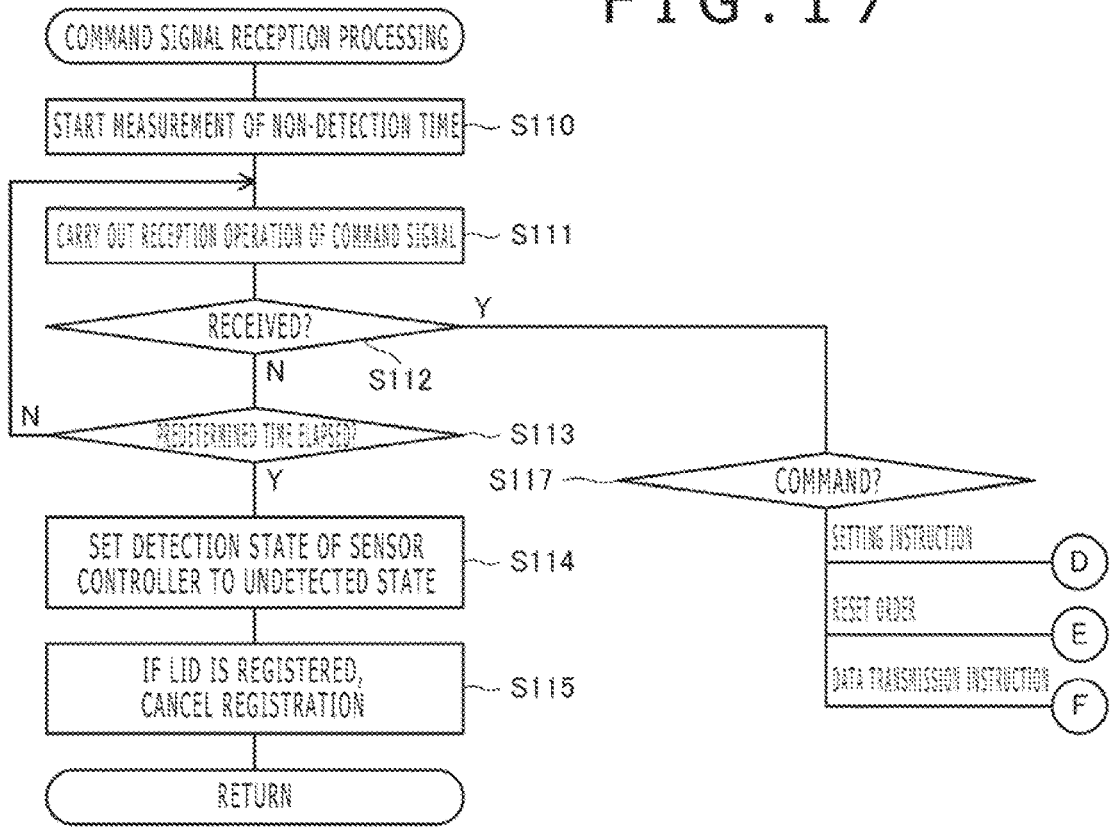
FIG. 17 is a flowchart depicting a detailed flow of command signal reception processing depicted in FIG. 16.

In FIG. 17, details of the command signal reception processing are depicted. As depicted in this diagram, the stylus 2 that has started the command signal reception processing starts measurement of the non-detection time of the uplink signal US (S110). Then, the stylus 2 carries out reception operation of the command signal (S111) and determines whether or not a command signal has been received (S112).

If determining at S112 that a command signal has not been received, the stylus 2 determines whether or not a predetermined time has elapsed from the measurement of the non-detection time is started at S110 (S113). This predetermined time is a time shorter than one second, such as several hundreds of milliseconds for example. If determining that the predetermined time has not elapsed here, the stylus 2 returns to S111 and carries out the reception operation of the command signal again. On the other hand, if determining that the predetermined time has elapsed (that is, if the uplink signal US is not detected for the predetermined period), the stylus 2 sets the detection state of the sensor controller 31 to the undetected state (S114). In addition, if a local ID is registered in the memory 45 (see FIG. 2), the stylus 2 cancels the registration of the local ID by deleting it (S115). Thereafter, the stylus 2 ends the command signal reception processing and returns to S100 in FIG. 16. The processing of S114 and S115 is processing performed when the stylus 2 moves to a height that surpasses the uplink detection height AH depicted in FIG. 1 and becomes incapable of receiving the uplink signal US.

Here, if a local ID has been already registered in the memory 45, the stylus 2 may cancel the registration of the local ID not only when the uplink signal US is not detected for the predetermined period as described above but also when the uplink signal US including the local ID registered in the memory 45 is not detected for the predetermined period. Due to this, for example when the state occurs in which, from the viewpoint of the stylus 2, the uplink signal US can be detected but the uplink signal US including its own local ID is not detected no matter how long the stylus 2 waits, such as when the stylus 2 stores a local ID in the memory 45 and remains at a position lower than the uplink detection height AH but the local ID is not registered (has been already cancelled) in the sensor controller 31, a new local ID can be allocated from the sensor controller 31 to the stylus 2 without movement of the stylus 2 to a position higher than the uplink detection height AH.

On the other hand, if determining at S112 that a command signal has been received, the stylus 2 resets the value of the non-detection time and determines which of "setting instruction," "reset order," and "data transmission instruction" the contents of a command represented by the received command signal are (S117).

D. Operation in Response to ID Setting Instruction

Figure 18:
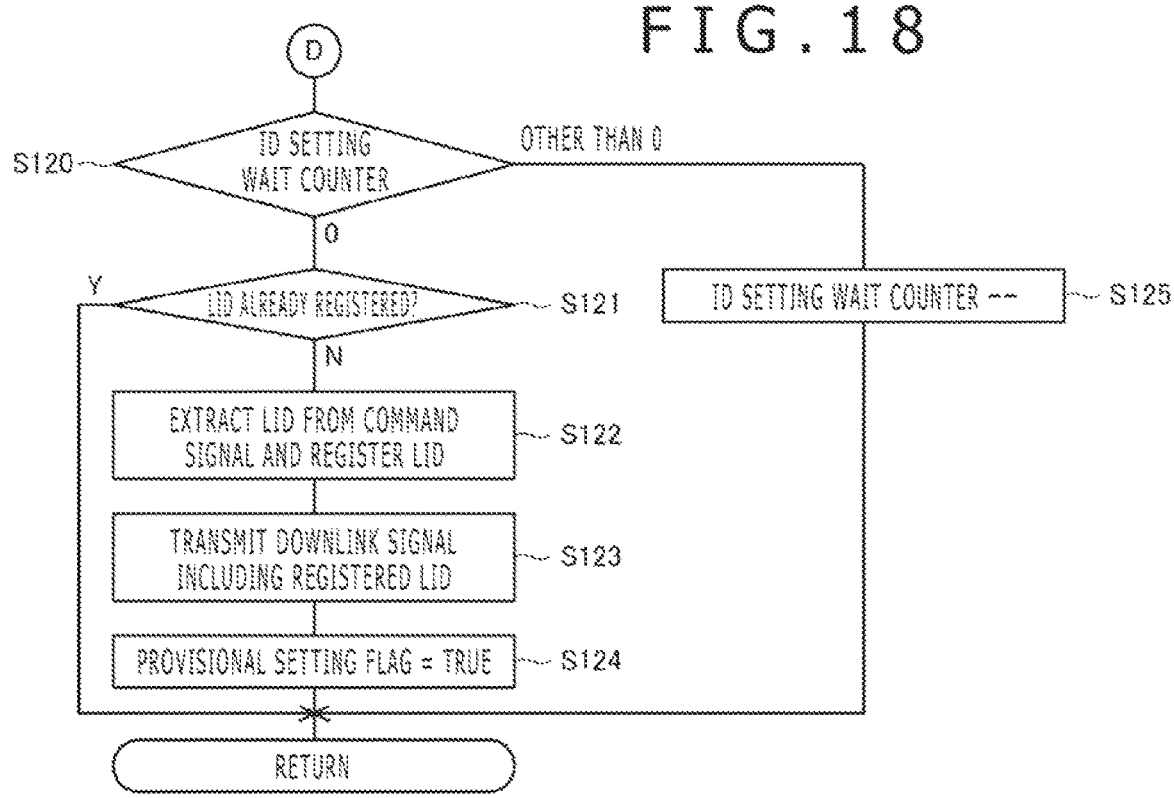
FIG. 18 is a flowchart depicting the detailed flow of the command signal reception processing depicted in FIG. 16.

In FIG. 18, processing in the case in which the command is determined as the "setting instruction" at S117 in FIG. 17 is depicted. In this case, first the stylus 2 determines whether or not the ID setting wait counter is 0 (S120). The ID setting wait counter represents the period during which the stylus 2 that has received an ID setting instruction does not immediately reflect (ignores) the setting instruction although the setting instruction is present. The ID setting wait counter is set in S135 to be described later and is 0 in the initial state. If the ID setting wait counter is not 0, the stylus 2 performs processing of decrementing the ID setting wait counter by 1 (S125). Thereafter, the stylus 2 ends the command signal reception processing and returns to S100 in FIG. 16. In this case, the setting instruction of a local ID by the sensor controller 31 is ignored by the stylus 2.

On the other hand, if the ID setting wait counter is 0, the stylus 2 determines whether or not a local ID has been already registered in its own memory 45 (see FIG. 2) (S121). If determining that a local ID has been already registered here, the stylus 2 ends the command signal reception processing without executing particular processing and returns to S100 in FIG. 16. On the other hand, the stylus 2 in the case of determining that a local ID has not been already registered extracts the local ID from the command signal and registers the local ID in its own memory 45 (S122). Then, the stylus 2 transmits the downlink signal DS including the registered local ID (S123) and sets "TRUE" in a provisional setting flag (S124). Thereafter, the stylus 2 ends the command signal reception processing and returns to S100 in FIG. 16. That the provisional setting flag is "TRUE" means that the setting of the local ID is provisional. That the provisional setting flag is "FALSE" means that the local ID held in the memory is settled.

E. Operation in Response to Reset Order

Figure 19:
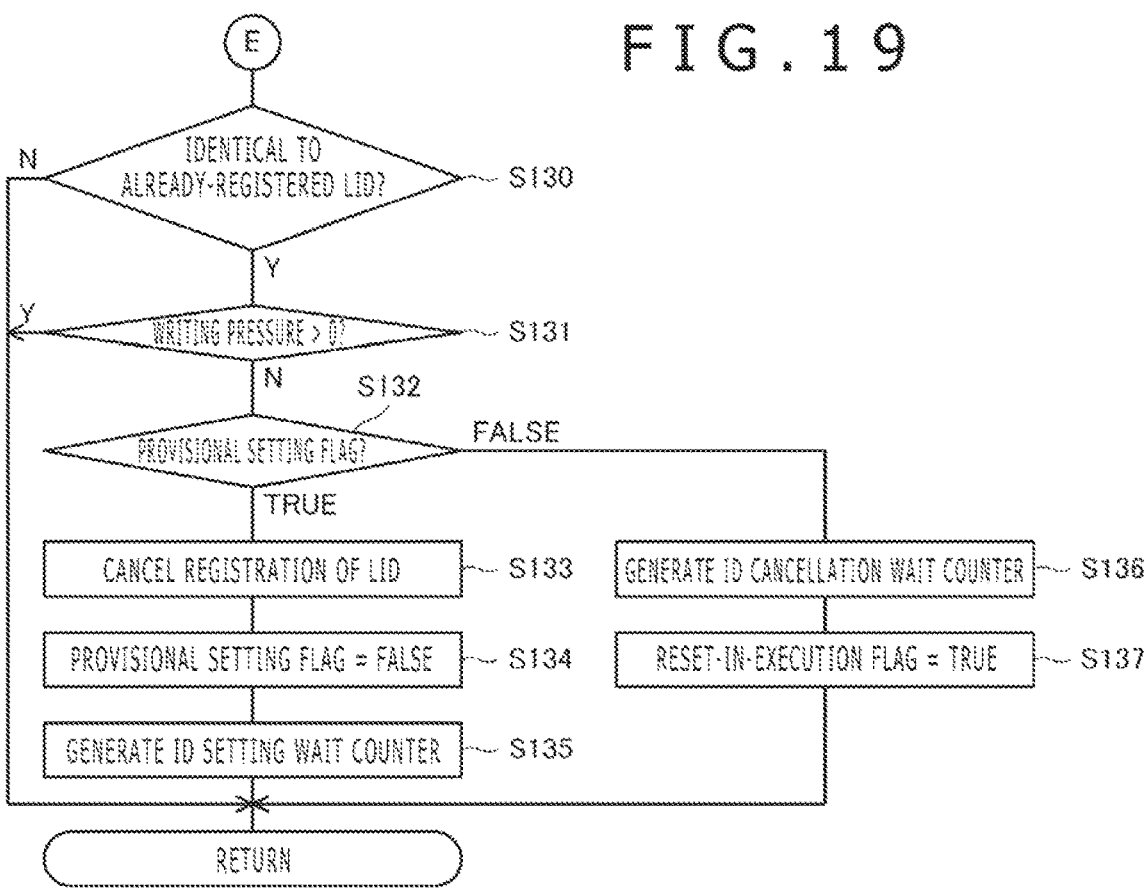
FIG. 19 is a flowchart depicting the detailed flow of the command signal reception processing depicted in FIG. 16.

In FIG. 19, processing in the case in which the command is determined as the "reset order" at S117 in FIG. 17 is depicted. The stylus 2 in this case first determines whether or not the received command signal includes the already-registered local ID (S130). If determining that the command signal does not include the already-registered local ID, the stylus 2 ends the command signal reception processing without executing particular processing and returns to S100 in FIG. 16. This is processing for ignoring the command signal that is not addressed to its own self. On the other hand, if determining that the command signal includes the already-registered local ID, subsequently the stylus 2 determines whether or not the writing pressure detected by the writing pressure detecting sensor 23 (FIG. 24) surpasses 0 (S131). If the writing pressure surpasses 0 as the result, the stylus 2 ends the command signal reception processing without executing particular processing and returns to S100 in FIG. 16. This means that the processing is continued without obeying the reset order in the case in which the stylus 2 has been already used on the panel operation surface and pen touch operation is being carried out or the like (typically the case in which rendering processing or the like with use of the stylus 2 has been started). On the other hand, if the writing pressure is 0, subsequently the stylus 2 determines the value of the provisional setting flag (S132).

If the provisional setting flag is "TRUE," the stylus 2 cancels the registration of the local ID by deleting the local ID from the memory 45 (S133). Thereby, the stylus 2 becomes the state in which a local ID is unregistered. Subsequently, the stylus 2 sets "FALSE" in the provisional setting flag (S134) and generates the ID setting wait counter (S135). Thereafter, the stylus 2 ends the command signal reception processing and returns to S100 in FIG. 16.

That it is determined at S132 that the provisional setting flag is "TRUE" means that the command signal that represents the reset order is transmitted immediately after the stylus 2 has registered the local ID. This is the case in which, as exemplified in FIG. 26, plural styluses 2 respond to a setting instruction of the local ID transmitted by the sensor controller 31. The ID setting wait counter generated at S135 represents the period during which the stylus 2 that has received a reset order in such a case ignores the setting instruction. It suffices that the values of the ID setting wait counter and the ID cancellation wait counter generated in S136 to be described later are values different for each of the chassis of the styluses 2. The values may be generated from a serial number of a global ID or the like or values prioritized according to the device type may be predetermined. Alternatively, the values may be generated by a random number generator. Due to the ignorance of the setting instruction by the respective styluses 2 for the period according to the ID setting wait counter in this manner, it becomes possible to reallocate the same local ID to only one stylus 2 of them as described above with reference to FIG. 26.

Referring back to FIG. 19, if determining at S132 that the provisional setting flag is "FALSE," the stylus 2 generates the ID cancellation wait counter (S136) and sets "TRUE" in a reset-in-execution flag (S137). Then, the stylus 2 ends the command signal reception processing and returns to S100 in FIG. 16.

The case in which it is determined at S132 that the provisional setting flag is "FALSE" means that the command signal that represents the reset order is transmitted not when the local ID is provisionally set, such as immediately after the stylus 2 has registered the local ID, but after the local ID has been already settled. This is the case in which, as described with reference to FIG. 27, two or more styluses 2 simultaneously transmit the downlink signal DS including the same local ID in response to a command signal that represents a data transmission instruction. The ID cancellation wait counter generated at S136 represents the time by which the stylus 2 that has received a reset order in such a case delays execution of registration cancellation of the local ID. Due to the delaying of execution of registration cancellation of the local ID by the respective styluses 2 for the period according to the ID cancellation wait counter in this manner, it becomes possible for the sensor controller 31 to continuously carry out position detection of the stylus 2 and data acquisition from the stylus 2 as exemplified in FIG. 27. As described with reference to FIG. 15, in such a case, the sensor controller 31 deems only the downlink signal DS corresponding to the position continuous with the previous derived position as the target of processing (S76 to S81). Thus, position detection and data acquisition are carried out regarding not the stylus 2 that has newly entered the sensing range SR (in FIG. 27, stylus 2a) but only the stylus 2 that continuously remains in the sensing range SR (in FIG. 27, stylus 2b). Therefore, with respect to a local ID generated when another stylus 2 kept lower than the uplink detection height AH (second stylus 2) enters the sensing range SR with the intermediary of a time lag after a user has caused a certain stylus 2 (first stylus 2) to make pen touch and begun to use the certain stylus 2 on the panel surface, the sensor controller 31 can implement operation of detecting coordinates by continuously using the coordinate values of the stylus 2 having higher probability of being the first stylus 2 and reporting the coordinates to the electronic equipment controller 33.

F. Operation in Response to Data Transmission Instruction

Figure 20:
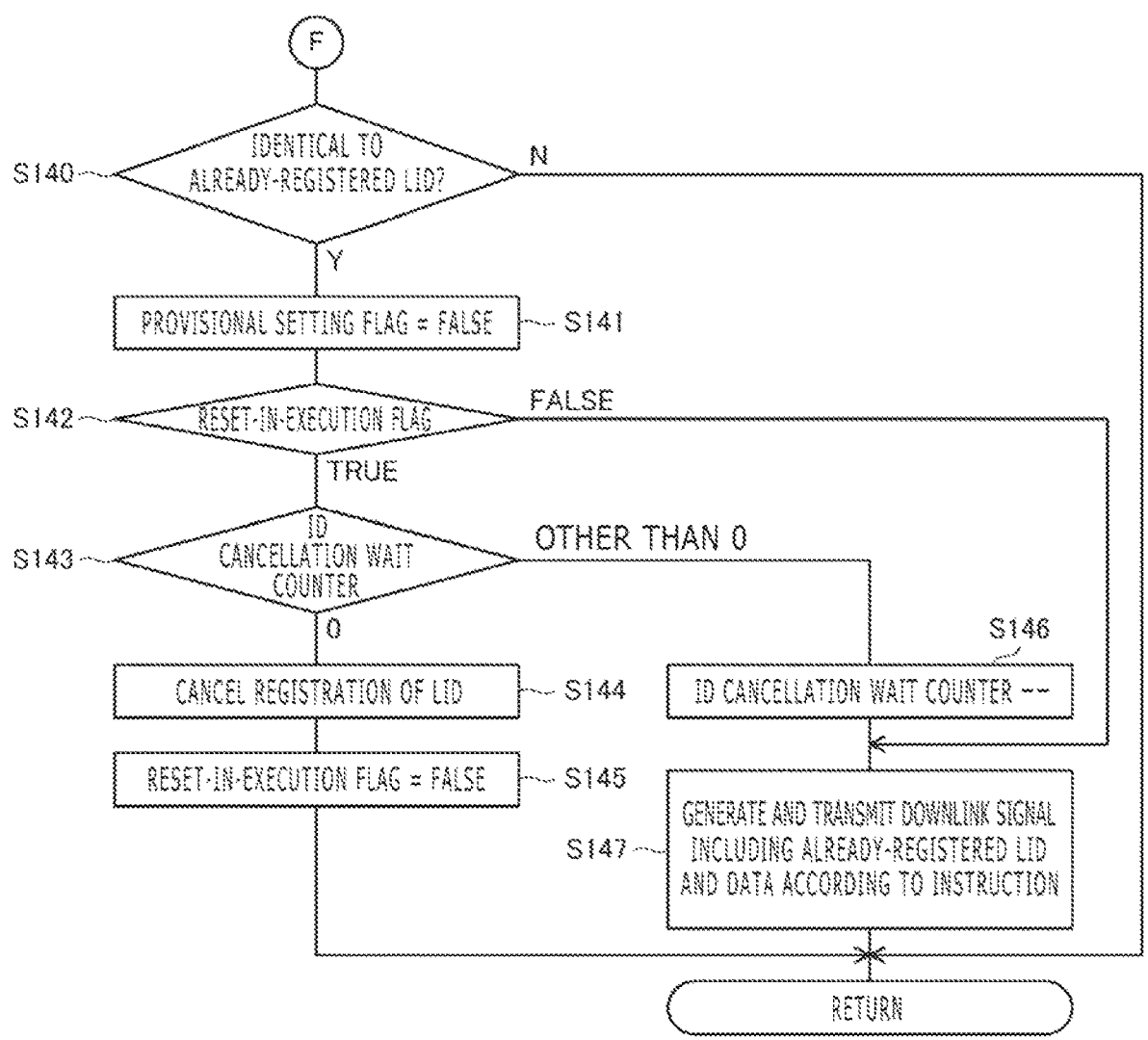
FIG. 20 is a flowchart depicting the detailed flow of the command signal reception processing depicted in FIG. 16.

In FIG. 20, processing in the case in which the command is determined as the "data transmission instruction" at S117 in FIG. 17 is depicted. The stylus 2 in this case first determines whether or not the received command signal includes the already-registered local ID (S140). If determining that the command signal does not include the already-registered local ID, the stylus 2 ends the command signal reception processing about the command signal that is presently received without executing particular processing and returns to S100 in FIG. 16 to start the next command signal reception processing. This is processing for ignoring the command signal that is not addressed to its own self and starting preparation for a response to the next command. On the other hand, if determining that the command signal includes the already-registered local ID, the stylus 2 sets "FALSE" in the provisional setting flag (S141) and subsequently determines the value of the reset-in-execution flag (S142).

If the reset-in-execution flag is "FALSE," the stylus 2 transmits the downlink signal DS including the already-registered local ID and data instructed to be transmitted by the command signal (S147). Then, the stylus 2 ends the command signal reception processing and returns to S100 in FIG. 16. This processing is the normal response to the command signal that represents the data transmission instruction.

On the other hand, if determining at S142 that the reset-in-execution flag is "TRUE," first the stylus 2 determines whether or not the ID cancellation wait counter is 0 (S143). The initial state of the ID cancellation wait counter is 0 as with the ID setting wait counter. However, immediately after the stylus 2 receives a reset order at a timing that is not immediately after registration of a local ID, a value that is not 0 is set in the ID cancellation wait counter at S136. If determining that the ID cancellation wait counter is not 0, the stylus 2 performs processing of decrementing the ID cancellation wait counter by 1 (S146) and thereafter transmits the downlink signal DS including the already-registered local ID and data instructed to be transmitted by the command signal (S147). Then, the stylus 2 ends the command signal reception processing and returns to S100 in FIG. 16.

This processing of S146 and S147 is processing in the case in which the stylus 2 delays execution of registration cancellation of the local ID as described with reference to FIG. 27.

On the other hand, if determining at S143 that the ID cancellation wait counter is 0, the stylus 2 cancels the registration of the local ID by deleting the local ID from the memory 45 (S144) and sets "FALSE" in the reset-in-execution flag (S145). Then, the stylus 2 ends the command signal reception processing and returns to S100 in FIG. 16. Thereby, the delayed registration cancellation of the local ID is performed.

As described above, according to the sensor controller 31 and the stylus 2 in accordance with the present embodiment, the sensor controller 31 allocates a local ID to the stylus 2 by a command signal that represents a setting instruction and makes the local ID be included in another command signal. Thereby, the sensor controller 31 can specify the stylus 2 that should respond to the command signal. Therefore, it becomes possible to flexibly change the timings when the respective styluses transmit the downlink signal DS.

Furthermore, the sensor controller 31 can specify the stylus 2 that should respond to the command signal by only making one value of a local ID be included in the command signal. Thus, it becomes possible to decrease the size of the command signal compared with the case in which the timings when the respective styluses 2 transmit the downlink signal DS are decided by a negotiation carried out in advance.

Moreover, if determining that a received command signal does not include the already-registered local ID at S130 or S140, the stylus 2 can immediately move to reception operation of the next command signal (S111). Therefore, it becomes possible to favorably receive the next command signal irrespective of the length of the downlink signal DS transmitted by the other styluses 2.

Although the preferred embodiment of the present disclosure is described above, it is obvious that the present disclosure is not limited to such an embodiment at all and the present disclosure can be carried out in various modes in such a range as not to depart from the gist thereof.

For example, in the above-described embodiment, description is made based on the assumption that the position detecting system 1 includes the two pen-type styluses 2a and 2b and the one ruler-type stylus 2c. However, the number of styluses 2 included in the position detecting system 1 is not limited thereto. The present disclosure can be applied to the position detecting system 1 including plural styluses 2 irrespective of the form.

Figure 28:
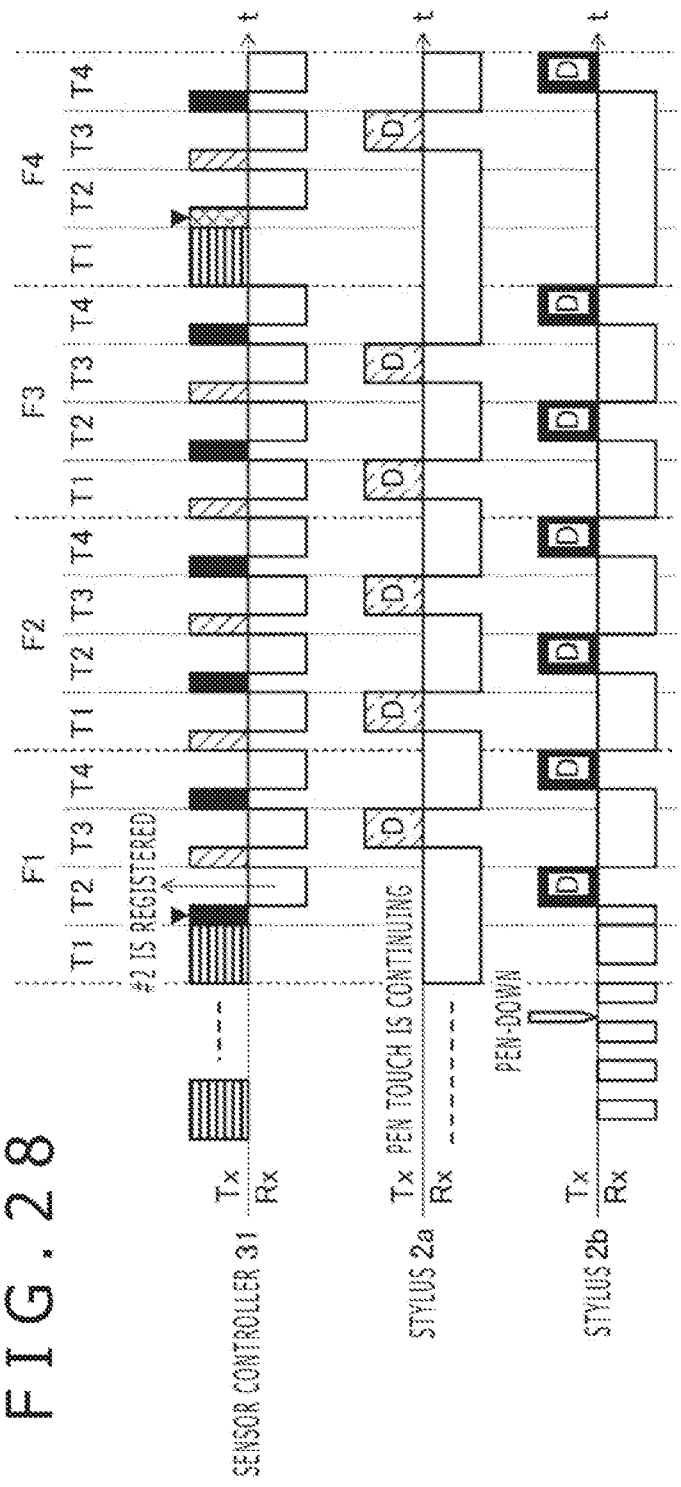
FIG. 28 is a timing chart depicting signals transmitted and received between the styluses 2a and 2b and the sensor controller 31 according to a first modification example of the embodiment of the present disclosure (scene in which the sensor controller 31 newly registers the stylus 2b)
Figure 29:
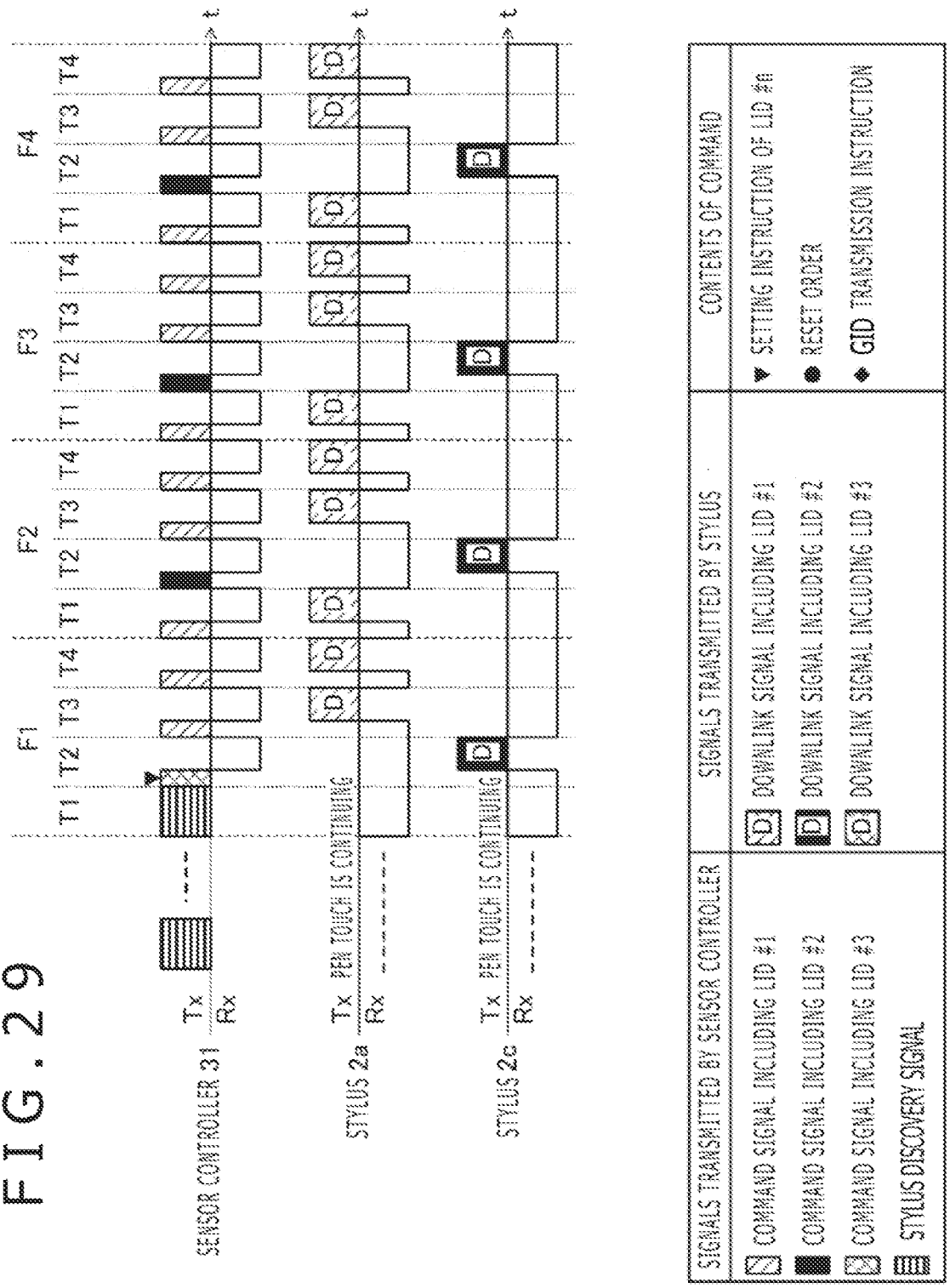
FIG. 29 is a timing chart depicting signals transmitted and received between the styluses 2a and 2c and the sensor controller 31 according to the first modification example of the embodiment of the present disclosure (scene in which normal writing by the styluses 2a and 2c is being carried out)

FIG. 28 and FIG. 29 are each a time chart depicting signals transmitted and received between the styluses 2a and 2b and the sensor controller 31 according to a first modification example of the embodiment of the present disclosure. In FIG. 28, a scene in which the sensor controller 31 registers the stylus 2a and thereafter further registers the stylus 2b is depicted similarly to FIG. 22. In FIG. 29, a scene in which normal writing by the styluses 2a and 2c is being carried out after the sensor controller 31 readjusts the transmission schedule based on the device type of each of the styluses 2a and 2c is depicted similarly to FIG. 24.

In the present modification example, communication between the styluses 2a and 2b and the sensor controller 31 is carried out by the above-described frame communication. This frame communication is carried out by using frames F1, F2, . . . each including four slots T1 to T4. The number of slots in one frame is not limited to four. As described above, each frame is the display operation period of the liquid crystal panel 32 (see FIG. 1) and the timing of each slot is decided based on the blank period of the liquid crystal panel 32. The sensor controller 31 decides the timing and time length of each slot and the number of slots included in each frame by observing noise generated from the liquid crystal panel 32 or acquiring information from the liquid crystal panel 32. These pieces of decided information are notified from the sensor controller 31 to the stylus 2 by the uplink signal US.

The sensor controller 31 is configured to transmit the stylus search signal every predetermined number (in FIG. 28, three) frames by using the first slot T1 thereof. Furthermore, the sensor controller 31 is configured to transmit a command signal at the beginning of each of the other slots. Meanwhile, the stylus 2 is configured to, when receiving the command signal, transmit the downlink signal DS in response to the command signal.

Also in the present modification example, the transmission continuation time of the downlink signal DS possibly differs depending on the specifications of the stylus 2. If acquiring the transmission continuation time of the downlink signal DS of the stylus 2 due to reception of a global ID, the sensor controller 31 decides the transmission schedule based on the acquired transmission continuation time of the downlink signal DS and writes the transmission schedule to the ID management table 70. Then, the sensor controller 31 controls the transmission interval of the command signal in order to realize the written transmission continuation time of the downlink signal DS. If the transmission continuation time of the downlink signal DS is too long to fall within one slot, the sensor controller 31 realizes the transmission continuation time of the downlink signal DS by skipping transmission of the uplink signal US at the beginning of the slot.

The present modification example is the same as the above-described embodiment in the other points. Therefore, also according to the present modification example, it is possible to register a new local ID in both the stylus 2 and the sensor controller 31 by a command signal that represents a setting instruction of the local ID as depicted in FIG. 28, and it is also possible to change the scan rate depending on the local ID as exemplified in FIG. 29.

As described above, according to the present modification example, the sensor controller 31 transmits the command signal including the value of the local ID every transmission time. Thus, the sensor controller 31 can specify the stylus 2 that should transmit the downlink signal DS in the transmission time. Therefore, it becomes possible to flexibly change allocation of the transmission time to each stylus 2 in units of the slot shorter than the frame. Furthermore, by only making one value of the local ID be included in the command signal, it becomes possible to order allocation of the transmission time (in the present modification example, slot) from the sensor controller 31 to each stylus 2. Thus, it becomes possible to decrease the size of the uplink signal for ordering the allocation of the slot as the transmission time compared with the case in which the uplink signal for ordering the allocation of the slot is broadcast to each stylus on each frame basis as described above.

Figure 30:
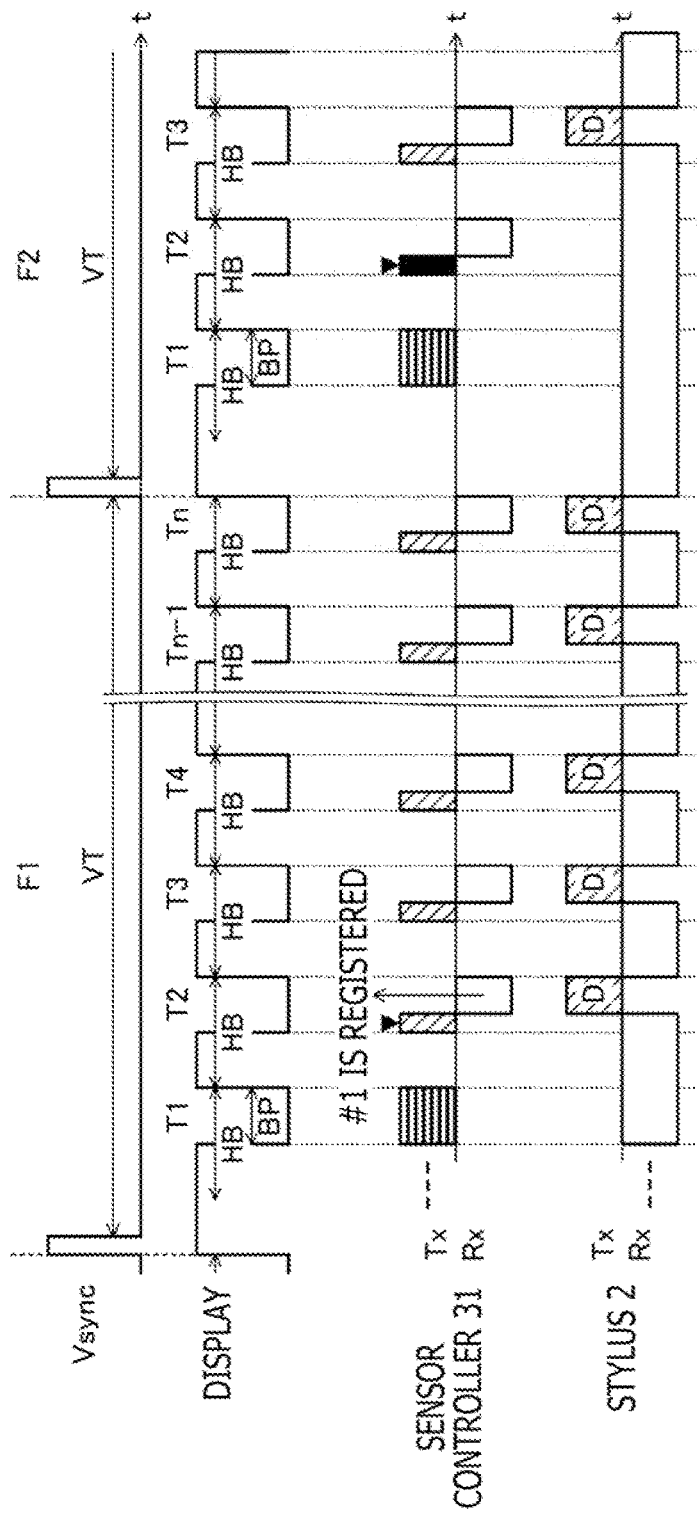
FIG. 30 is a timing chart depicting another example of signals transmitted and received between the stylus 2a, 2b, or 2c and the sensor controller 31 according to the first modification example of the embodiment of the present disclosure.

FIG. 30 is a time chart depicting another example of signals transmitted and received between the stylus 2 and the sensor controller 31 according to the present modification example. With reference to this FIG. 30, the present modification example will be described below again in more detail from another point of view.

As depicted in FIG. 30, plural horizontal blanking periods HB are disposed in one operation cycle VT of the liquid crystal panel 32 (see FIG. 1) corresponding to one frame. In the latter half of the horizontal blanking period HB, processing of returning the pixels of the driving target from the right end of the screen (or predetermined region obtained by dividing the screen into plural regions) to the left end and the electronic equipment controller 33 suspends drive processing of the pixels during this processing. That is, the latter half of the horizontal blanking period HB serves as the above-described blank period BP. In FIG. 30, an example in which n (n is an integer equal to or larger than 3) blank periods BP exist in one frame is depicted. In this case, slots that can be used for communication between the stylus 2 and the sensor controller 31 are n slots of slots T1 to Tn.

The sensor controller 31 is configured to transmit the stylus search signal by using the first slot T1 of the frame in each frame for example and transmit a command signal that represents a setting instruction (hereinafter, referred to as "first signal") in the immediately-sub sequent slot T2. Furthermore, the sensor controller 31 is configured to transmit a command signal including a local ID regarding which an instruction of setting has been made by the setting instruction (hereinafter, referred to as "second signal") in the subsequent slots T3 to Tn. The first signal is a signal that gives the stylus 2 a command of a setting instruction or the like to set a local ID and therefore this signal may be referred to as a command signal. In contrast, the second signal is a signal that gives each of the styluses 2 only the transmission timing and therefore this signal may be referred to as a timing signal. Moreover, the first signal is a signal that gives a command and supplies a reference timing of the frame to the whole system and the second signal is a signal that gives the respective individual styluses the transmission timing. Therefore, the former may be referred to as a first timing signal and the latter may be referred to as a second timing signal.

Meanwhile, the stylus 2 is configured to detect the stylus search signal and the first signal supplied to the sensor electrode 30 (sensor electrode group) of the electronic equipment 3 in each frame for example, and determine whether or not the detected first signal represents a setting instruction of a local ID, and write (register) the value of the local ID specified by the setting instruction to the memory 45 if determining that the first signal represents the setting instruction. Furthermore, the stylus 2 is configured to transmit a downlink signal that is a response to the setting instruction (hereinafter, referred to as "second downlink signal") to the sensor controller 31 in response to the detection of the first signal. The sensor controller 31 that has received this second downlink signal performs processing of registering the value of the corresponding local ID in the ID management table 70 as described above. In FIG. 30, the stylus 2 transmits the second downlink signal in the slot in which the stylus 2 has detected the first signal (in the example of FIG. 30, slot T2). However, if it is impossible to ensure a sufficient transmission time in the slot, or the like, the second downlink signal may be transmitted in the immediately-subsequent slot (in the example of FIG. 30 slot T3). Moreover, without fixing to the same slot as the first signal or the immediately-subsequent slot, the stylus 2 may use a slot in which the second signal including a predetermined local ID defined in advance has been transmitted by the sensor controller 31 as the slot in which the second downlink signal is transmitted. This makes it possible to flexibly specify the transmission timing of the second downlink signal, which is a response signal, from the side of the sensor controller 31 according to the length and placement of one blank period BP, the gap time taken for switching between transmission and reception of the stylus 2, or the like for example.

The stylus 2 that has written the value of the local ID to the memory 45 repeatedly detects the second signal supplied to the sensor electrode 30 of the electronic equipment 3 in each of one or more slots included in the frame, and compares the values of the local ID included in the detected second signal and the local ID stored in the memory 45 every time the stylus 2 detects the second signal. If the values correspond with each other, the stylus 2 transmits, to the sensor controller 31, a downlink signal that is a response to the second signal (hereinafter, referred to as "first downlink signal") by using the electrode 21 (electrodes 21_1 to 21_n if the stylus 2 is the stylus 2c, which is a ruler-type device). Because that the values of the local ID correspond with each other is employed as the transmission condition of the first downlink signal as above, the stylus 2 does not transmit the first downlink signal in one frame if none of the second signals transmitted plural times in the one frame includes the value of the local ID written to the memory 45.

Here, the second signal may be a signal that merely notifies a local ID and the timing of the blank period corresponding to the slot. In this case, the second signal may be a signal with a shorter time length than the first signal. For example, if only two kinds of local ID exist (that is, if the number of styluses 2 that can simultaneously communicate with the sensor controller 31 is only two), the second signal may be a signal including only one above-described symbol. Specifically, the second signal may be a signal that represents either of two kinds of bit sequence non-corresponding values "P" and "M" or may be a signal that represents either of a bit sequence corresponding value converted to "0" in the stylus 2 and a bit sequence corresponding value converted to "1" in the stylus 2 (that is, signal in which only a bit value that represents a local ID is included). Employing a signal having a short time length as above as the second signal allows the stylus 2 to transmit the first downlink signal in the slot in which the stylus 2 has detected the second signal including the local ID stored in the memory 45 as depicted in FIG. 30. This is suitable particularly for the case in which it is difficult to ensure a sufficient communication time because the sensor electrode 30 is used also for a use purpose other than position detection operation as in a position detecting system of the in-cell type.

The first signal may include a value of a symbol for discrimination from the second signal. In this case, this value of the symbol is a value that represents a setting instruction of a local ID. If the first signal includes a value of a symbol for discrimination from the second signal as above, it is preferable to configure the stylus 2 in such a manner that the stylus 2 does not employ the first signal as a trigger of transmission of the first downlink signal and is triggered to transmit the first downlink signal by detection of the second signal.

The present modification example is described above again in more detail from another point of view.

Figure 31:
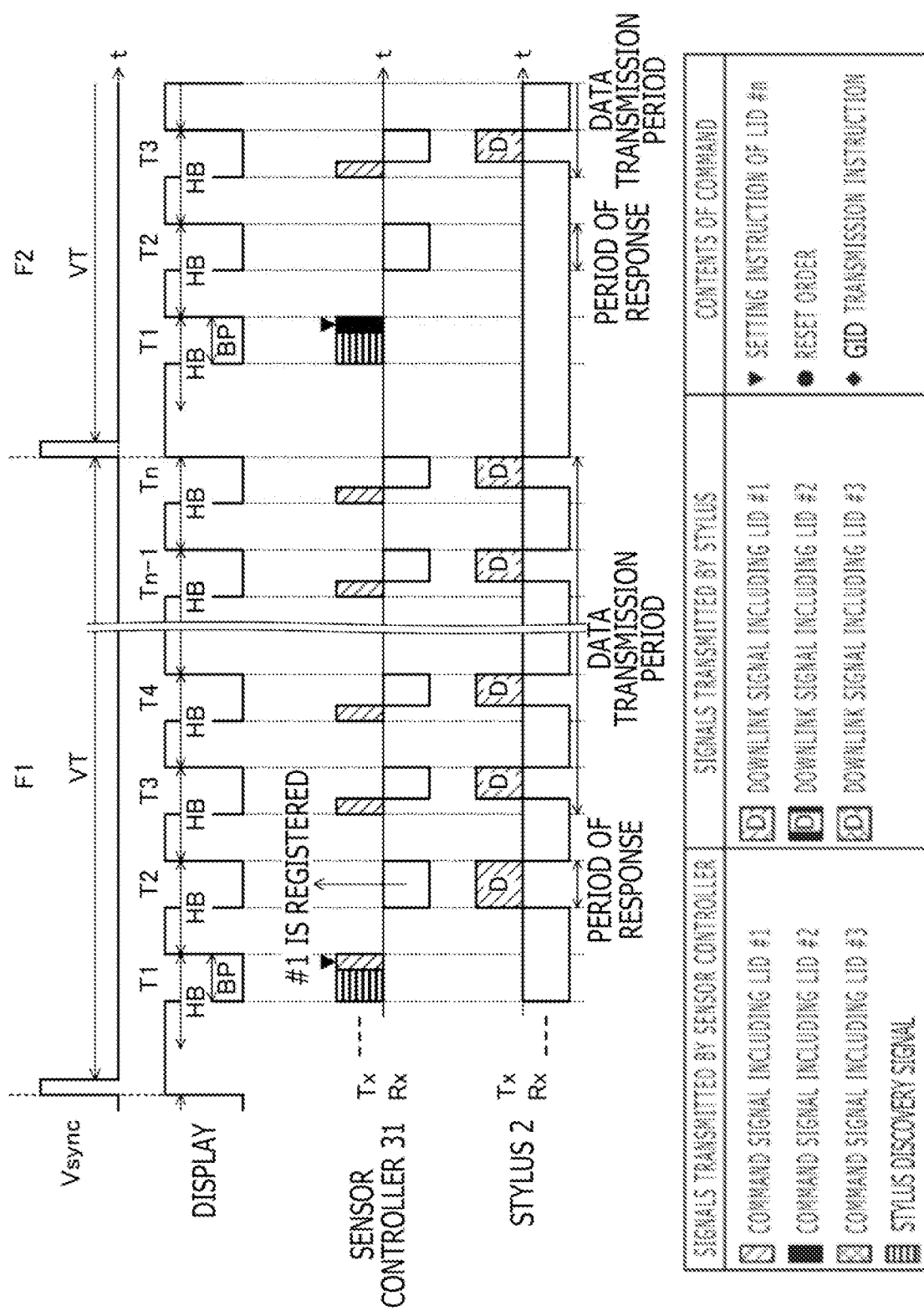
FIG. 31 is a timing chart depicting signals transmitted and received between the stylus 2a, 2b, or 2c and the sensor controller 31 according to a second modification example of the embodiment of the present disclosure.

FIG. 31 is a time chart depicting signals transmitted and received between the stylus 2 and the sensor controller 31 according to a second modification example of the embodiment of the present disclosure. The present modification example is different from the first modification example in how to use each slot in the frame. A description will be made below with focus on the different point.

The sensor controller 31 according to the present modification example collectively transmits the stylus search signal and the first signal in the slot T1 of each frame. In FIG. 31, the stylus search signal and the first signal are drawn in such a manner as to be divided in terms of time for convenience. However, the actual transmission method is not limited to such a method based on time sharing. It suffices for the signal including the stylus search signal and the first signal to be a signal that is a signal transmitted in each frame and serves as the timing basis of frame synchronization and has a function including a command such as a command to make a setting instruction of a local ID.

In the present modification example, the slot T2 is used as a period of a response by the stylus 2 to the first signal. The stylus 2 that has received the first signal in the slot T1 transmits the second downlink signal, which is a response to the setting instruction, by using the slot T2. The sensor controller 31 does not carry out particular signal transmission in the slot T2. The slot T2 is not continuous with the slot T1 and is disposed to be separated by the driving time of pixels. Therefore, even when a delay is caused in checking the cyclic redundancy check (CRC) and so forth included in the first signal by the stylus 2 after receiving the first signal, it is possible to ensure the time (gap) necessary for switching from the reception to transmission. The response period does not necessarily have to be disposed in the slot T2 immediately subsequent to the slot T1, and the sensor controller 31 may specify this response period by transmitting the second signal including a predetermined local ID similarly to the first modification example.

In the present modification example, the slots T3 to Tn are used as a data transmission period. In this period, similarly to the first modification example, the sensor controller 31 transmits the second signal and the stylus 2 transmits the first downlink signal as a response to this second signal. The contents of the second signal and the first downlink signal may be the same as the first modification example.

Also according to the present modification example, the sensor controller 31 transmits the command signal including the value of the local ID every transmission time. Thus, the sensor controller 31 can specify the stylus 2 that should transmit the downlink signal DS (first downlink signal) in the transmission time. Therefore, it becomes possible to flexibly change allocation of the transmission time to each stylus 2 in units of the slot shorter than the frame. Furthermore, by only making one value of the local ID be included in the command signal, it becomes possible to order allocation of the transmission time (in the present modification example, slot) from the sensor controller 31 to each stylus 2. Thus, it becomes possible to decrease the size of the uplink signal for ordering the allocation of the slot as the transmission time compared with the case in which the uplink signal for ordering the allocation of the slot is broadcast to each stylus on each frame basis as described above.

Figure 32:
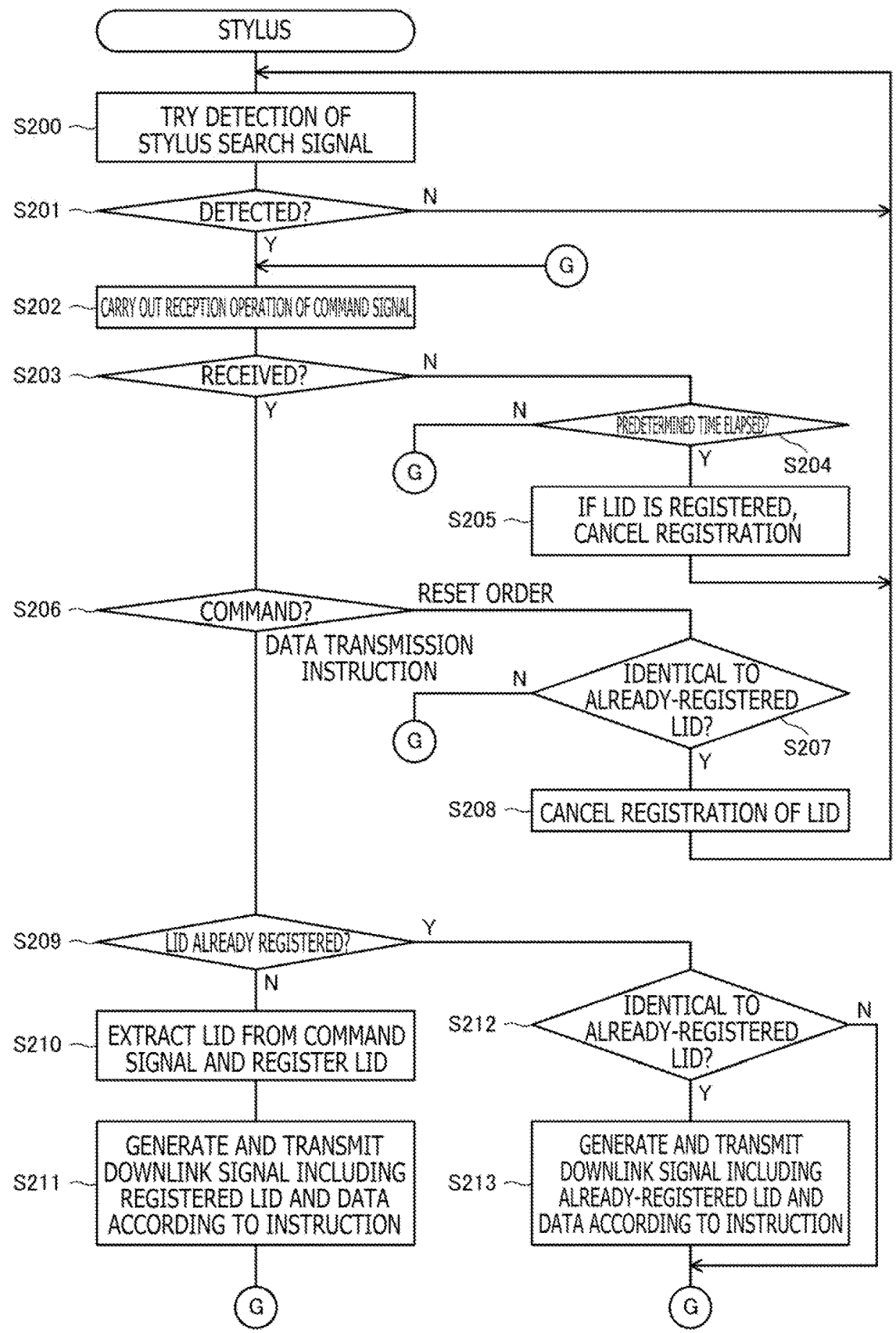
FIG. 32 is a flowchart depicting a processing flow of the stylus 2a, 2b, or 2c according to a third modification example of the embodiment of the present disclosure.

FIG. 32 is a flowchart depicting a processing flow of the stylus 2 according to a third modification example of the embodiment of the present disclosure. The present modification example is different from the above-described embodiment in that the command signal that represents the "data transmission instruction" doubles as the "setting instruction," in that the period during which the stylus 2 ignores the setting instruction (FIG. 26) is not set, in that the stylus 2 that has received a reset order postpones cancellation of registration of the local ID (FIG. 27) is not set, in that determination of the writing pressure is not carried out before registration of the local ID is cancelled (cancellation of registration of the local ID is carried out irrespective of the writing pressure), and so forth. Operation of the stylus 2 according to the present modification example will be described below with reference to FIG. 32.

The stylus 2 according to the present modification example first tries detection of the stylus search signal (S200) and determines whether or not the stylus search signal has been detected as the result (S201). Concrete contents of the stylus search signal and the method of the detection may be the same as the above-described embodiment. In this case, it is when the delimiter pattern STP is detected that the positive determination is made at S201.

If obtaining the negative determination at S201, the stylus 2 returns to S200 and repeats the trial of detection of the stylus search signal. On the other hand, the stylus 2 in the case of obtaining the positive determination S201 carries out reception operation of the command signal (S202) and determines whether or not a command signal has been received (S203). The processing of S202 and S203 is the same processing as performed at S111 and S112 depicted in FIG. 17.

If obtaining the negative determination at S203, the stylus 2 determines whether or not a predetermined time has elapsed from the last reception of the command signal (S204). If determining that the predetermined time has not elapsed as the result, the stylus 2 returns to S202 and repeats the reception operation of the command signal. In the case in which the stylus 2 determines that the predetermined time has elapsed, if a local ID is registered in the memory 45 (see FIG. 2) at the timing, the stylus 2 cancels the registration of the local ID by deleting the local ID from the memory 45 (S205) and returns to S200.

The stylus 2 in the case of obtaining the positive determination at S203 determines which of "reset order" and "data transmission instruction" the contents of a command represented by the received command signal are. In the present modification example, the command signal that represents the "data transmission instruction" doubles as the "setting instruction" as described above. Thus, the contents of the command discriminated at S203 are two kinds different from S117 in FIG. 17, in which three kinds of command contents are discriminated.

If determining at S206 that the command is the "reset order," the stylus 2 determines whether or not the received command signal includes the already-registered local ID (S207). Then, if determining that the command signal does not include the already-registered local ID, the stylus 2 returns to S202 and repeats the reception operation of the command signal. If determining that the command signal includes the already-registered local ID, the stylus 2 cancels the registration of the local ID by deleting the local ID from the memory 45 (S208) and returns to S200.

If determining at S206 that the command is the "data transmission instruction," subsequently the stylus 2 determines whether or not a local ID has been already registered in its own memory 45 (S209). Then, if a local ID has not been registered, the stylus 2 extracts a local ID from the received command signal and registers the local ID in the memory 45 (S210). Then, the stylus 2 transmits the downlink signal DS including the registered local ID and data instructed to be transmitted by the command signal (S211). Thereafter, the stylus 2 returns to S202 and repeats the reception operation of the command signal.

The stylus 2 in the case of determining at S209 that a local ID has been already registered subsequently determines whether or not the received command signal includes the already-registered local ID (S212). Then, if determining that the command signal does not include the already-registered local ID, the stylus 2 returns to S202 and repeats the reception operation of the command signal. On the other hand, if determining that the command signal includes the already-registered local ID, the stylus 2 transmits the downlink signal DS including the already-registered local ID and data instructed to be transmitted by the command signal (S213). Thereafter, the stylus 2 returns to S202 and repeats the reception operation of the command signal.

Also according to the present modification example, the sensor controller 31 allocates a local ID to the stylus 2 by a command signal that represents a setting instruction and makes the local ID be included in another command signal. Thereby, the sensor controller 31 can specify the stylus 2 that should respond to the command signal. Therefore, it becomes possible to flexibly change the timings when the respective styluses transmit the downlink signal DS.

Furthermore, the sensor controller 31 can specify the stylus 2 that should respond to the command signal by only making one value of a local ID be included in the command signal. Thus, it becomes possible to decrease the size of the command signal compared with the case in which the timings when the respective styluses 2 transmit the downlink signal DS are decided by a negotiation carried out in advance.

Moreover, in the present modification example, the command signal that represents the "data transmission instruction" doubles as the "setting instruction." Thus, the stylus 2 can transmit the normal downlink signal DS including data at S211 immediately after a local ID is registered. Therefore, the opportunity for transmission of the downlink signal DS can be increased by one time compared with the case in which the reply to the "setting instruction" is carried out by the downlink signal DS that does not include data.

In the above-described embodiment, the downlink signal DS is configured to include two signals, the burst signal and the data signal. However, the downlink signal DS may include only one of these two signals, such as only the burst signal or only the data signal.

Furthermore, in the above-described embodiment, the example in which transmission of a global ID is carried out by using the downlink signal DS using capacitive coupling is described. However, because the global ID is static information differently from the handling state that changes depending on the timing of reception of the uplink signal US, the global ID may be notified from the stylus 2 to the sensor controller 31 by another proximity wireless communication measure such as Bluetooth (registered trademark) for example. Due to this, in communication using capacitive coupling, the communication time for transmitting the global ID can be reduced. This can increase the opportunity for transmission of the data signal including handling states such as a writing pressure value and the pressing-down state of a switch.

Moreover, in the above-described embodiment, it is explained that there are two kinds of signals, the stylus search signal and the command signal, in the uplink signal US. However, the stylus search signal may include a local ID setting instruction command to the new undetected stylus 2. This allows the stylus 2 to immediately set a local ID at the timing of reception of the stylus search signal.

Furthermore, in the above-described embodiment, the example is described in which the values of symbols that take multiple values such as "P," "M," and "0 to 15" are used as the transmission method of the control information c2, the detection pattern c1, the delimiter pattern STP, and so forth. However, these pieces of information or patterns may be transmitted by another transmission method, e.g. a transmission method using a modulation system such as OOK or PSK.

Moreover, in the above-described embodiment, the value of the local ID is cited as an example of information stored in the memory 45 of the stylus 2. However, other various kinds of information may be stored in the memory 45. For example, the memory 45 may store, besides the local ID, a state to identify whether pairing of the relevant stylus 2 with the sensor controller 31 has been carried out or not been carried out (hereinafter, referred to as "pairing state"). Here, the state in which the pairing has been carried out corresponds to the state in which a local ID is stored in the memory 45, and the state in which the pairing has not been carried out corresponds to the state in which a local ID is not stored in the memory 45. In this case, the controller 44 of the stylus 2 may set the pairing state stored in the memory 45 to the state indicating that the pairing has been carried out after writing a local ID represented by a setting instruction to the memory 45. Furthermore, the controller 44 may set the pairing state to the state indicating that the pairing has not been carried out if deleting the local ID stored in the memory 45 and if determining that a command signal (second command signal described in the third modification example) includes a reset order.

Furthermore, the electronic equipment 3 may be an apparatus other than the tablet computer like that depicted in FIG. 1. For example, the electronic equipment 3 may be a large-size apparatus like a board on which plural persons simultaneously carry out drawing while using styluses, such as an electronic blackboard installed on a wall of a classroom of a school. Moreover, as one kind of stylus 2, the auxiliary device is explained by taking an electronic ruler with a straight line shape as an example. However, the auxiliary device may include various kinds of tools such as an electronic blackboard eraser with a circular shape or polygonal shape. A pen move by the stylus 2 that is an electronic blackboard eraser plays a role in erasing or cutting a locus written by another stylus 2 (for example, loci st1 to st3 depicted in FIG. 1). In addition, if the auxiliary device has a shape such as a circular shape or polygonal shape, electrodes may be disposed at arbitrary positions adaptively to the shape.

It is to be noted that the embodiment of the present disclosure is not limited to the foregoing embodiment, and that various changes can be made without departing from the spirit of the present disclosure.

What is claimed is:

1. An auxiliary device that operates in synchronization with a sensor controller, the auxiliary device comprising:
    a ruler part including a ruler part switch and a plurality of electrodes each having a plate shape,
    wherein the electrodes are arranged in a straight line in a longitudinal direction of the ruler part, and
    wherein the ruler part switch includes a common terminal and a plurality of electrode-side terminals respectively coupled to the plurality of electrodes;
    a processor; and
    a memory storing instructions that, when executed by the processor, cause the auxiliary device to transmit a downlink signal to the sensor controller according to an uplink signal transmitted from the sensor controller while causing the ruler part switch to sequentially connect the common terminal to each of the electrode-side terminals.

2. The auxiliary device according to claim 1, further comprising:
    a receiving electrode which, in operation, receives the uplink signal, wherein the receiving electrode is different from the plurality of electrodes.

3. The auxiliary device according to claim 1, wherein the plurality of electrodes includes three or more electrodes.

4. The auxiliary device according to claim 1, further comprising:
   a first user operable switch coupled to the processor,
   wherein the instructions, when executed by the processor, cause the auxiliary device to stop transmission of the downlink signal in response to operation of the first user operable switch.

5. The auxiliary device according to claim 4, further comprising:
   a second user operable switch coupled to the processor,
   wherein the instructions, when executed by the processor, cause the auxiliary device to start transmission of the downlink signal with data indicating that the second user operable switch has been operated in response to operation of the second user operable switch.

6. The auxiliary device according to claim 1, wherein the downlink signal transmitted by the auxiliary device is configured to cause an electronic device that is coupled to the sensor controller to erase a trajectory of a stylus displayed by the electronic device.

7. The auxiliary device according to claim 1, wherein the electrodes include at least a first electrode, a second electrode, and a third electrode.

8. The auxiliary device according to claim 7, wherein the first electrode, the second electrode, and the third electrode are lined at equal intervals inside the ruler part from a first end of the rule part to a second end of the ruler part in the longitudinal direction of the ruler part.

\* \* \* \* \*